US008874090B2

(12) United States Patent
Abuan et al.

(10) Patent No.: US 8,874,090 B2
(45) Date of Patent: Oct. 28, 2014

(54) REMOTE CONTROL OPERATIONS IN A VIDEO CONFERENCE

(75) Inventors: Joe S. Abuan, San Jose, CA (US);
James O. Normile, Los Altos, CA (US);
Hsi-Jung Wu, Sunnyvale, CA (US);
Haitao Guo, San Jose, CA (US);
Douglas S. Price, San Jose, CA (US);
Xiaosong Zhou, Campbell, CA (US);
Dazhong Zhang, Milpitas, CA (US);
Berkat S. Tung, Rancho Cordova, CA (US); Roberto Garcia, Jr., Sunnyvale, CA (US); Hyeonkuk Jeong, Saratoga, CA (US); Yan Yang, San Jose, CA (US);
David A. Eldred, San Francisco, CA (US); Elizabeth C. Cranfill, San Francisco, CA (US); Andrew Yanowitz, Ben Lomond, CA (US); Ting Chen, Sunnyvale, CA (US); David D. Kuo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 12/794,772

(22) Filed: Jun. 6, 2010

(65) Prior Publication Data
US 2011/0249075 A1 Oct. 13, 2011

Related U.S. Application Data

(60) Provisional application No. 61/321,871, filed on Apr. 7, 2010.

(51) Int. Cl.
*H04M 3/00* (2006.01)
*H04N 7/15* (2006.01)
*H04N 7/14* (2006.01)

(52) U.S. Cl.
CPC ............... *H04N 7/141* (2013.01); *H04N 7/15* (2013.01); *H04N 7/147* (2013.01)
USPC ........................................ 455/416; 348/14.01

(58) Field of Classification Search
USPC ............... 455/416; 348/14.01–14.08, 14.09
See application file for complete search history.

(56) References Cited

U.S. PATENT DOCUMENTS

| 4,809,069 A | 2/1989 | Meyer et al. |
| 5,896,128 A * | 4/1999 | Boyer ........................... 715/716 |

(Continued)

FOREIGN PATENT DOCUMENTS

| AU | 2010350749 | 11/2012 |
| CN | 1527565 | 9/2004 |

(Continued)

OTHER PUBLICATIONS

Portions of prosecution history of U.S. Appl. No. 12/794,766, Jun. 13, 2011, Cranfill, Elizabeth C., et al.

(Continued)

*Primary Examiner* — Maria El-Zoobi
(74) *Attorney, Agent, or Firm* — Adeli LLP

(57) ABSTRACT

Some embodiments provide a method for allowing a first device that is in a video conference with a second mobile device to remotely control the second mobile device. The method sends images captured by a camera of the first device to the second device. The method receives images captured by a camera of the second device. The method sends a command through a communication channel of a real-time communication session to the second device. The command is for instructing the second device to perform an operation that modifies the images captured by the camera of the second device.

27 Claims, 49 Drawing Sheets

(56) References Cited

U.S. PATENT DOCUMENTS

| | | | |
|---|---|---|---|
| 6,025,871 | A | 2/2000 | Kantor et al. |
| 6,473,631 | B1* | 10/2002 | Siddoway et al. ......... 455/575.1 |
| 6,833,874 | B2 | 12/2004 | Ozaki et al. |
| 7,102,663 | B2 | 9/2006 | Crook |
| 7,126,626 | B2* | 10/2006 | Sawahara et al. ......... 348/14.02 |
| 7,174,195 | B2 | 2/2007 | Nagamine |
| 7,317,924 | B2 | 1/2008 | Virtanen et al. |
| 7,443,447 | B2 | 10/2008 | Shirakawa |
| 7,505,087 | B2 | 3/2009 | Kang |
| 7,561,177 | B2 | 7/2009 | Cheatle et al. |
| 7,564,482 | B2 | 7/2009 | Clarke et al. |
| 7,603,594 | B2 | 10/2009 | Inoue et al. |
| 7,626,612 | B2 | 12/2009 | John et al. |
| 7,675,539 | B2 | 3/2010 | Matsui |
| 7,925,288 | B2 | 4/2011 | Kim |
| 7,982,762 | B2 | 7/2011 | Chatting et al. |
| 8,451,994 | B2 | 5/2013 | Abuan et al. |
| 8,489,149 | B2 | 7/2013 | Lee |
| 8,502,856 | B2 | 8/2013 | Cranfill et al. |
| 8,542,266 | B2 | 9/2013 | Leviav et al. |
| 2004/0048612 | A1 | 3/2004 | Virtanen et al. |
| 2004/0145675 | A1 | 7/2004 | Kitada |
| 2006/0139463 | A1 | 6/2006 | Heinonen |
| 2006/0149399 | A1 | 7/2006 | Norhammar et al. |
| 2007/0035632 | A1 | 2/2007 | Silvernail et al. |
| 2007/0070204 | A1 | 3/2007 | Mentzer |
| 2007/0082700 | A1* | 4/2007 | Landschaft et al. ......... 455/557 |
| 2007/0115349 | A1 | 5/2007 | Currivan et al. |
| 2007/0147827 | A1 | 6/2007 | Sheynman et al. |
| 2007/0177025 | A1 | 8/2007 | Kopet et al. |
| 2007/0279482 | A1 | 12/2007 | Oswald et al. |
| 2008/0024614 | A1 | 1/2008 | Li et al. |
| 2008/0034096 | A1 | 2/2008 | Tourzni et al. |
| 2008/0036849 | A1 | 2/2008 | Oh et al. |
| 2008/0043116 | A1 | 2/2008 | Lappi et al. |
| 2008/0045142 | A1 | 2/2008 | Kim |
| 2008/0060031 | A1 | 3/2008 | Sekigawa |
| 2008/0074550 | A1 | 3/2008 | Park |
| 2008/0084482 | A1 | 4/2008 | Hansson et al. |
| 2008/0122923 | A1 | 5/2008 | Chang |
| 2008/0138055 | A1* | 6/2008 | Dunko et al. ............... 396/89 |
| 2008/0211941 | A1 | 9/2008 | Deever et al. |
| 2008/0218611 | A1 | 9/2008 | Parulski et al. |
| 2008/0239061 | A1 | 10/2008 | Cok et al. |
| 2008/0297587 | A1 | 12/2008 | Kurtz et al. |
| 2008/0303922 | A1* | 12/2008 | Chaudhri et al. ......... 348/231.99 |
| 2009/0002501 | A1 | 1/2009 | Silsby et al. |
| 2009/0047995 | A1 | 2/2009 | Futter et al. |
| 2009/0075692 | A1 | 3/2009 | Park et al. |
| 2009/0109276 | A1 | 4/2009 | Kim |
| 2009/0115881 | A1 | 5/2009 | Joo et al. |
| 2010/0118111 | A1* | 5/2010 | Bouazizi ................... 348/14.08 |
| 2011/0076003 | A1 | 3/2011 | Cho et al. |
| 2011/0205333 | A1 | 8/2011 | Wu et al. |
| 2011/0249073 | A1 | 10/2011 | Cranfill et al. |
| 2011/0249074 | A1 | 10/2011 | Cranfill et al. |
| 2011/0249076 | A1 | 10/2011 | Zhou et al. |
| 2011/0249077 | A1 | 10/2011 | Abuan et al. |
| 2011/0249078 | A1 | 10/2011 | Abuan et al. |
| 2011/0249086 | A1 | 10/2011 | Guo et al. |
| 2013/0265378 | A1 | 10/2013 | Abuan et al. |

FOREIGN PATENT DOCUMENTS

| | | |
|---|---|---|
| CN | 101296356 | 10/2008 |
| CN | 2010/1521696 | 9/2009 |
| EP | 0447212 | 12/1994 |
| EP | 0818926 | 1/1998 |
| EP | 0930768 | 7/1999 |
| EP | 1986431 | 10/2008 |
| EP | 2556665 | 2/2013 |
| JP | 2004/0166159 | 6/2004 |
| JP | 2007/0312039 | 11/2007 |
| KR | 2002/0049391 | 6/2002 |
| TW | I311286 | 6/2009 |
| WO | WO 01/31893 | 5/2001 |
| WO | WO 02/37848 | 5/2002 |
| WO | WO 2008/040566 | 4/2008 |
| WO | WO 2008/060031 | 5/2008 |
| WO | PCT/US2010/050311 | 9/2010 |
| WO | WO 2011/126511 | 10/2011 |

OTHER PUBLICATIONS

Portions of prosecution history of U.S. Appl. No. 12/794,768, Jun. 13, 2011, Cranfill, Elizabeth C., et al.
Portions of prosecution history of U.S. Appl. No. 12/794,771, Jun. 13, 2011, Guo, Haitao, et al.
Portions of prosecution history of U.S. Appl. No. 12/794,773, Jun. 13, 2011, Zhou, Xiaosong et al.
Portions of prosecution history of U.S. Appl. No. 12/794,775, Jun. 13, 2011, Abuan, Joe S., et al.
Portions of prosecution history of U.S. Appl. No. 12/794,774, Jun. 13, 2011, Abuan, Joe S., et al.
International Search Report and Written Opinion for PCT/US2010/050311, Aug. 24, 2011, Apple Inc.
Updated portions of prosecution history of U.S. Appl. No. 12/794,766, Jun. 25, 2012, Cranfill, Elizabeth C., et al.
Updated portions of prosecution history of U.S. Appl. No. 12/794,771, Jun. 28, 2012, Guo, Haitao, et al.
Updated portions of prosecution history of U.S. Appl. No. 12/794,775, Apr. 25, 2012, Abuan, Joe S., et al.
U.S. Appl. No. 13/889,261, filed May 7, 2013, Apple Inc.
U.S. Appl. No. 13/947,011, filed Jul. 19, 2013, Apple Inc.
Portions of prosecution history of EP10763539.3, Jun. 18, 2013 (mailing date), Apple Inc.
Lindbergh, Dave, "The H.324 Multimedia Communication Standard," IEEE Communications Magazine, Dec. 1996, pp. 46-51, IEEE Service Center, Piscataway, N.J., USA.
U.S. Appl. No. 12/794,766, filed Jun. 6, 2010, Cranfill, Elizabeth C., et al.
U.S. Appl. No. 12/794,768, filed Jun. 6, 2010, Cranfill, Elizabeth C., et al.
U.S. Appl. No. 12/794,771, filed Jun. 6, 2010, Guo, Haitao, et al.
U.S. Appl. No. 12/794,773, filed Jun. 6, 2010, Zhou, Xiaosong, et al.
U.S. Appl. No. 12/794,774, filed Jun. 6, 2010, Abuan, Joe S., et al.
U.S. Appl. No. 12/794,775, filed Jun. 6, 2010, Abuan, Joe S., et al.
Invitation to Pay Additional Fees and Partial International Search Report for PCT/US2010/050311, Dec. 21, 2010 (mailing date), Apple Inc.
International Preliminary Report on Patentability for PCT/US2010/050311, Oct. 9, 2012 (issuance date), Apple Inc.
Portions of prosecution history of AU2010350749, Oct. 16, 2013 (mailing date), Apple Inc.

* cited by examiner

REMOTE CONTROL OPERATIONS IN A VIDEO CONFERENCE

CLAIM OF BENEFIT TO PRIOR APPLICATION

This Application claims the benefit of U.S. Provisional Patent Application 61/321,871, entitled "Dual Camera Mobile Device with Video Conferencing Capabilities," filed Apr. 7, 2010.

CROSS REFERENCE TO RELATED APPLICATIONS

This Application is related to the following applications: U.S. Patent Application 12/794,766, filed Jun. 6, 2010, now issued as U.S. Pat. No. 8,744,420; U.S. patent application Ser. No. 12/794,768, filed Jun. 6, 2010, now issued as U.S. Pat. No. 8,502,856; U.S. patent application Ser. No. 12/794,771, filed Jun. 6, 2010, now published as U.S. Patent Publication 2011/0249086; U.S. patent application Ser. No. 12/794,773 filed Jun. 6, 2010, now published as U.S. Patent Publication 2011/0249076; U.S. patent application Ser. No. 12/794,774, filed Jun. 6, 2010, now published as U.S. Patent Publication 2011/0249077; and U.S. patent application 12/794,775, filed Jun. 6, 2010, now issued as U.S. Pat. No. 8,451,994.

BACKGROUND

Many of today's portable devices, such as smartphones, provide video capture functionality. A user of the portable device can capture both still images and video through a camera on the phone. However, to transmit captured video to another party, the user must generally either send the video directly to the other party or upload the video to another location (e.g., an Internet video hosting site) after the video is done being captured. Unfortunately, this does not allow the other party to view the live video stream as it is captured by the portable device.

In addition, standard portable devices are only equipped with one camera, and processing information from this one camera is difficult enough. An ideal device would have multiple cameras and could send out live video that is a composition of video from at least two cameras. This is an especially difficult problem in light of the limited resources available for portable devices, both in terms of the device processing multiple captured video streams and a network to which the device is connected handling the transmission of the live video streams.

BRIEF SUMMARY

Some embodiments of the invention provide a mobile device with two cameras that can take pictures and videos. The mobile device of some embodiments has a display screen for displaying the captured picture images and video images. It also includes a storage for storing the captured images for later transmission to another device. The device further has a network interface that allows the device to transmit the captured images to one or more devices during a real-time communication session between the users of the devices. The device also includes an encoder that it can use to encode the captured images for local storage or for transmission to another device. The mobile device further includes a decoder that allows the device to decode images captured by another device during a real-time communication session or to decode images stored locally.

One example of a real-time communication session that involves the transmission of the captured video images is a video conference. In some embodiments, the mobile device can only transmit one camera's captured video images at any given time during a video conference. In other embodiments, however, the mobile device can transmit captured video images from both of its cameras simultaneously during a video conference or other real-time communication session.

During a video conference with another device, the mobile device of some embodiments can transmit other types of content along with the video captured by one or both of its cameras. One example of such other content includes low or high resolution picture images that are captured by one of the device's cameras, while the device's other camera is capturing a video that is used in the video conference. Other examples of such other content include (1) files and other content stored on the device, (2) the screen display of the device (i.e., the content that is displayed on the device's screen), (3) content received from another device during a video conference or other real-time communication session, etc.

The mobile devices of some embodiments employ novel in-conference adjustment techniques for making adjustments during a video conference. For instance, while transmitting only one camera's captured video during a video conference, the mobile device of some embodiments can dynamically switch to transmitting a video captured by its other camera. In such situations, the mobile device of some embodiments notifies any other device participating in the video conference of this switch so that this other device can provide a smooth transition on its end between the videos captured by the two cameras.

In some embodiments, the request to switch cameras not only can originate on the "local" device that switches between its cameras during the video conference, but also can originate from the other "remote" device that is receiving the video captured by the local device. Moreover, allowing one device to direct another device to switch cameras is just one example of a remote control capability of the devices of some embodiments. Examples of other operations that can be directed to a device remotely in some embodiments include exposure adjustment operations (e.g., auto-exposure), focus adjustment operations (e.g., auto-focus), etc. Another example of a novel in-conference adjustment that can be specified locally or remotely is the identification of a region of interest (ROI) in a captured video, and the use of this ROI identification to modify the behavior of the capturing camera, to modify the image processing operation of the device with the capturing camera, or to modify the encoding operation of the device with the capturing camera.

Yet another example of a novel in-conference adjustment of some embodiments involves real-time modifications of composite video displays that are generated by the devices. Specifically, in some embodiments, the mobile devices generate composite displays that simultaneously display multiple videos captured by multiple cameras of one or more devices. In some cases, the composite displays place the videos in adjacent display areas (e.g., in adjacent windows). In other cases, the composite display is a picture-in-picture (PIP) display that includes at least two display areas that show two different videos where one of the display areas is a background main display area and the other is a foreground inset display area that overlaps the background main display area.

The real-time modifications of the composite video displays in some embodiments involve moving one or more of the display areas within a composite display in response to a user's selection and movement of the display areas. Some embodiments also rotate the composite display during a video conference, when the screen of the device that provides this composite display rotates. Also, the mobile device of some embodiments allows the user of the device to swap the videos in a PIP display (i.e., to make the video in the foreground inset display appear in the background main display while making the video in the background main display appear in the foreground inset display).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a mobile device with two cameras that can take pictures and videos. Examples of mobile devices include mobile phones, smartphones, personal digital assistants (PDAs), laptops, tablet personal computers, or any other type of mobile computing device. As used in this document, pictures refer to still picture images that are taken by the camera one at a time in a single-picture mode, or several at a time in a fast-action mode. Video, on the other hand, refers to a sequence of video images that are captured by a camera at a particular rate, which is often referred to as a frame rate. Typical frame rates for capturing video are 25 frames per second (fps), 30 fps, and 60 fps. The cameras of the mobile device of some embodiments can capture video images (i.e., video frames) at these and other frame rates.

The mobile device of some embodiments (1) can display the captured picture images and video images, (2) can store the captured images for later transmission to another device, (3) can transmit the captured images to one or more devices during a real-time communication session between the users of the devices, and (4) can encode the captured images for local storage or for transmission to another device.

One example of a real-time communication session that involves the transmission of the captured video images is a video conference. In some embodiments, the mobile device can only transmit one camera's captured video images at any given time during a video conference. In other embodiments, however, the mobile device can transmit captured video images from both of its cameras simultaneously during a video conference or other real-time communication session.

Figure 1:
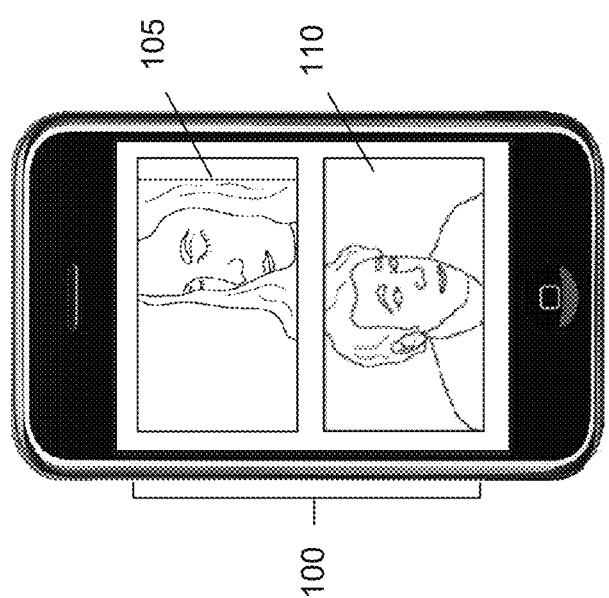
FIG. 1 illustrates a composite display of some embodiments.

The mobile devices of some embodiments generate composite displays that include simultaneous display of multiple videos captured by multiple cameras of one or more devices. In some cases, the composite displays place the videos in adjacent display areas (e.g., in adjacent windows). FIG. 1 illustrates one such example of a composite display 100 that includes two adjacent display areas 105 and 110 that simultaneously display two videos captured by two cameras of one device or captured by two cameras of two different devices that are in a video conference.

Figure 2:
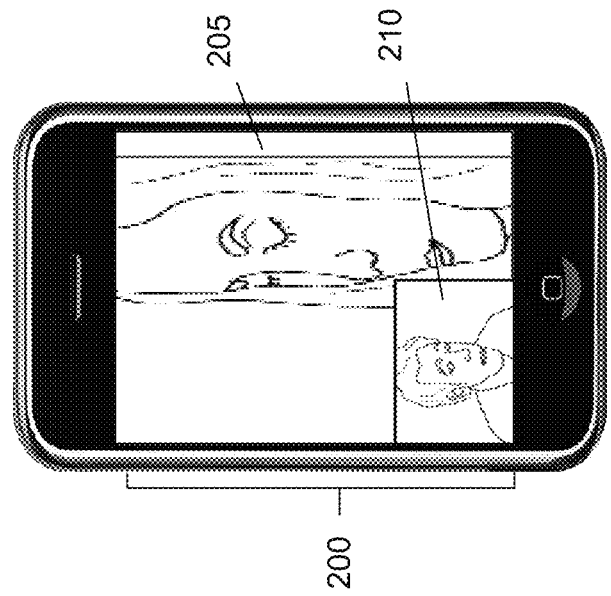
FIG. 2 illustrates another composite display of some embodiments.

In other cases, the composite display is a PIP display that includes at least two display areas that show two different videos, where one of the display areas is a background main display area and the other is a foreground inset display area that overlaps the background main display area. FIG. 2 illustrates one such example of a composite PIP display 200. This composite PIP display 200 includes a background main display area 205 and a foreground inset display area 210 that overlaps the background main display area. The two display areas 205 and 210 simultaneously display two videos captured by two cameras of one device, or captured by two cameras of two different devices that are in a video conference. While the example composite PIP displays illustrated and discussed in this document are similar to the composite PIP display 200, which shows the entire foreground inset display area 210 within the background main display area 205, other composite PIP displays that have the foreground inset display area 210 overlapping, but not entirely inside, the background main display area 205 are possible.

In addition to transmitting video content during a video conference with another device, the mobile device of some embodiments can transmit other types of content along with the conference's video content. One example of such other content includes low or high resolution picture images that are captured by one of the device's cameras, while the device's other camera is capturing a video that is used in the video conference. Other examples of such other content include (1) files and other content stored on the device, (2) the screen display of the device (i.e., the content that is displayed on the device's screen), (3) content received from another device during a video conference or other real-time communication session, etc.

The mobile devices of some embodiments employ novel in-conference adjustment techniques for making adjustments during a video conference. For instance, while transmitting only one camera's captured video during a video conference, the mobile device of some embodiments can dynamically switch to transmitting the video captured by its other camera. In such situations, the mobile device of some embodiments notifies any other device participating in the video conference of this switch so that this other device can provide a smooth transition on its end between the videos captured by the two cameras.

In some embodiments, the request to switch cameras not only can originate on the "local" device that switches between its cameras during the video conference, but also can originate from the other "remote" device that is receiving the video captured by the local device. Moreover, allowing one device to direct another device to switch cameras is just one example of a remote control capability of the devices of some embodiments. Examples of other operations that can be directed to a device remotely in some embodiments include exposure adjustment operations (e.g., auto-exposure), focus adjustment operations (e.g., auto-focus), etc. Another example of a novel in-conference adjustment that can be specified locally or remotely is the identification of a region of interest (ROI) in a captured video, and the use of this ROI identification to modify the behavior of the capturing camera, to modify the image processing operation of the device with the capturing camera, or to modify the encoding operation of the device with the capturing camera.

Yet another example of a novel in-conference adjustment of some embodiments involves real-time modifications of composite video displays that are generated by the devices. Specifically, in some embodiments, the real-time modifications of the composite video displays involve moving one or more of the display areas within a composite display in response to a user's selection and movement of the display areas. Some embodiments also rotate the composite display during a video conference, when the screen of the device that provides this composite display rotates. Also, the mobile device of some embodiments allow the user of the device to flip the order of videos in a PIP display (i.e., to make the video in the foreground inset display appear in the background main display, while making the video in the background main display appear in the foreground inset display).

Several more detailed embodiments are described below. Section I provides a description of the video processing architecture of some embodiments. Section II then describes the captured image processing unit of some embodiments. In some embodiments, this unit is the component of the device that is responsible for processing raw images captured by the cameras of the device.

Next, Section III describes the video conferencing architecture of some embodiments. This section also describes the video conference module of some embodiments, as well as several manners for setting up a single camera video conference. Section IV then describes in-conference adjustment and control operations of some embodiments. Section V next describes the hardware architecture of the dual camera device of some embodiments. Lastly, U.S. patent application Ser. No. 12/794,766, now issued as U.S. Pat. No. 8,744,420, entitled "Establishing a Video Conference During a Phone Call," filed concurrently with the present application, describes several additional embodiments relating to some of the features described above, such as some of the in-conference adjustments, etc., and is incorporated herein by reference.

I. VIDEO CAPTURE AND PROCESSING

Figure 3:
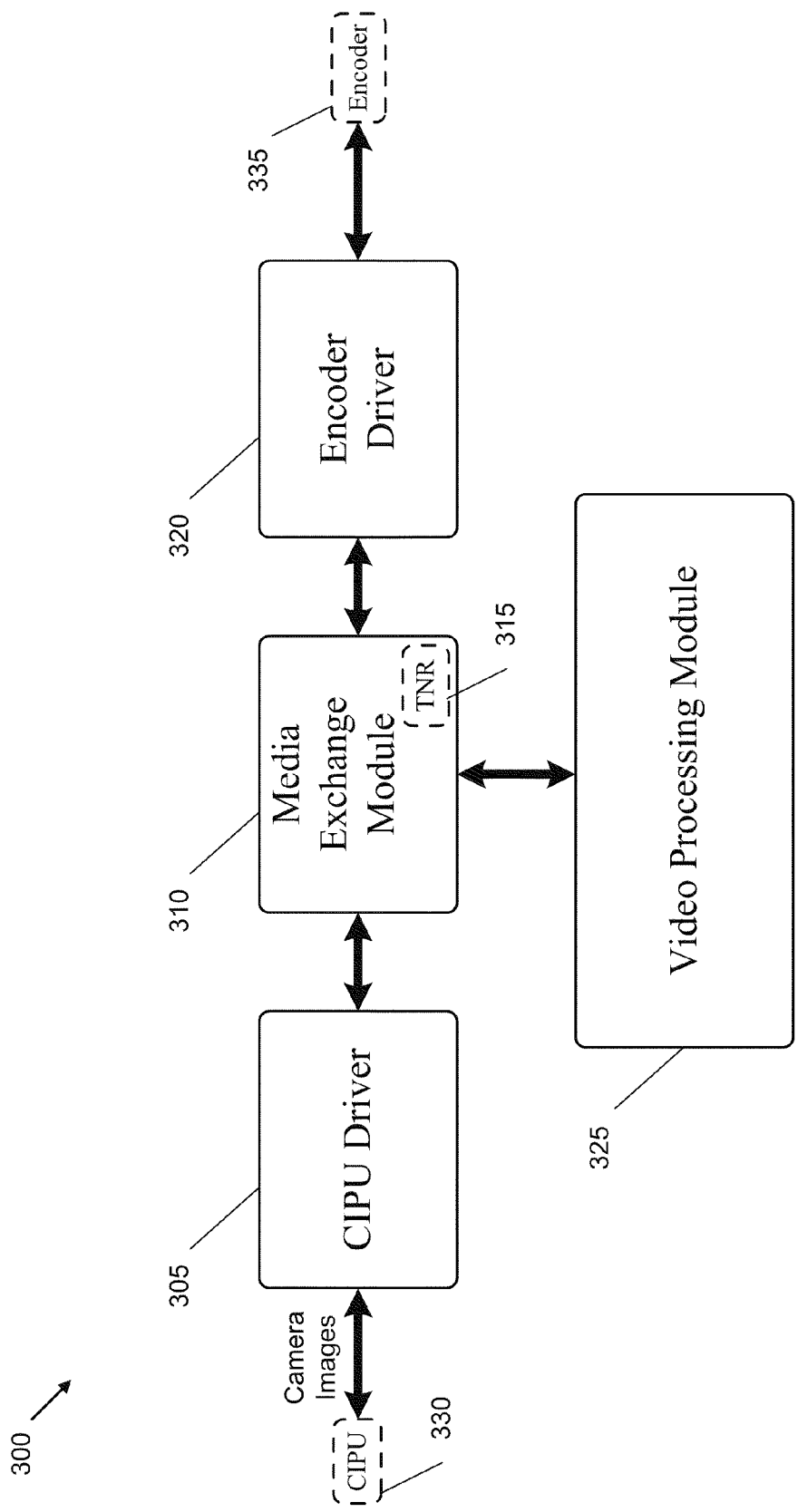
FIG. 3 conceptually illustrates a software architecture for a video processing and encoding module of a dual camera mobile device of some embodiments.

FIG. 3 conceptually illustrates a video processing and encoding module 300 of a dual camera mobile device of some embodiments. In some embodiments, the module 300 processes images and encodes videos that are captured by the cameras of the dual camera mobile device. As shown in FIG. 3, this module 300 includes a captured image processing unit (CIPU) driver 305, a media exchange module 310, an encoder driver 320, and a video processing module 325.

In some embodiments, the media exchange module 310 allows programs on the device that are consumers and producers of media content to exchange media content and instructions regarding the processing of the media content. In the video processing and encoding module 300, the media exchange module 310 of some embodiments routes instructions and media content between the video processing module 325 and the CIPU driver 305, and between the video processing module 325 and the encoder driver 320. To facilitate the routing of such instructions and media content, the media exchange module 310 of some embodiments provides a set of application programming interfaces (APIs) for the consumers and producers of media content to use. In some of such embodiments, the media exchange module 310 is a set of one or more frameworks that is part of an operating system running on the dual camera mobile device. One example of such a media exchange module 310 is the Core Media framework provided by Apple Inc.

The video processing module 325 performs image processing on the images and/or the videos captured by the cameras of the device. Examples of such operations include exposure adjustment operations, focus adjustment operations, perspective correction, dynamic range adjustment, image resizing, image compositing, etc. In some embodiments, some image processing operations can also be performed by the media exchange module 310. For instance, as shown in FIG. 3, the media exchange module 310 of some embodiments performs a temporal noise reduction (TNR) operation (e.g., by TNR 315) that reduces noise in video images captured by the cameras of the device. Further examples of such image processing operations of the video processing module 325 and the media exchange module 310 will be provided below.

Through the media exchange module 310, the video processing module 325 interfaces with the CIPU driver 305 and the encoder driver 320, as mentioned above. The CIPU driver 305 serves as a communication interface between a captured image processing unit (CIPU) 330 and the media exchange module 310. As further described below, the CIPU 330 is the component of the dual camera device that is responsible for processing images captured during image capture or video capture operations of the device's cameras. From the video processing module 325 through the media exchange module 310, the CIPU driver 305 receives requests for images and/or videos from one or both of the device's cameras. The CIPU driver 305 relays such requests to the CIPU 330, and in response receives the requested images and/or videos from the CIPU 330, which the CIPU driver 305 then sends to the video processing module 325 through the media exchange module 310. Through the CIPU driver 305 and the media exchange module 310, the video processing module 325 of some embodiments also sends instructions to the CIPU 330 in order to modify some of its operations (e.g., to modify a camera's frame rate, exposure adjustment operation, focus adjustment operation, etc.).

The encoder driver 320 serves as a communication interface between the media exchange module 310 and an encoder hardware 335 (e.g., an encoder chip, an encoding component on a system on chip, etc.). In some embodiments, the encoder driver 320 receives images and requests to encode the images from the video processing module 325 through the media exchange module 310. The encoder driver 320 sends the images to be encoded to the encoder 335, which then performs picture encoding or video encoding on the images. When the encoder driver 320 receives encoded images from the encoder 335, the encoder driver 320 sends the encoded images back to the video processing module 325 through the media exchange module 310.

In some embodiments, the video processing module 325 can perform different operations on the encoded images that it receives from the encoder. Examples of such operations include storing the encoded images in a storage of the device, transmitting the encoded images in a video conference through a network interface of the device, etc.

In some embodiments, some or all of the modules of the video processing and encoding module 300 are implemented as part of an operating system. For example, some embodiments implement all four components 305, 310, 320, and 325 of this module 300 as part of the operating system of the device. Other embodiments implement the media exchange module 310, the CIPU driver 305, and the encoder driver 320 as part of the operating system of the device, while having the video processing module 325 as an application that runs on the operating system. Still, other implementations of the module 300 are possible.

The operation of the video processing and encoding module 300 during a video capture session will now be described. To start a video capture session, the video processing module 325 initializes several components that are needed for the video capture session. In some embodiments, these components include (1) the CIPU 330, (2) a scaling and compositing module (not shown) of the video processing module 325, (3) an image processing module (not shown) of the video processing module 325, and (4) the encoder 335. Also, the video processing module 325 of some embodiments initializes a network manager (not shown) when it is participating in a video conference.

Through the media exchange module 310 and the CIPU driver 305, the video processing module sends its initialization request to the CIPU 330, in order to have one or both of the cameras of the device start video capturing. In some embodiments, this request specifies a particular frame rate, exposure level, and scaling size for each camera that needs to capture a video. In response to this request, the CIPU 330 starts to return video images from the requested cameras at the specified rate(s), exposure level(s), and scaling size(s). These video images are returned to the video processing module 325 through the CIPU driver 305 and the media exchange module 310, which, as mentioned above, performs TNR operations on the video images before supplying them to the video processing module 325. At the video processing module 325, the video images are stored in a buffer (not shown) for additional image processing.

The image processing module of the video processing module 325 retrieves the video images stored in the buffer for additional video processing. The scaling and compositing module then retrieves the processed video images in order to scale them if necessary for real time display on the display screen of the device. In some embodiments, this module creates composite images from the images captured by two cameras of the device or from images captured by the camera(s) of the device along with the camera(s) of another device during a video conference in order to provide a real-time display of the captured video images on the device or to create a composite video image for encoding.

The processed and/or composited video images are supplied to the encoder 335 through the encoder driver 320 and the media exchange module 310. The encoder 335 then encodes the video images. The encoded images are then returned to the video processing module 325 (again through the encoder driver 320 and the media exchange module 310) for storage on the device or for transmission during a video conference. When the device is participating in a video conference, the network manager (that was initialized by the video processing module 325) then retrieves these encoded images, packetizes them and transmits them to one or more other devices through a network interface (not shown) of the device.

II. CAPTURED IMAGE PROCESSING

The images captured by cameras of the dual camera mobile device of some embodiments are raw, unprocessed images. These images require conversion to a particular color space before the images can be used for other operations such as transmitting the images to another device (e.g., during a video conference), storing the images, or displaying the images. In addition, the images captured by the cameras may need to be processed to correct errors and/or distortions and to adjust the images' color, size, etc. Accordingly, some embodiments perform several processing operations on the images before storing, transmitting, and displaying such images. Part of the processing of such images is performed by the CIPU 330.

Figure 4:
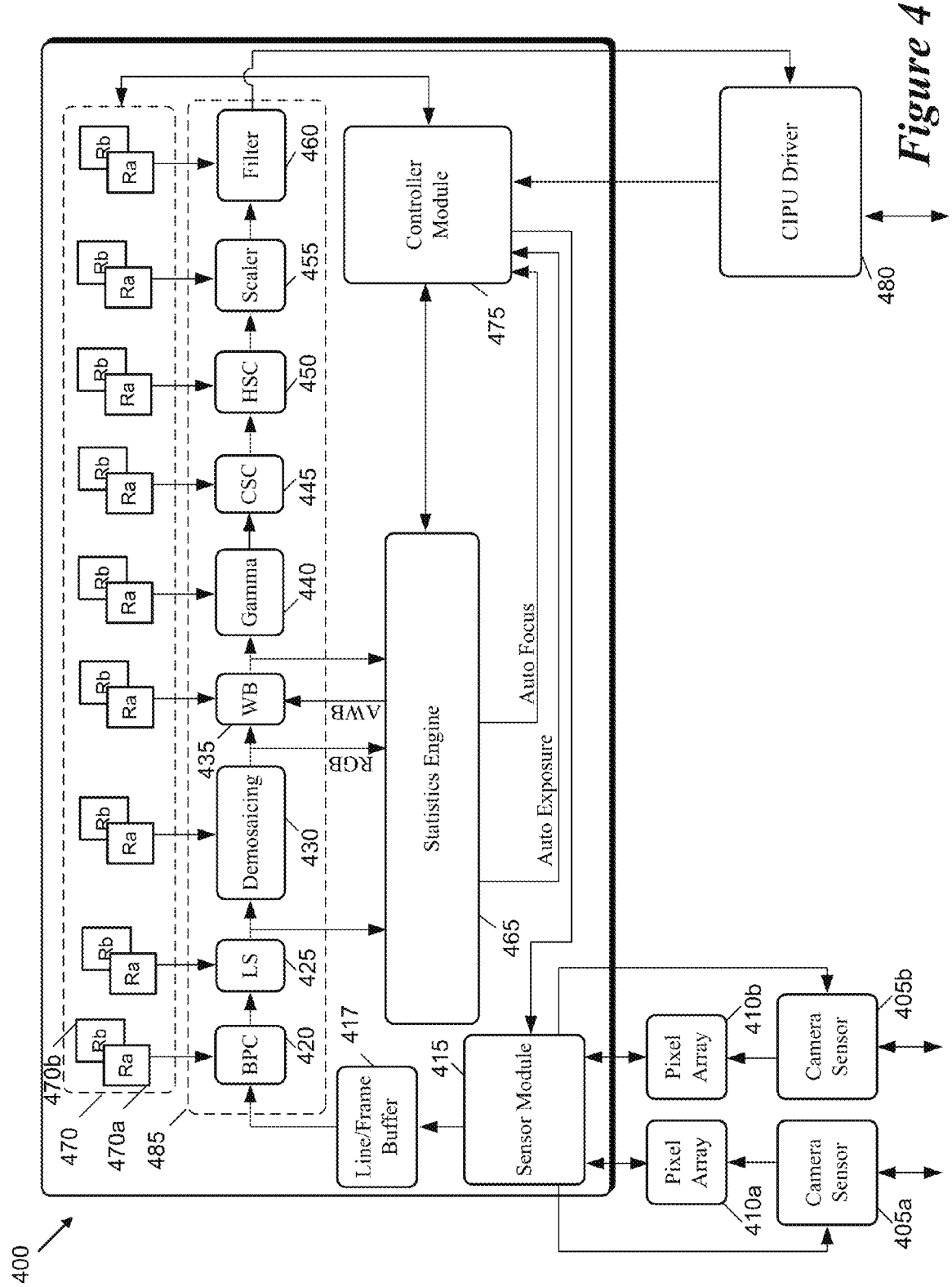
FIG. 4 conceptually illustrates a captured image processing unit of some embodiments.

One example of such a CIPU is illustrated in FIG. 4. Specifically, this figure conceptually illustrates a captured image processing unit (CIPU) 400 of some embodiments. This CIPU 400 includes a single processing pipeline 485 that either processes images from only one of the device's cameras at a time, or processes images from both of the device's cameras simultaneously in a time-division multiplex fashion (i.e., in a time interleaved manner). The CIPU 400's processing pipeline 485 can be configured differently to address differing characteristics and/or operational settings of the different cameras. Examples of different camera characteristics in some embodiments include different resolutions, noise sensors, lens types (fixed or zoom lens), etc. Also, examples of different operational settings under which the device can operate the cameras in some embodiments include image resolution size, frame rate, zoom level, exposure level, etc.

As shown in FIG. 4, the CIPU 400 includes a sensor module 415, a line/frame buffer 417, a bad pixel correction (BPC) module 420, a lens shading (LS) module 425, a demosaicing module 430, a white balance (WB) module 435, a gamma module 440, a color space conversion (CSC) module 445, a hue, saturation, and contrast (HSC) module 450, a scaler module 455, a filter module 460, a statistics engine 465, two sets of registers 470, and a controller module 475. In some embodiments, all of the modules of the CIPU 400 are implemented in hardware (e.g., an ASIC, FPGA, a SOC with a microcontroller, etc.), while in other embodiments, some or all of the modules of the CIPU 400 are implemented in software.

As shown in FIG. 4, the sensor module 415 communicatively couples to two pixel arrays 410*a* and 410*b* and two sets of sensors 405*a* and 405*b* of two cameras of the device. In some embodiments, this communicative coupling is facilitated through each camera sensor's mobile industry processor interface (MIPI).

Through this communicative coupling, the sensor module 415 can forward instructions to the cameras to control various aspects of each camera's operations such as its power level, zoom level, focus, exposure level, etc. In some embodiments, each camera has four operational power modes. In the first operational power mode, the camera is powered off. For the second operational power mode, the camera is powered on, but it is not yet configured. In the third operational power mode, the camera is powered on, the camera's sensor is configured, and the camera sensor's pixels are collecting photons and converting the collected photons to digital values. However, the camera sensor is not yet sending images to the sensor module 415. Finally, in the fourth operational power mode, the camera is in the same operational power mode as the third power mode except the camera is now sending images to the sensor module 415.

During the operation of the device, the cameras may switch from one operational power mode to another any number of times. When switching operational power modes, some embodiments require the cameras to switch operational power modes in the order described above. Therefore, in those embodiments, a camera in the first operational power mode can only switch to the second operational power mode. When the camera is in the second operational power mode, it can switch to the first operational power mode or to the third operational power mode. Similarly, the camera can switch from the third operational power mode to the second operational power mode or the fourth operation power mode. When the camera is in the fourth operational power mode, it can only switch back to the third operational power mode.

Moreover, switching from one operational power mode to the next or the previous operational power mode takes a particular amount of time. Thus, switching between two or three operational power modes is slower than switching between one operational power mode. The different operational power modes also consume different amounts of power. For instance, the fourth operational power mode consumes the most amount of power, the third operational power mode consumes more power than the first and second, and the second operational power mode consumes more than the first. In some embodiments, the first operational power mode does not consume any power.

When a camera is not in the fourth operational power mode capturing images, the camera may be left in one of the other operational power modes. Determining the operational mode in which to leave the unused camera depends on how much power the camera is allowed to consume and how fast the camera may need to respond to a request to start capturing images. For example, a camera configured to operate in the third operational power mode (e.g., standby mode) consumes more power than a camera configured to be in the first operational power mode (i.e., powered off). However, when the camera is instructed to capture images, the camera operating in the third operational power mode can switch to the fourth operational power mode faster than the camera operating in the first operational power mode. As such, the cameras can be configured to operate in the different operational power modes when not capturing images based on different requirements (e.g., response time to a request to capture images, power consumption).

Through its communicative coupling with each camera, the sensor module 415 can direct one or both sets of camera sensors to start capturing images when the video processing module 325 requests one or both cameras to start capturing images and the sensor module 415 receives this request through the controller module 475, as further described below. Bayer filters are superimposed over each of the camera sensors and thus each camera sensor outputs Bayer pattern images, which are stored in the pixel array associated with each camera sensor. A Bayer pattern image is an image where each pixel only stores one color value: red, blue, or green.

Through its coupling with the pixel arrays 410a and 410b, the sensor module 415 retrieves raw Bayer pattern images stored in the camera pixel arrays 410a and 410b. By controlling the rate at which the sensor module 415 retrieves images from a camera's pixel array, the sensor module 415 can control the frame rate of the video images that are being captured by a particular camera. By controlling the rate of its image retrieval, the sensor module 415 can also interleave the fetching of images captured by the different cameras in order to interleave the CIPU processing pipeline 485's image processing of the captured images from the different cameras. The sensor module 415's control of its image retrieval is further described below and in the above-incorporated U.S. patent application Ser. No. 12/794,766, now issued as U.S. Pat. No. 8,744,420, entitled "Establishing a Video Conference During a Phone Call,".

The sensor module 415 stores image lines (i.e., rows of pixels of an image) in the line/frame buffer 417, which the sensor module 415 retrieves from the pixel arrays 410a and 410b. Each image line in the line/frame buffer 417 is processed through the CIPU processing pipeline 485. As shown in FIG. 4, the CIPU processing pipeline 485 is formed by the BPC module 420, the LS module 425, the demosaicing module 430, the WB module 435, the gamma module 440, the CSC module 445, the HSC module 450, the scaler module 455, and the filter module 460. In some embodiments, the CIPU processing pipeline 485 processes images from the line/frame buffer 417 on a line-by-line (i.e., row-by-row) basis while in other embodiments the CIPU processing pipeline 485 processes entire images from the line/frame buffer 417 on a frame-by-frame basis.

In the exemplary pipeline illustrated in FIG. 4, the BPC module 420 is the module that retrieves the images from the line/frame buffer 417. This module performs a bad-pixel removal operation that attempts to correct bad pixels in the retrieved images that might have resulted from one or more of the camera sensors being defective (e.g., the defective photo sensors do not sense light at all, sense light incorrectly, etc.). In some embodiments, the BPC module 420 detects bad pixels by comparing a particular pixel in an image with one or more neighboring pixels in the image. If the difference between the value of the particular pixel and the values of the neighboring pixels is greater than a threshold amount, the particular pixel's value is replaced by the average of several neighboring pixel's values that are of the same color (i.e., red, green, and blue) as the particular pixel.

The operation of the BPC module 420 is in part controlled by the values stored for this module in the two sets of registers 470 of the CIPU 400. Specifically, to process the images captured by the two different cameras of the device, some embodiments configure the CIPU processing pipeline 485 differently for each camera, as mentioned above. The CIPU processing pipeline 485 is configured for the two different cameras by storing two different sets of values in the two different sets of registers 470a (Ra) and 470b (Rb) of the CIPU 400. Each set of registers 470 includes one register (Ra or Rb) for each of the modules 420-460 within the CIPU processing pipeline 485. Each register in each register set stores a set of values that defines one processing pipeline module's operation. Accordingly, as shown in FIG. 4, the register set 470a is for indicating the mode of operation of each processing pipeline module for one camera (camera A) of the dual camera mobile device, while the register set 470b is for indicating the mode of operation of each module for the other camera (camera B) of the dual camera mobile device.

One example of configuring the CIPU processing pipeline 485 differently for each camera is to configure the modules of the CIPU processing pipeline 485 to process different sized images. For instance, if the camera sensor 405a is 640×480 pixels and the camera sensor 405b is 2048×1536 pixels, the set of registers 470a is configured to store values that instruct the modules of the CIPU processing pipeline 485 to process 640×480 pixel images and the set of registers 470b is configured to store values that instruct the modules of the CIPU processing pipeline 485 to process 2048×1536 pixel images.

In some embodiments, different processing pipeline configurations (i.e., register values) are stored in different profile settings. In some of such embodiments, a user of the mobile device is allowed to select one of the profile settings (e.g., through a user interface displayed on the mobile device) to set the operation of a camera(s). For example, the user may select a profile setting for configuring a camera to capture high resolution video, a profile setting for configuring the same camera to capture low resolution video, or a profile setting for configuring both cameras to capture high resolution still images. Different configurations are possible, which can be stored in many different profile settings. In other of such embodiments, instead of allowing the user to select a profile setting, a profile setting is automatically selected based on which application or activity the user selects. For instance, if the user selects a video conferencing application, a profile that configures both cameras to capture video is automatically selected, if the user selects a photo application, a profile that configures one of the cameras to capture still images is automatically selected, etc.

After the BPC module 420, the LS module 425 receives the bad-pixel-corrected images. The LS module 425 performs a lens shading correction operation to correct for image defects that are caused by camera lenses that produce light falloff effects (i.e., light is reduced towards the edges of the camera sensor). Such effects cause images to be unevenly illuminated (e.g., darker at corners and/or edges). To correct these image defects, the LS module 425 of some embodiments estimates a mathematical model of a lens' illumination fall-off. The estimated model is then used to compensate the lens fall-off of the image to evenly illuminate unevenly illuminated portions of the image. For example, if a corner of the image is half the brightness of the center of the image, the LS module 425 of some embodiments multiplies the corner pixels value by two in order to produce an even image.

The demosaicing module 430 performs a demosaicing operation to generate full color images from images of sampled colors. As noted above, the camera sensors output Bayer pattern images, which are incomplete because each pixel of a Bayer pattern image stores only one color value. The demosaicing module 430 reconstructs a red, green, blue (RGB) image from a Bayer pattern image by interpolating the color values for each set of colors in the Bayer pattern image.

The WB module 435 performs a white balance operation on the RGB images received from the demosaicing module 430 so that the colors of the content of the images are similar to the colors of such content perceived by the human eye in real life. The WB module 435 adjusts the white balance by adjusting colors of the images to render neutral colors (e.g., gray, white, etc.) correctly. For example, an image of a piece of white paper under an incandescent light may appear yellow whereas the human eye perceives the piece of paper as white. To account for the difference between the color of the images that the sensor captures and what the human eye perceives, the WB module 435 adjusts the color values of the image so that the captured image properly reflects the colors perceived by the human eye.

The statistics engine 465 collects image data at various stages of the CIPU processing pipeline 485. For example, FIG. 4 shows that the statistics engine 465 collects image data after the LS module 425, the demosaicing module 430, and the WB module 435. Different embodiments collect data from any number of different stages of the CIPU processing pipeline 485. The statistics engine 465 processes the collected data, and, based on the processed data, adjusts the operations of the camera sensors 405a and 405b through the controller module 475 and the sensor module 415. Examples of such operations include exposure and focus. Although FIG. 4 shows the statistics engine 465 controlling the camera sensors 405a and 405b through the controller module 475, other embodiments of the statistics engine 465 control the camera sensors through just the sensor module 415.

The processed data can also be used to adjust the operations of various modules of the CIPU 400. For instance, the statistics engine 465 of some embodiments adjusts the operations of the WB module 435 based on data collected after the WB module 435. In some of such embodiments, the statistics engine 465 provides an automatic white balance (AWB) function by using the processed data to adjust the white balancing operation of the WB module 435. Other embodiments can use processed data collected from any number of stages of the CIPU processing pipeline 485 to adjust the operations of any number of modules within the CIPU processing pipeline 485. Further, the statistics engine 465 can also receive instructions from the controller module 475 to adjust the operations of one or more modules of the CIPU processing pipeline 485.

After receiving the images from the WB module 435, the gamma module 440 performs a gamma correction operation on the image to code and decode luminance or tristimulus values of the camera system. The gamma module 440 of some embodiments corrects gamma by converting a 10-12 bit linear signal into an 8 bit non-linear encoding in order to correct the gamma of the image. Some embodiments correct gamma by using a lookup table.

The CSC module 445 converts the image received from the gamma module 440 from one color space to another color space. Specifically, the CSC module 445 converts the image from an RGB color space to a luminance and chrominance (YUV) color space. However, other embodiments of the CSC module 445 can convert images from and to any number of color spaces.

The HSC module 450 may adjust the hue, saturation, contrast, or any combination thereof of the images received from the CSC module 445. The HSC module 450 may adjust these properties to reduce the noise or enhance the images, for example. For instance, the saturation of images captured by a low-noise camera sensor can be increased to make the images appear more vivid. In contrast, the saturation of images captured by a high-noise camera sensor can be decreased to reduce the color noise of such images.

After the HSC module 450, the scaler module 455 may resize images to adjust the pixel resolution of the image or to adjust the data size of the image. The scaler module 455 may also reduce the size of the image in order to fit a smaller display, for example. The scaler module 455 can scale the image a number of different ways. For example, the scaler module 455 can scale images up (i.e., enlarge) and down (i.e., shrink). The scaler module 455 can also scale images proportionally or scale images anamorphically.

The filter module 460 applies one or more filter operations to images received from the scaler module 455 to change one or more attributes of some or all pixels of an image. Examples of filters include a low-pass filter, a high-pass filter, a band-pass filter, a bilateral filter, a Gaussian filter, among other examples. As such, the filter module 460 can apply any number of different filters to the images.

The controller module 475 of some embodiments is a microcontroller that controls the operation of the CIPU 400. In some embodiments, the controller module 475 controls (1) the operation of the camera sensors (e.g., exposure level) through the sensor module 415, (2) the operation of the CIPU processing pipeline 485, (3) the timing of the CIPU processing pipeline 485 (e.g., when to switch camera sensors, when to switch registers, etc.), and (4) a flash/strobe (not shown), which is part of the dual camera mobile device of some embodiments.

Some embodiments of the controller module 475 process instructions received from the statistics engine 465 and the CIPU driver 480. In some embodiments, the instructions received from the CIPU driver 480 are instructions from the dual camera mobile device (i.e., received from the local device) while in other embodiments the instructions received from the CIPU driver 480 are instructions from another device (e.g., remote control during a video conference). Based on the processed instructions, the controller module 475 can adjust the operation of the CIPU 400 by programming the values of the registers 470. Moreover, the controller module 475 can dynamically reprogram the values of the registers 470 during the operation of the CIPU 400.

As shown in FIG. 4, the CIPU 400 includes a number of modules in the CIPU processing pipeline 485. However, one of ordinary skill will realize that the CIPU 400 can be implemented with just a few of the illustrated modules or with additional and different modules. In addition, the processing performed by the different modules can be applied to images in sequences different from the sequence illustrated in FIG. 4.

An example operation of the CIPU 400 will now be described by reference to FIG. 4. For purposes of explanation, the set of registers Ra is used for processing images captured by camera sensor 405a of the dual camera mobile device and the set of registers Rb is used for processing images captured by camera sensor 405b of the dual camera mobile device. The controller module 475 receives instructions from the CIPU driver 480 to produce images captured by one of the cameras of the dual camera mobile device.

The controller module 475 then initializes various modules of the CIPU processing pipeline 485 to process images captured by one of the cameras of the dual camera mobile device. In some embodiments, this includes the controller module 475 checking that the correct set of registers of the registers 470 are used. For example, if the CIPU driver 480 instructs the controller module 475 to produce images captured by the camera sensor 405a, the controller module 475 checks that the set of registers Ra is the set of registers from which the modules of the CIPU 400 read. If not, the controller module 475 switches between the sets of registers so that the set of registers Ra is the set that is read by the modules of the CIPU 400.

For each module in the CIPU processing pipeline 485, the mode of operation is indicated by the values stored in the set of registers Ra. As previously mentioned, the values in the set of registers 470 can be dynamically reprogrammed during the operation of the CIPU 400. Thus, the processing of one image can differ from the processing of the next image. While the discussion of this example operation of the CIPU 400 describes each module in the CIPU 400 reading values stored in registers to indicate the mode of operation of the modules, in some software-implemented embodiments, parameters are instead passed to the various modules of the CIPU 400.

In some embodiments, the controller module 475 initializes the sensor module 415 by instructing the sensor module 415 to delay a particular amount of time after retrieving an image from the pixel array 410a. In other words, the controller module 475 instructs the sensor module 415 to retrieve the images from the pixel array 410a at a particular rate.

Next, the controller module 475 instructs the camera sensor 405a through the sensor module 415 to capture images. In some embodiments, the controller module 475 also provides exposure and other camera operation parameters to the camera sensor 405a. In other embodiments, the camera sensor 405a uses default values for the camera sensor operation parameters. Based on the parameters, the camera sensor 405a captures a raw image, which is stored in the pixel array 410a. The sensor module 415 retrieves the raw image from the pixel array 410a and sends the image to the line/frame buffer 417 for storage before the CIPU processing pipeline 485 processing the image.

Under certain circumstances, images may be dropped by the line/frame buffer 417. When the camera sensors 405a and/or 405b are capturing images at a high rate, the sensor module 415 may receive and store images in the line/frame buffer 417 faster than the BPC module 420 can retrieve the images from the line/frame buffer 417 (e.g., capturing high frame-rate video), and the line/frame buffer 417 will become full. When this happens, the line/frame buffer 417 of some embodiments drops images (i.e., frames) based on a first in, first out basis. That is, when the line/frame buffer 417 drops an image, the line/frame buffer 417 drops the image that was received before all the other images in the line/frame buffer 417.

The processing of the image by the CIPU processing pipeline 485 starts by the BPC module 420 retrieving the image from the line/frame buffer 417 to correct any bad pixels in the image. The BPC module 420 then sends the image to the LS module 425 to correct for any uneven illumination in the image. After the illumination of the image is corrected, the LS module 425 sends the image to the demosaicing module 430 where it processes the raw image to generate an RGB image from the raw image. Next, the WB module 435 receives the RGB image from the demosaicing module 430 and adjusts the white balance of the RGB image.

As noted above, the statistics engine 465 may have collected some data at various points of the CIPU processing pipeline 485. For example, the statistics engine 465 collects data after the LS module 425, the demosaicing module 430, and the WB module 435 as illustrated in FIG. 4. Based on the collected data, the statistics engine 465 may adjust the operation of the camera sensor 405a, the operation of one or more modules in the CIPU processing pipeline 485, or both, in order to adjust the capturing of subsequent images from the camera sensor 405a. For instance, based on the collected data, the statistics engine 465 may determine that the exposure level of the current image is too low and thus instruct the camera sensor 405a through the sensor module 415 to increase the exposure level for subsequently captured images. Thus, the statistics engine 465 of some embodiments operates as a feedback loop for some processing operations.

After the WB module 435 adjusts the white balance of the image, it sends the image to the gamma module 440 for gamma correction (e.g., adjusting the gamma curve of the image). The CSC module 445 receives the gamma-corrected image from the gamma module 440 and performs color space conversion. In this example, the CSC module 445 converts the RGB image to a YUV image. In other words, the CSC module 445 converts an image that is represented in an RGB color space to an image that is represented in a YUV color space. The HSC module 450 receives the YUV image from the CSC module 445 and adjusts the hue, saturation, and contrast attributes of various pixels in the image. After the HSC module 450, the scaler module 455 resizes the image (e.g., enlarging or shrinking the image). The filter module 460 applies one or more filters on the image after receiving the image from the scaler module 455. Finally, the filter module 460 sends the processed image to the CIPU driver 480.

In this example of the operation of the CIPU 400 described above, each module in the CIPU processing pipeline 485 processed the image in some manner. However, other images processed by the CIPU 400 may not require processing by all the modules of the CIPU processing pipeline 485. For example, an image may not require white balance adjustment, gamma correction, scaling, or filtering. As such, the CIPU 400 can process images any number of ways based on a variety of received input such as instructions from the CIPU driver 480 or data collected by the statistic engine 465, for example.

Different embodiments control the rate at which images are processed (i.e., frame rate) differently. One manner of controlling the frame rate is through manipulation of vertical blanking intervals (VBI). For some embodiments that retrieve image lines for processing images on a line-by-line basis, a VBI is the time difference between retrieving the last line of an image of a video captured by a camera of the dual camera mobile device from a pixel array and retrieving the first line of the next image of the video from the pixel array. In other embodiments, a VBI is the time difference between retrieving one image of a video captured by a camera of the dual camera mobile device from a pixel array and retrieving the next image of the video the pixel array.

One example where VBI can be used is between the sensor module 415 and the pixel arrays 410a and 410b. For example, some embodiments of the sensor module 415 retrieve images from the pixel arrays 410a and 410b on a line-by-line basis and other embodiments of the sensor module 415 retrieve images from the pixel arrays 410a and 410b on an image-by-image basis. Thus, the frame rate can be controlled by adjusting the VBI of the sensor module 415: increasing the VBI reduces the frame rate and decreasing the VBI increases the frame rate.

Figure 5:
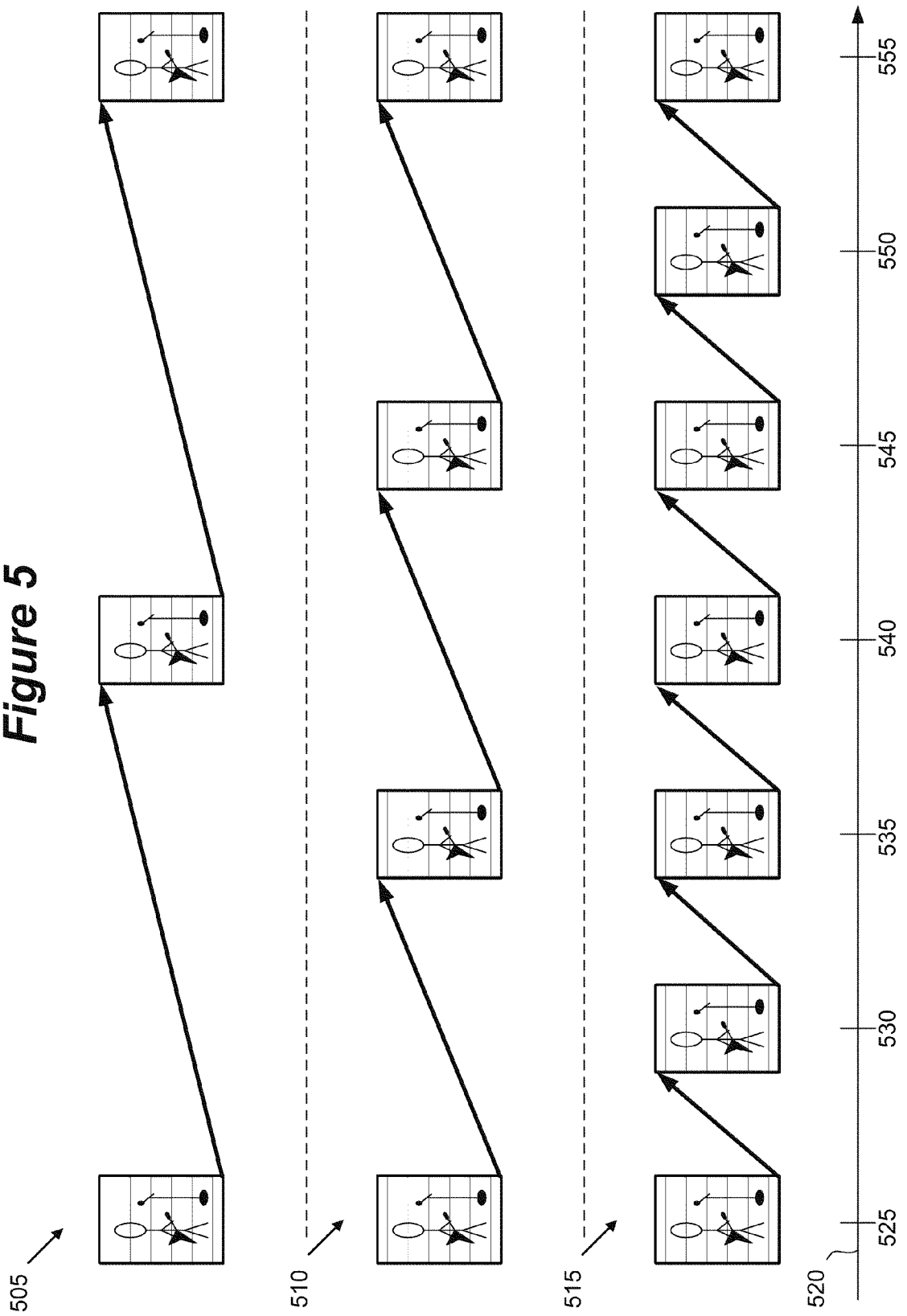
FIG. 5 conceptually illustrates examples of different frame rates based on different vertical blanking intervals (VBIs).

FIG. 5 conceptually illustrates examples of different frame rates 505, 510, and 515 based on different VBIs. Each sequence shows an image, which is captured by one of the cameras of the dual camera mobile device, of a person holding a guitar at various time instances 525-555 along timeline 520. In addition, the time between each time instance 525-555 is the same and will be referred to as one time unit. For purposes of explanation, FIG. 5 will now be described by reference to the sensor module 415 and the pixel array 410a of FIG. 4. As such, each image represents a time instance along the timeline 520 at which the sensor module 415 retrieves an image from the pixel array 410a.

In the example frame rate 505, the VBI of the sensor module 415 for the pixel array 410a is set to three time units (e.g., by the controller module 475). That is, the sensor module 415 retrieves an image from the pixel array 410a every third time instance along the timeline 520. As shown in the example frame rate 505, the sensor module 415 retrieves an image at the time instances 525, 540, and 555. Thus, the example frame rate 505 has a frame rate of one image per three time units.

The example frame rate 510 is similar to the example frame rate 505 except the VBI is set to two time units. Thus, the sensor module 415 retrieves an image from the pixel array 410a every second time instance along the timeline 520. The example frame rate 510 shows the sensor module 415 retrieving an image from the pixel array 410a at the time instances 525, 535, 545, and 555. Since the VBI of the example frame rate 510 is less than the VBI of the example frame rate 505, the frame rate of the example frame rate 510 is higher than the frame rate of the example frame rate 505.

The example frame rate 515 is also similar to the example frame rate 505 except the VBI of the sensor module 415 for the pixel array 410a is set to one time unit. Therefore, the sensor module 415 is instructed to retrieve an image from the pixel array 410a every time instance along the timeline 520. As illustrated, the sensor module 415 retrieves an image from the pixel array 410a at the time instances 525-555. The VBI of the example frame rate 515 is less than the VBIs of the example frame rates 505 and 510. Therefore, the frame rate of the example frame rate 515 is higher than the example frame rates 505 and 510.

III. VIDEO CONFERENCING

A. Video Conference Architecture

Figure 6:
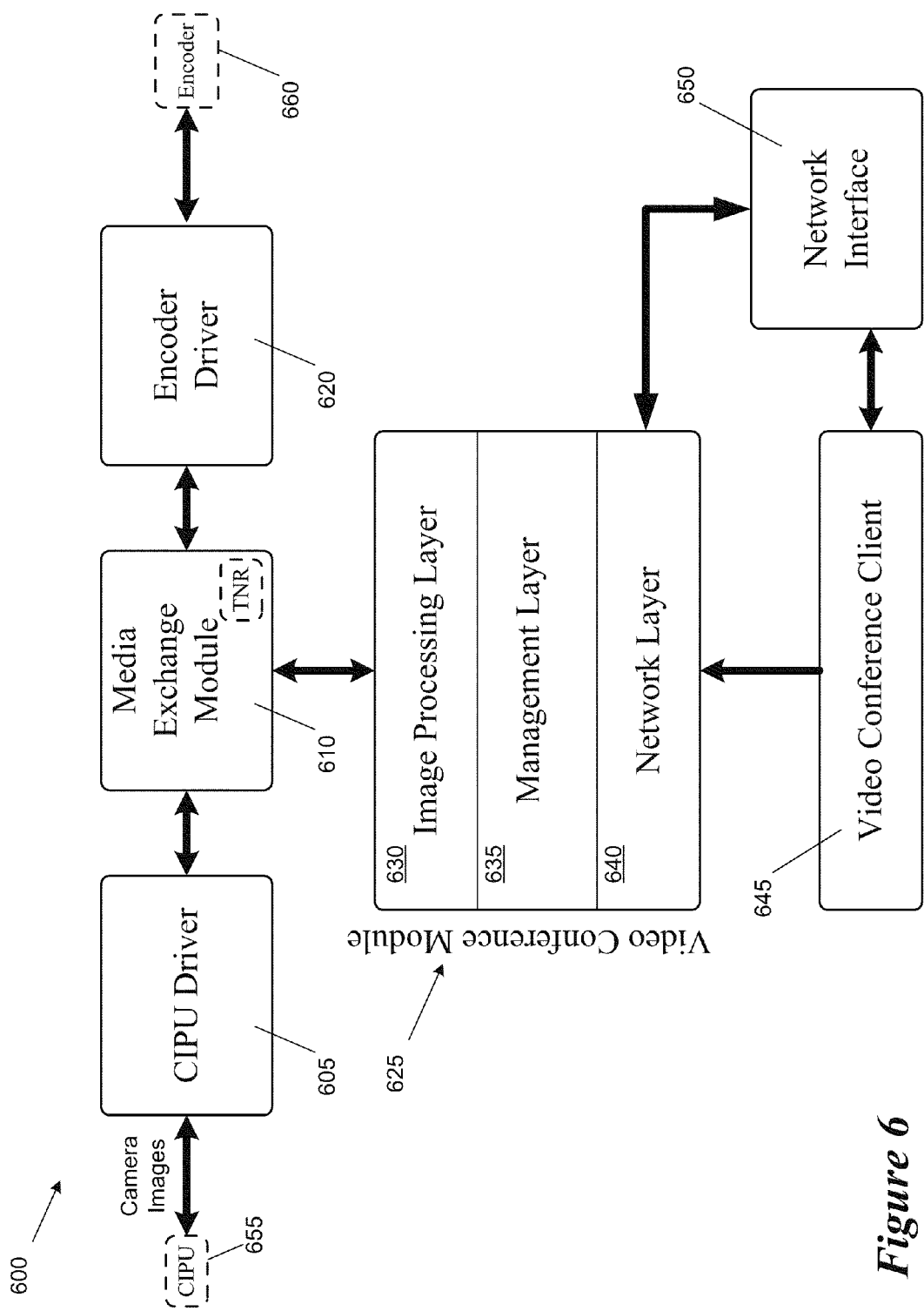
FIG. 6 conceptually illustrates a software architecture for a video conferencing and processing module of a dual camera mobile device of some embodiments.

FIG. 6 conceptually illustrates a software architecture for a video conferencing and processing module 600 of a dual camera mobile device of some embodiments. The video conferencing and processing module 600 includes a CIPU driver 605, a media exchange module 610, and an encoder driver 620 that are similar to the corresponding modules and drivers 305, 310, and 320 described above by reference to FIG. 3. The video conferencing and processing module 600 also includes a video conference module 625, a video conference client 645, and a network interface 650 for performing a variety of video conferencing functions. Like the video processing and encoding module 300, the video conferencing and processing module 600 processes and encodes images that are captured from cameras of the dual camera mobile device.

As described above by reference to FIG. 3, the media exchange module 610 allows consumers and producers of media content in the device to exchange media content and instructions regarding the processing of the media content, the CIPU driver 605 serves as a communication interface with the captured image processing unit (CIPU) 655, and the encoder driver 620 serves as a communication interface with the encoder hardware 660 (e.g., an encoder chip, an encoding component on a system on chip, etc.).

The video conference module 625 of some embodiments handles various video conferencing functions such as image processing, video conference management, and networking. As shown, the video conference module 625 interacts with the media exchange module 610, the video conference client 645, and the network interface 650. In some embodiments, the video conference module 625 receives instructions from and sends instructions to the video conference client 645. The video conference module 625 of some embodiments also sends data to and receives data from networks (e.g., a local area network (LAN), a wireless local area network (WLAN), a wide area network (WAN), a network of networks, a code division multiple access (CDMA) network, a GSM network, etc.) through the network interface 650.

The video conference module 625 includes an image processing layer 630, a management layer 635, and a network layer 640. In some embodiments, the image processing layer 630 performs image processing operations on images for video conferencing. For example, the image processing layer 630 of some embodiments performs exposure adjustment, image resizing, perspective correction, and dynamic range adjustment as described in further detail below. The image processing layer 630 of some embodiments sends requests through the media exchange module 610 for images from the CIPU 655.

The management layer 635 of some embodiments controls the operation of the video conference module 625. For instance, in some embodiments, the management layer 635 initializes a camera/cameras of the dual camera mobile device, processes images and audio to transmit to a remote device, and processes images and audio received from the remote device. In some embodiments, the management layer 635 generates composite (e.g., PIP) displays for the device. Moreover, the management layer 635 may change the operation of the video conference module 625 based on networking reports received from the network layer 640.

In some embodiments, the network layer 640 performs some or all of the networking functionalities for video conferencing. For instance, the network layer 640 of some embodiments establishes a network connection (not shown) between the dual camera mobile device and a remote device of a video conference, transmits images to the remote device, and receives images from the remote device, among other functionalities, as described below and in the above-incorporated U.S. patent application Ser. No. 12/794,766, now issued as U.S. Pat. No. 8,744,420, entitled "Establishing a Video Conference During a Phone Call,". In addition, the network layer 640 receives networking data such as packet loss, one-way latency, and roundtrip delay time, among other types of data, processes such data, and reports the data to the management layer 635.

The video conference client 645 of some embodiments is an application that may use the video conferencing functions of the video conference module 625 such as a video conferencing application, a voice-over-IP (VOIP) application (e.g., Skype), or an instant messaging application. In some embodiments, the video conference client 645 is a stand-alone application while in other embodiments the video conference client 645 is integrated into another application.

In some embodiments, the network interface 650 is a communication interface that allows the video conference module 625 and the video conference client 645 to send data and receive data over a network (e.g., a cellular network, a local area network, a wireless network, a network of networks, the Internet, etc.) through the network interface 650. For instance, if the video conference module 625 wants to send data (e.g., images captured by cameras of the dual camera mobile device) to another device on the Internet, the video conference module 625 sends the images to the other device through the network interface 650.

B. Video Conference Set Up

Figure 7:
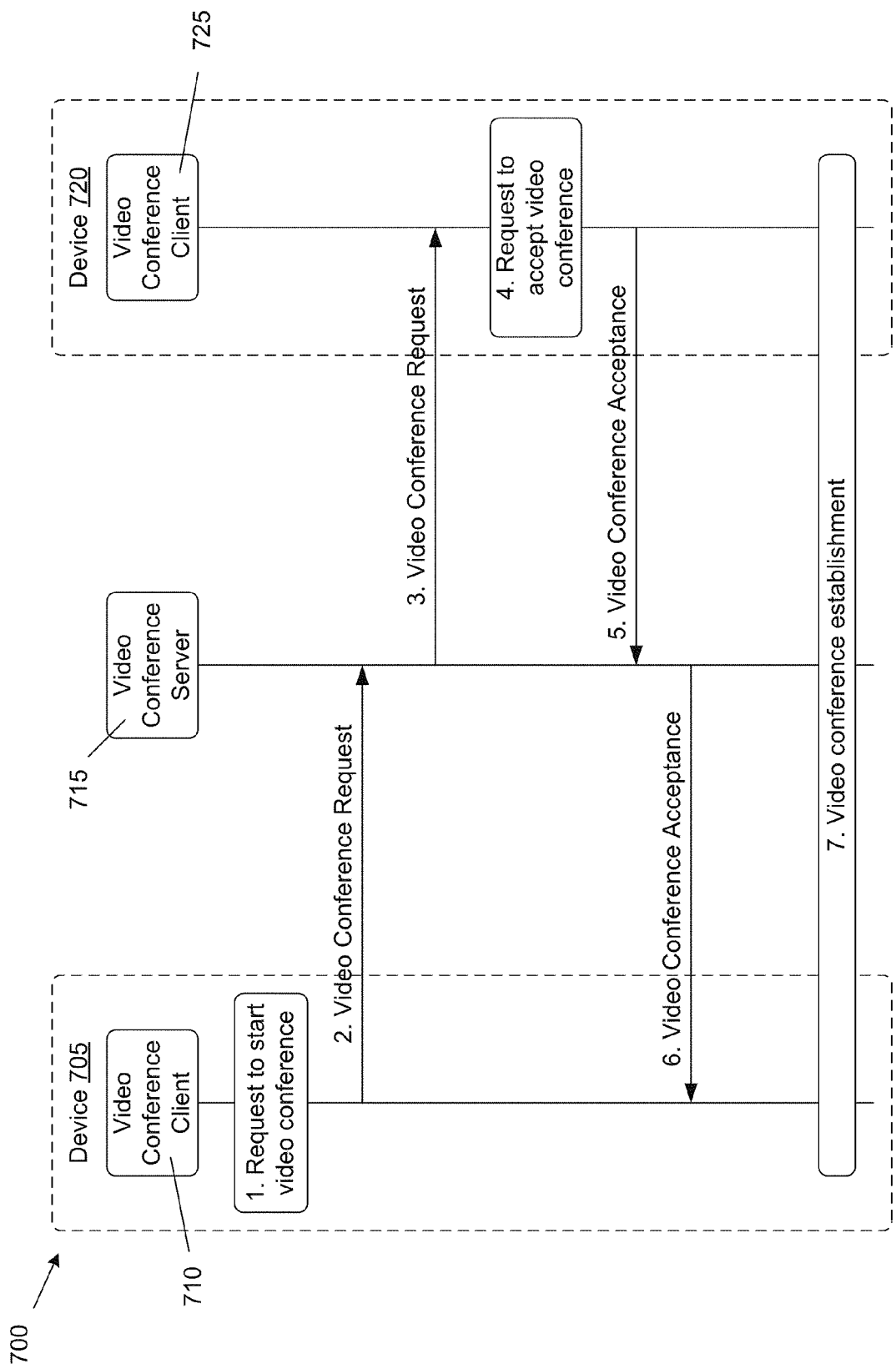
FIG. 7 conceptually illustrates an example video conference request messaging sequence of some embodiments.

FIG. 7 conceptually illustrates an example video conference request messaging sequence 700 of some embodiments. This figure shows the video conference request messaging sequence 700 among a video conference client 710 running on a device 705, a video conference server 715, and a video conference client 725 running on a device 720. In some embodiments, the video conference clients 710 and 725 are the same as the video conference client 645 shown in FIG. 6. As shown in FIG. 7, one device (i.e., the device 705) requests a video conference and another device (i.e., the device 720) responds to such request. The dual camera mobile device described in the present application can perform both operations (i.e., make a request and respond to a request).

The video conference server 715 of some embodiments routes messages among video conference clients. While some embodiments implement the video conference server 715 on one computing device, other embodiments implement the video conference server 715 on multiple computing devices. In some embodiments, the video conference server is a publicly accessible server that can handle and route messages for numerous conferences at once. Each of the video conference clients 710 and 725 of some embodiments communicates with the video conference server 715 over a network (e.g., a cellular network, a local area network, a wireless network, a network of networks, the Internet etc.) through a network interface such as the network interface 650 described above.

Figure 8:
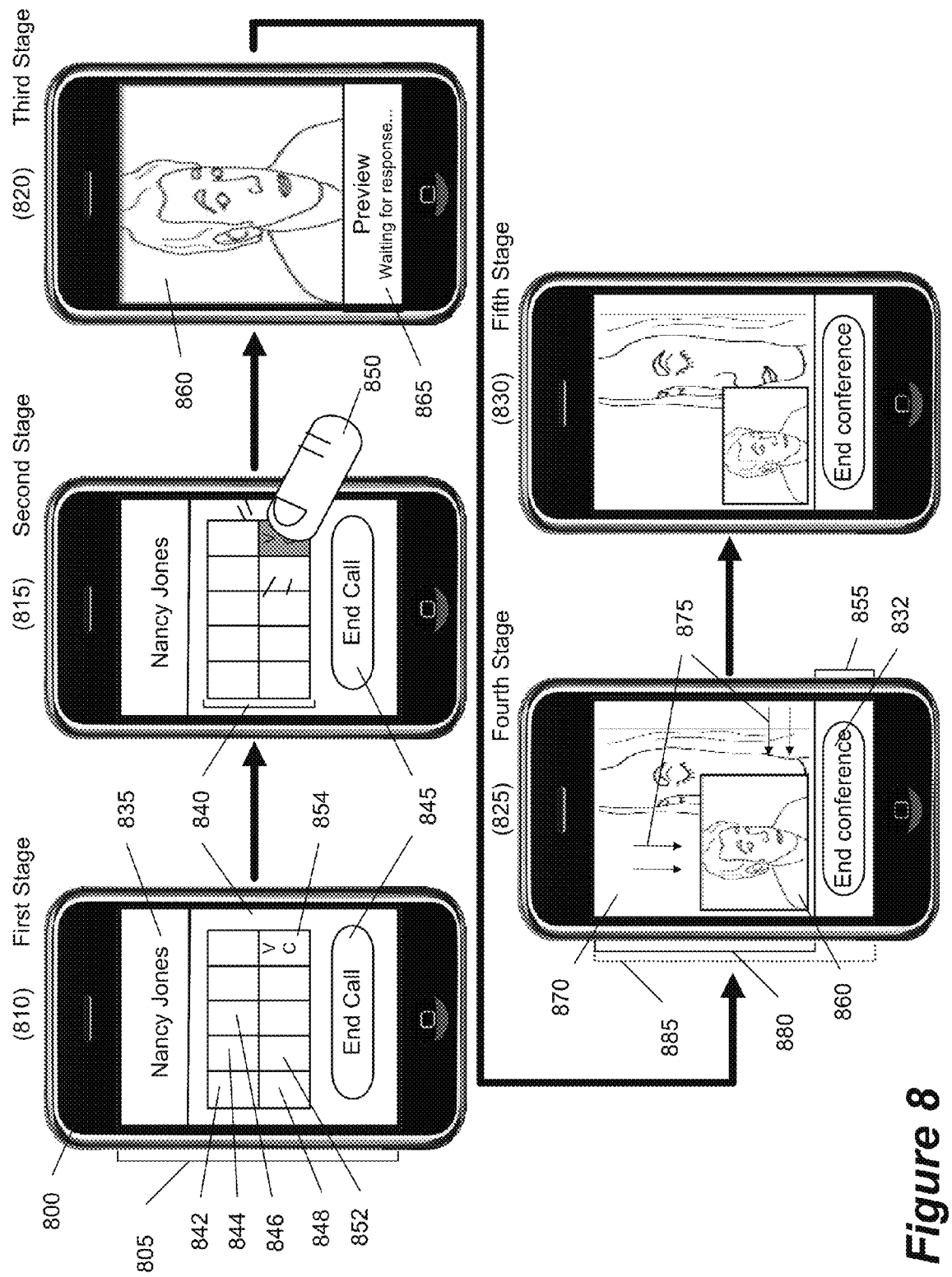
FIG. 8 illustrates a user interface of some embodiments for a video conference setup operation.
Figure 11:
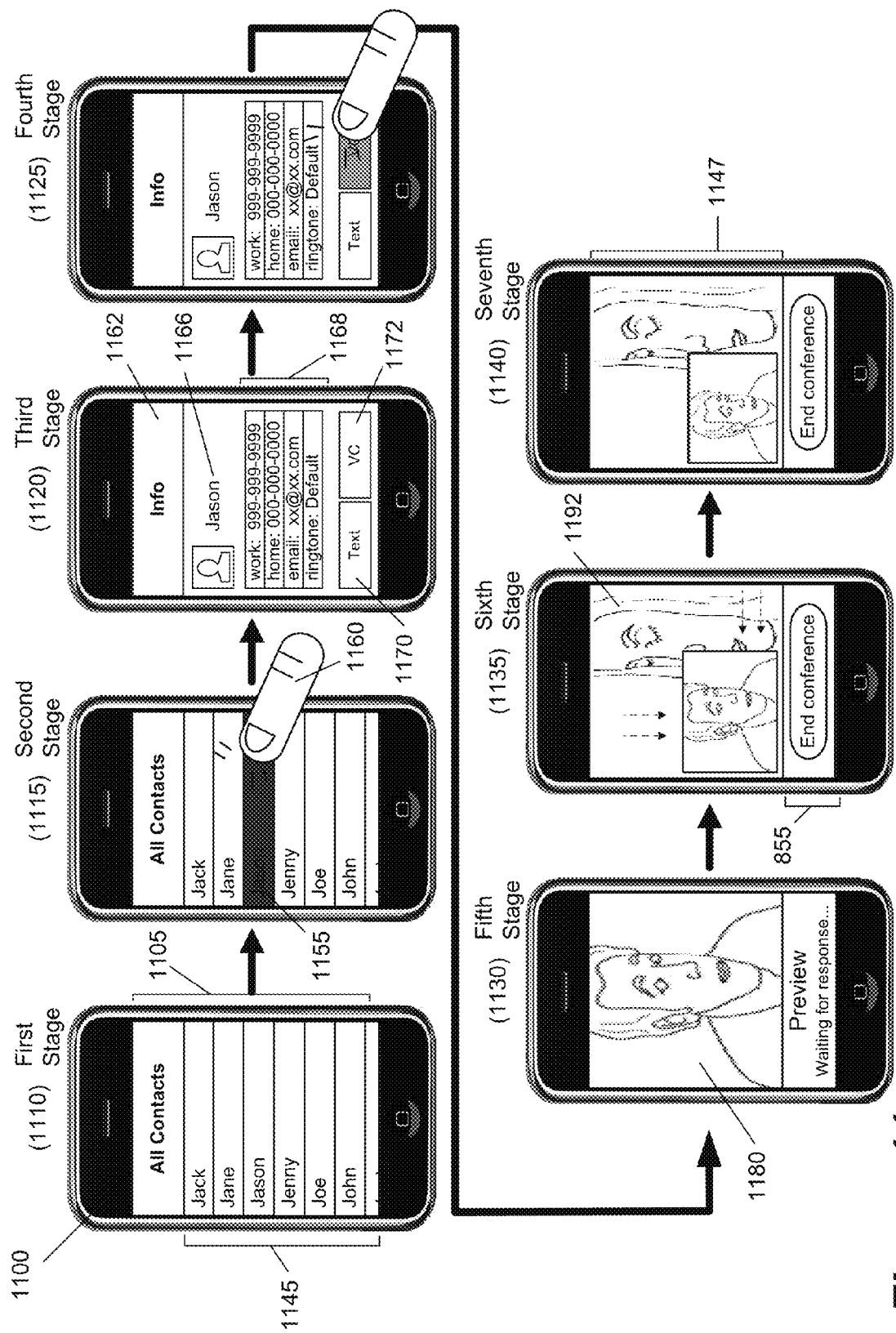
FIG. 11 illustrates another user interface of some embodiments for a video conference setup operation.

The video conference request messaging sequence 700 of some embodiments starts when the video conference client 710 receives (at operation 1) a request from a user of the device 705 to start a video conference with the device 720. The video conference client 710 of some embodiments receives the request to start the video conference when the user of the device 705 selects a user interface (UI) item of a user interface displayed on the device 705. Examples of such user interfaces are illustrated in FIG. 8 and FIG. 11, which are described below.

After the video conference client 710 receives the request, the video conference client 710 sends (at operation 2) a video conference request, which indicates the device 720 as the recipient based on input from the user, to the video conference server 715. The video conference server 715 forwards (at operation 3) the video conference request to the video conference client 725 of the device 720. In some embodiments, the video conference server 715 forwards the video conference request to the video conference client 725 using push technology. That is, the video conference server 715 initiates the transmission of the video conference request to the video conference client 725 upon receipt from the video conference client 710, rather than waiting for the client 725 to send a request for any messages.

Figure 9:
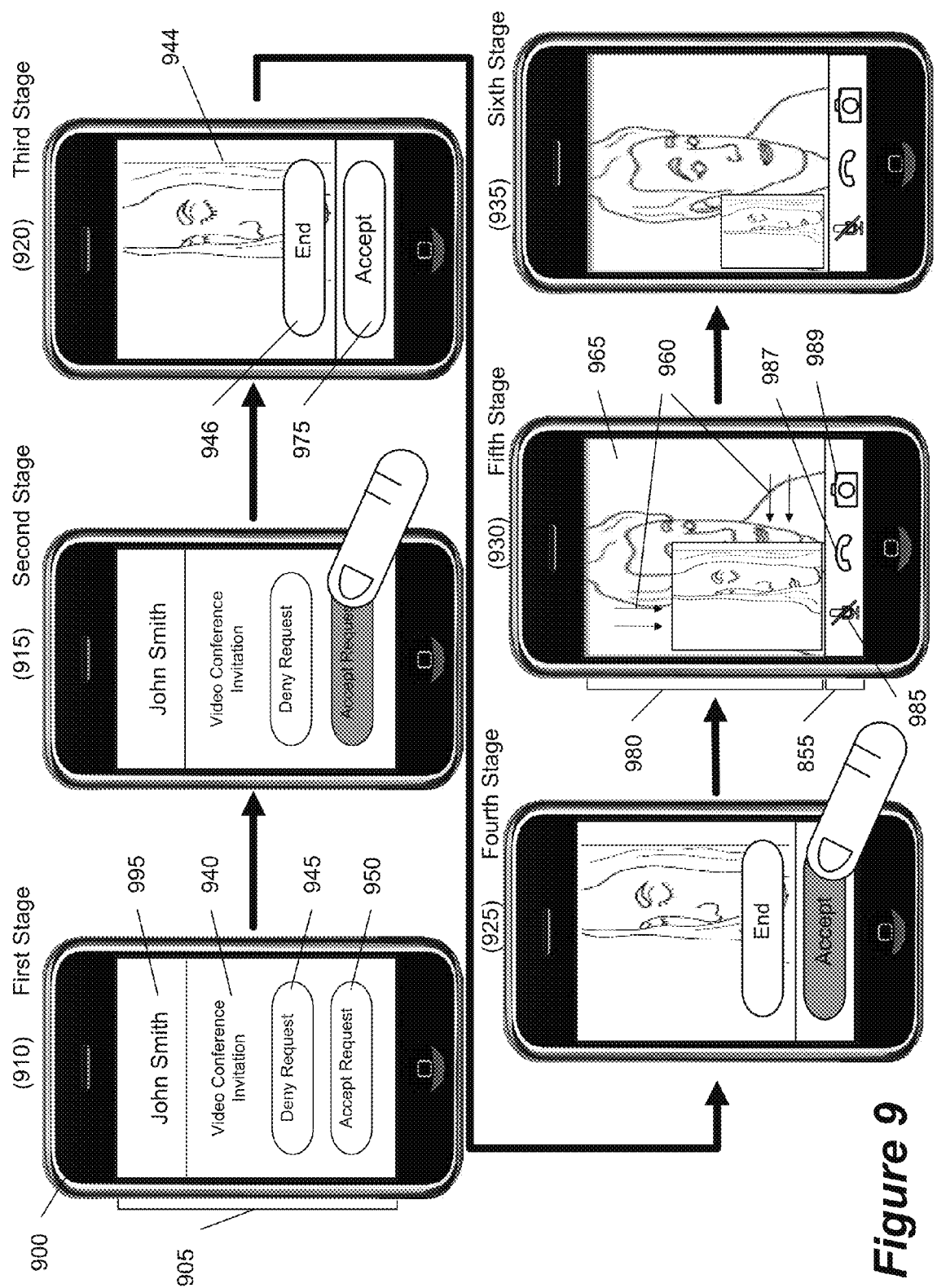
FIG. 9 illustrates a user interface of some embodiments for accepting an invitation to a video conference.

When the video conference client 725 of some embodiments receives the video conference request, a user interface is displayed on the device 720 to indicate to the user of the device 720 that the user of the device 705 sent a request to start a video conference and to prompt the user of the device 720 to accept or reject the video conference request. An example of such a user interface is illustrated in FIG. 9, which is described below. In some embodiments, when the video conference client 725 receives (at operation 4) a request to accept the video conference request from the user of the device 705, the video conference client 725 sends (at operation 5) a video conference acceptance to the video conference server 715. The video conference client 725 of some embodiments receives the request to accept the video conference request when the user of the device 720 selects a user interface item of a user interface as illustrated in FIG. 9, for example.

After the video conference server 715 receives the video conference acceptance from the video conference client 725, the video conference server 715 forwards (at operation 6) the video conference acceptance to the video conference client 710. Some embodiments of the video conference server 715 forward the video conference acceptance to the video conference client 710 using the push technology described above.

Upon receiving the video conference acceptance, some embodiments establish (at operation 7) a video conference between the device 705 and the device 720. Different embodiments establish the video conference differently. For example, the video conference establishment of some embodiments includes negotiating a connection between the device 705 and the device 720, determining a bit rate at which to encode video, and exchanging video between the device 705 and the device 720.

In the above example, the user of the device 720 accepts the video conference request. In some embodiments, the device 720 can be configured (e.g., through the preference settings of the device) to automatically accept incoming video conference requests without displaying a UI. Moreover, the user of the device 720 can also reject (at operation 4) the video conference request (e.g., by selecting a user interface item of a user interface displayed on the device 720). Instead of sending a video conference acceptance, the video conference client 725 sends a video conference rejection to the video conference server 715, which forwards the video conference rejection to the video conference client 710. The video conference is then never established.

In some embodiments, a video conference is initiated based on an ongoing phone call. That is, while the user of a mobile device is engaged in a phone call with a second user, the user can turn the phone call into a video conference with the permission of the other party. For some embodiments of the invention, FIG. 8 illustrates the start of such a video conference by a dual camera handheld mobile device 800. This figure illustrates the start of the video conference in terms of five operational stages 810, 815, 820, 825, and 830 of a user interface ("UI") 805 of the device 800.

As shown in FIG. 8, the UI 805 includes a name field 835, a selection menu 840, and a selectable UI item 845. The name field 835 displays the name of the person on the other end of the phone call, with whom a user would like to request a video conference. In this example, the selectable UI item 845 (which can be implemented as a selectable button) provides a selectable End Call option for the user to end the phone call. The selection menu 840 displays a menu of selectable UI items, such as a Speakerphone item 842, a Mute item 844, a Keypad item 846, a Phonebook item 848, a Hold item 852, a Video Conference item 854, etc. Different embodiments display the selection menu differently. For the embodiments illustrated by FIG. 8, the selection menu 840 includes several equally sized icons, each of which represents a different operation. Other embodiments provide a scrollable menu, or give priority to particular items (e.g., by making the items larger).

The operation of the UI 805 will now be described by reference to the state of this UI during the five stages, 810, 815, 820, 825, and 830 that are illustrated in FIG. 8. In the first stage 810, a phone call has been established between the handheld mobile device user and Nancy Jones. The second stage 815 displays the UI 805 after the user selects the selectable Video Conference option 854 (e.g., through a single finger tap by finger 850) to activate a video conference tool. In this example, the Video Conference option 854 (which can be implemented as a selectable icon) allows the user to start a video conference during the phone call. In the second stage, the Video Conference option 854 is highlighted to indicate that the video conference tool has been activated. Different embodiments may indicate such a selection in different ways (e.g., by highlighting the border or the text of the item).

The third stage 820 displays the UI 805 after the device 800 has started the video conference process with the selection of the Video Conference option 854. The third stage is a transitional hold stage while the device waits for the video conference to be established (e.g., while the device waits for the device on the other end of the call to accept or reject the video conference). In the third stage 820, the user of the device 800 can still talk to the user of the other device (i.e., Nancy Jones) while the video conference connection is being established. In addition, some embodiments allow the user of the device 800 to cancel the video conference request in the third stage 820 by selecting a selectable UI item displayed on the UI 805 (not shown) for canceling the video conference request. During this hold stage, different embodiments use different displays in the UI 805 to indicate the wait state.

As shown in FIG. 8, in some embodiments the wait state of the third stage is illustrated in terms of a full screen display of a video being captured by the device 800 along with a "Preview" notation at the bottom of this video. Specifically, in FIG. 8, the third stage 820 illustrates the start of the video conference process by displaying in a display area 860 of the UI 805 a full screen presentation of the video being captured by the device's camera. In some embodiments, the front camera is the default camera selected by the device at the start of a video conference. Often, this front camera points to the user of the device at the start of the video conference. Accordingly, in the example illustrated in FIG. 8, the third stage 820 illustrates the device 800 as presenting a full screen video of the user of the device 800. The wait state of the device is further highlighted by the "Preview" designation 865 below the video appearing in the display area 860 during the third stage 820.

The transitional third hold stage 820 can be represented differently in some embodiments. For instance, some embodiments allow the user of the device 800 to select the back camera as the camera for starting the video conference. To allow for this selection, some embodiments allow the user to specify (e.g., through a menu preference setting) the back camera as the default camera for the start of a video conference, and/or allow the user to select the back camera from a menu that displays the back and front cameras after the user selects the Video Conference option 854. In either of these situations, the UI 805 (e.g., display area 860) displays a video captured by the back camera during the third hold stage 820.

Also, other embodiments might indicate the activation of the video conference tool by displaying the smaller version of the video captured by the device 800, by displaying a still image that is stored on the device 800, by providing a message to highlight the wait state of the device (e.g., by showing "Conference Being Established"), by not displaying the "Preview" designation, etc. Also, in the third stage 820, the UI 805 of some embodiments provides an End button (not shown) to allow the user to cancel entering the video conference and revert back to the phone call if he decides not to enter the video conference at this stage (e.g., while the user is waiting for the remote user to respond to his request).

The fourth stage 825 illustrates the UI 805 in a transitional state after the remote user has accepted the video conference request and a video conference connection has been established. In this transitional state, the display area 860 that displays the video of the local user (that is being captured by the front camera in this example) gradually decreases in size (i.e., gradually shrinks), as indicated by the arrows 875. The display area 860 (i.e., the local user's video) shrinks so that the UI 805 can display a display area 870 (e.g., a display window 870) that contains the video from a camera of the remote device behind the display area 860. In other words, the shrinking of the local user's video 860 creates a PIP display 880 that has a foreground inset display 860 of the local user's video and a background main display 870 of the remote user.

In this example, the background main display 870 presents a video of a lady whose video is being captured by the remote device's front camera (e.g., Nancy Jones, the user of the remote device) or a lady whose video is being captured by the remote device's back camera (e.g., a lady whose video is being captured by Nancy Jones). One of ordinary skill will realize that the transitional fourth stage shown in FIG. 8 is simply one exemplary approach used by some embodiments, and that other embodiments might animate the transitional fourth stage differently.

The fourth stage 825 also illustrates a selectable UI item 832 in a lower display area 855. The selectable UI item 832 (which can be implemented as a selectable button) provides a selectable End Conference option 832 below the PIP display 880. The user may select this End Conference option 832 to end the video conference (e.g., through a single finger tap). Different embodiments may allow the user to end the conference in different ways, such as by toggling a switch on the mobile device, by giving voice commands, etc. Moreover, different embodiments may allow the End Conference option 832 to fade away during the video conference, thereby allowing the PIP display 880) to take up the entire display area 885. The End Conference option 832 may then reappear at a single finger tap at the bottom of the display area 885, giving the user access to the End Conference option 832. In some embodiments, the layout of the display area 855 is same as the display area 855 described in further detail below.

The fifth stage 830 illustrates the UI 805 after the animation of the fourth transitional state 825 has ended. Specifically, the fifth stage 830 illustrates a PIP display 880 that is presented by the UI 805 during the video conference. As mentioned above, this PIP display 880 includes two video displays: a larger background display 870 from the remote camera and a smaller foreground inset display 860 from the local camera.

This PIP display 880 is only one manner of presenting a composite view of the videos being captured by the remote and local devices. In addition to this composite view, the devices of some embodiments provide other composite views. For example, instead of having a larger background display 870 of the remote user, the larger background display 870 can be of the local user and the smaller foreground inset display 860 of the remote user. As further described below, some embodiments allow a user to switch during a video conference between the local cameras and/or remote cameras as the cameras for the inset and main views in the PIP display 880.

Also, some embodiments allow the local and remote videos to appear in the UI 805 in two side-by-side display areas (e.g., left and right display windows, or top and bottom display windows) or two diagonally aligned display areas. The manner of the PIP display or a default display mode may be specified by the user in some embodiments through the preference settings of the device or through controls that the user can select during a video conference, as further described below and in the above-incorporated U.S. patent application Ser. No. 12/794,766, now issued as U.S. Pat. No. 8,744,420, entitled "Establishing a Video Conference During a Phone Call,".

When the user of the device 800 of FIG. 8 invites the remote user to a video conference, the remote user may accept or reject the invitation. FIG. 9 illustrates a UI 905 of the remote user's device 900 at six different stages 910, 915, 920, 925, 930, and 935 that show the sequence of operations for presenting and accepting a video conference invitation at the remote user's device. The description of the UI 905 below refers to the user of the device 900 (i.e., the device that receives the video conference request) as the invite recipient, and the user of the device 800 (i.e., the device that sends the video conference request) as the invite requestor. Also, in this example, it is assumed that the invite recipient's device 900 is a dual camera device, like that of the invite requestor. However, in other examples, one or both of these devices are single camera devices.

The first stage 910 illustrates the UI 905 when the invite recipient receives an invitation to a video conference from the invite requestor, John Smith. As shown in FIG. 9, the UI 905 in this stage includes a name field 995, a message field 940, and two selectable UI items 945 and 950. The name field 995 displays the name of a person who is requesting a video conference. In some embodiments, the name field 995 displays a phone number of the person who is requesting a video conference instead of the name of the person. The message field 940 displays an invite from the invite requestor to the invite recipient. In this example, the "Video Conference Invitation" in the field 940 indicates that the invite requestor is requesting a video conference with the invite recipient. The selectable UI items 945 and 950 (which can be implemented as selectable buttons) provide selectable Deny Request and Accept Request options 945 and 950 for the invite recipient to use to reject or accept the invitation. Different embodiments may display these options differently and/or display other options.

Upon seeing the "Video Conference Invitation" notation displayed in the message field 940, the invite recipient may deny or accept the request by selecting the Deny Request option 945 or Accept Request option 950 in the UI, respectively. The second stage 915 illustrates that in the example shown in FIG. 9, the user selects the Accept Request option 950. In this example, this selection is made by the user's finger tapping on the Accept Request option 950, and this selection is indicated through the highlighting of this option 950. Other techniques are provided in some embodiments to select the Accept or Deny Request options 945 and 950 (e.g., double-tapping, etc.) to indicate the selection (e.g., highlighting the border or text of the UI item).

The third stage 920 displays the UI 905 after the invite recipient has agreed to join the video conference. In this stage, the UI 905 enters into a preview mode that shows a full screen presentation of the video from the remote device's front camera in a display area 944. The front camera in this case is pointed to the user of the remote device (i.e., Nancy Jones in this example). Accordingly, her image is shown in this preview mode. This preview mode allows the invite recipient to make sure that her video is displayed properly and that she is happy with her appearance before the video conference begins (e.g., before actual transmission of the video begins). In some embodiments, a notation, such as a "Preview" notation, may be displayed below the display area 944 to indicate that the invite recipient is in the preview mode.

Some embodiments allow the invite recipient to select the back camera as the default camera for the start of the video conference, or to select the front or back camera at the beginning of the video conference, as further described in the above-incorporated U.S. patent application Ser. No. 12/794, 766, now issued as U.S. Pat. No. 8,744,420, entitled "Establishing a Video Conference During a Phone Call,". Also, other embodiments display the preview display of the invite recipient differently (e.g., in a smaller image placed in the corner of the display area 944). Yet other embodiments do not include this preview mode, but rather start the video conference immediately after the invite recipient accepts the request.

In the third stage, the UI 905 shows two selectable UI items 975 and 946, one of which overlaps the display area 944 while the other is below this display area 944. The selectable UI item 975 is an Accept button 975 that the user may select to start video conferencing. The selectable UI item 946 is an End button 946 that the invite recipient can select if she decides not to join the video conference at this stage.

The fourth stage 925 displays the UI 905 after the invite recipient selects the Accept button 975. In this example, the Accept button 975 is highlighted to indicate that the invite recipient is ready to start the video conference. Such a selection may be indicated in different ways in other embodiments.

The fifth stage 930 illustrates the UI 905 in a transitional state after the invite recipient has accepted the video conference request. In this transitional stage, the display area 944 that displays the video of the invite recipient (that is being captured by the front camera in this example) gradually decreases in size (i.e., gradually shrinks), as indicated by the arrows 960. The invite recipient's video shrinks so that the UI 905 can display a display area 965 (e.g., a display window 965) that contains the video from a camera of the invite requestor behind the display area 944. In other words, the shrinking of the invite recipient's video creates a PIP display 980 that has a foreground inset display area 944 of the invite recipient's video and a background main display 965 of the invite requestor.

In this example, the background main display 965 presents a video of a man whose video is being captured by the local device's front camera (i.e., John Smith, the user of the local device 800). In another example, this video could have been that of a man whose video is being captured by the local device's back camera (e.g., a man whose video is being captured by John Smith). Different embodiments may animate this transitional fifth stage differently.

The UI at the fifth stage 930 also displays a display area 855 (e.g., a tool bar or a menu bar) that includes selectable UI item 985 (e.g., mute button 985) for muting the audio of the other user during the video conference, selectable UI item 987 (e.g., end conference button 987) for ending the video conference, and selectable UI item 989 (e.g., switch camera button 989) for switching cameras, which is described in further detail below. As such, the invite recipient may select any of the selectable UI items 985-989 (e.g., through a single finger tap) to perform the desired operation during the video conference. Different embodiments may allow the invite recipient to perform any of the operations in different ways, e.g., by toggling a switch on the mobile device, by giving voice commands, etc.

Although FIG. 9 shows an example layout for the display area 855, some embodiments provide different layouts of the display area 855 such as the layout of display area 855 of FIG. 8, which includes just a selectable End Conference UI item 832 for ending the video conference. Other layouts of display area 855 can include any number of different selectable UI items for performing different functions. Moreover, the fifth stage 930 shows the display area 855 displayed at the bottom of the UI 905. Different embodiments of the display area 855 can be displayed at different locations within the UI 905 and/or defined as different shapes.

FIG. 9 shows the display area 855 as a static display area (i.e., the display area 855 is always displayed). However, in some embodiments the display area 855 is a dynamic display area. In some such embodiments, the display area 855 is not ordinarily displayed. Rather, the display area 855 is displayed when a triggering event is received (e.g., a user selection such tapping the display area 980 once, a voice command, etc.). The display area 855 disappears after a user selection is received (e.g., selecting the selectable mute UI item 985) or a defined amount of time (e.g., 3 seconds), which can be specified by the user through the preference settings of the mobile device or the video conference application. In some such embodiments, the display area 855 is automatically displayed after the video conference starts and disappears in the same manner mentioned above.

The sixth stage 935 illustrates the UI 905 after the animation of the fifth transitional stage has ended. Specifically, the sixth stage illustrates a PIP display 980 that is presented by the UI 905 during the video conference. As mentioned above, this PIP display 980 includes two video displays: a larger background display 965 from the local camera and a smaller foreground inset display 944 from the remote camera. This PIP display 980 is only one manner of presenting a composite view of the videos being captured by the remote and local devices. In addition to this composite view, the devices of some embodiments provide other composite views. For example, instead of having a larger background display of the invite recipient, the larger background display can be of the invite requestor and the smaller foreground inset display of the invite recipient. As further described in the above-incorporated U.S. patent application Ser. No. 12/794,766, now issued as U.S. Pat. No. 8,744,420, entitled "Establishing a Video Conference During a Phone Call," some embodiments allow a user to control the inset and main views in a PIP display to switchably display the local and remote cameras. Also, some embodiments allow the local and remote videos to appear in the UI 905 in two side-by-side display areas (e.g., left and right display windows, or top and bottom display windows) or two diagonally aligned display areas. The manner of PIP display or a default display mode may be specified by the user in some embodiments through the preference settings of the device or through controls that the user can select during a video conference, as further described in the above-incorporated U.S. patent application Ser. No. 12/794, 766, now issued as U.S. Pat. No. 8,744,420, entitled "Establishing a Video Conference During a Phone Call,".

Although FIG. 9 shows the sequence of operations for presenting and accepting a video conference invitation in terms of six different operational stages, some embodiments may implement the operation in less stages. For instance, some of such embodiments may omit presenting the third and fourth stages 920 and 925 and go from the second stage 915 to the fifth stage 930 after the user selects the Accept Request option 950. Other embodiments that implement that operation (i.e., presenting and accepting a video conference invitation) in less stages may omit the first and second stages 910 and 915 and present the user with the third stage 920 when the invite recipient receives an invitation to a video conference from the invite requestor.

Figure 10:
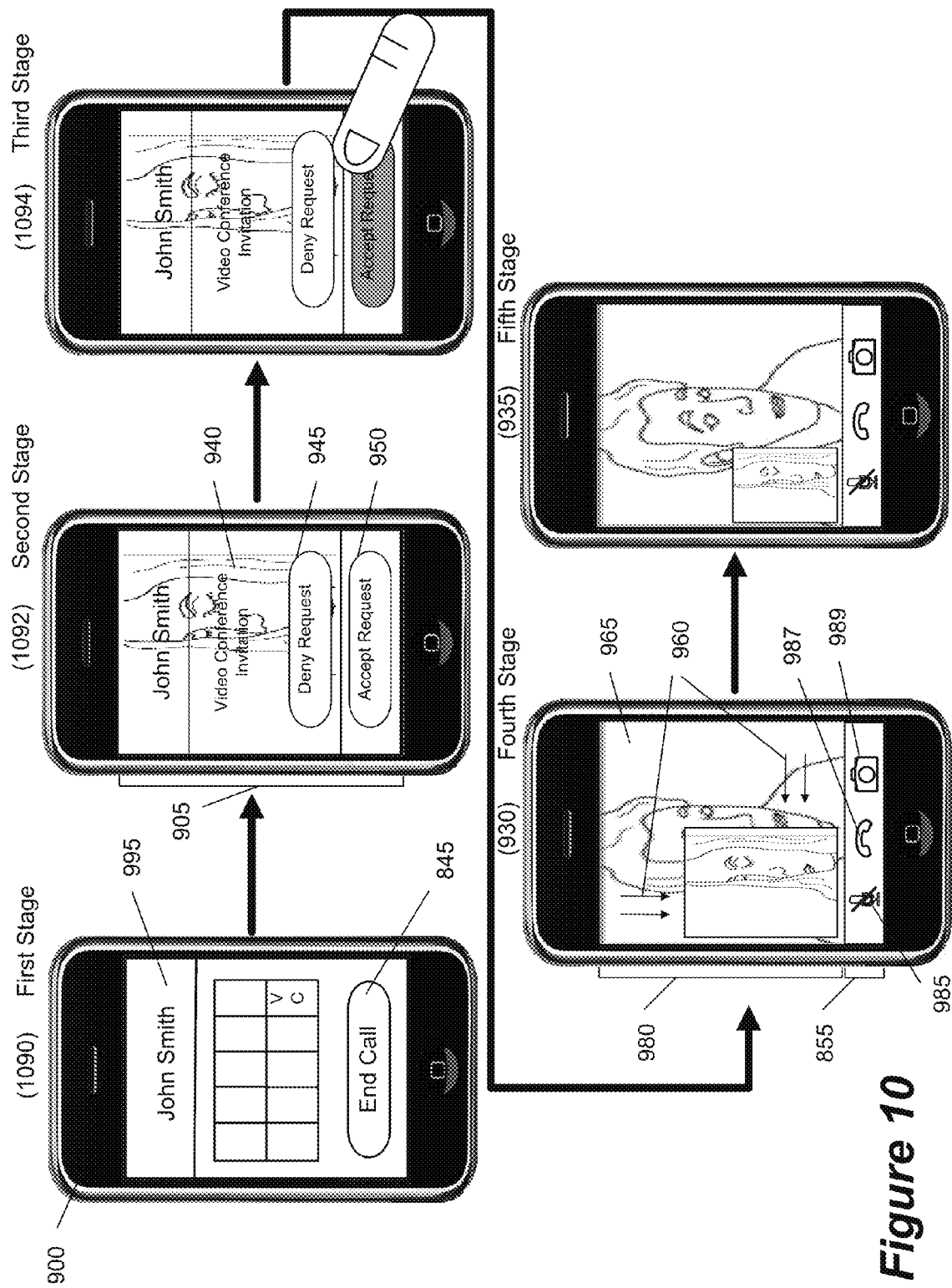
FIG. 10 illustrates another user interface of some embodiments for accepting an invitation to a video conference.

FIG. 10 illustrates an example of performing the operation illustrated in FIG. 9 in less stages by combining the first and third stages into one stage and the second and fourth stage into one stage. In particular, this figure illustrates a UI 905 of the remote user's device 900 at five different stages 1090, 1092, 1094, 930, and 935. The first stage 1090 is similar to the stage 810 except the name field 995 displays the name "John Smith" to indicate the name of the person on the other end of the telephone call. That is, a phone call has been established between the user of the remote mobile device and the user of the local device (i.e., John Smith in this example). The second and third stages 1092 and 1094 are similar to the first and second stages 910 and 915 of FIG. 9 except the second and third stage 1092 and 1094 also show a preview of the user of the remote mobile device (i.e., Nancy Jones in this example). The fourth and fifth stages 930 and 935 are the same as the fifth and sixth stages 930 and 935 of FIG. 9.

In addition to activating the video conference tool through a selectable option during a phone call, some embodiments allow a user of a dual camera device to initiate a video conference directly without having to make a phone call first. FIG. 11 illustrates another such alternative method to initiate a video conference. This figure illustrates the UI 1105 at seven different stages 1110, 1115, 1120, 1125, 1130, 1135, and 1140 that show an alternative sequence of operations for starting a video conference.

In the first stage 1110, a user is looking through a contacts list on this mobile device for the person with whom he wants to engage in a video conference, similar to how he would find a contact to call. In the second stage 1115, the user selects the person 1155 with whom he would like to have a video conference (e.g., through a single finger tap 1160 on the person's name 1155). This selection triggers the UI 1105 to display the contact's information and various user selectable options. In this example, Jason's name 1155 is highlighted to indicate that this is the person with whom the user would like to have a video conference. Different embodiments may indicate such a selection in different ways. While the second stage 1115 allows the user of the device 1100 to select a person with whom the user would like to have a video conference through a contact list, some embodiments allow the user to select the person through a "Recents" call history that lists a particular number or name of a person with whom the user of the device 1100 recently had a video conference or a phone call.

In the third stage 1120, the UI 1105 displays the selected person's information 1162 and various selectable UI items 1168, 1172, and 1170 after the person's name 1155 has been selected. In this example, one of the various selectable UI items 1172 (which can be implemented as a selectable icon or button) provides a video conference tool. The Video Conference option 1172 allows the user to invite the person identified by the contact 1166 to a video conference. Different embodiments display the information 1162 and selectable UI items 1168, 1172, and 1170 differently (e.g., in a different arrangement).

The fourth stage 1125 shows the user selecting the Video Conference option 1172 (e.g., through a single finger tap). In this example, the Video Conference option 1172 is highlighted to indicate that the video conference tool 1172 has been activated. Such selections may be indicated differently in different embodiments (e.g., by highlighting the text or border of the selected icon).

The fifth, sixth and seventh stages 1130, 1135, and 1140 are similar to the third, fourth and fifth stages 820, 825, and 830 illustrated in FIG. 8 and may be understood by reference to the discussion of those stages. In brief, the fifth stage 1130 illustrates a transitional holding stage that waits for the remote user to respond to the invitation to a video conference. The sixth stage 1135 illustrates that after the remote user has accepted the video conference request, the display area 1180 (that displays the video of the local user) gradually decreases in size so the UI 1105 can show a display area 1192 that contains the video from a camera of the remote user behind the display area 1180. In the seventh stage 1140, the PIP display 1147 is presented by the UI 1105 during the video conference. In some embodiments, the layout of display area 855 in the sixth stage 1135 and the seventh stage 1140 is like the layout of the display area 855 of FIG. 9, described above.

FIGS. 7, 8, 9, 10, and 11 show several ways of establishing a video conference. In some embodiments, during a telephone call, audio data (e.g., voice) is transmitted through one communication channel (over a communication network like a circuit-switched communication network or a packet-switched communication network) and, during a video conference, audio data is transmitted through another communication channel. Thus, in such embodiments, audio data (e.g., voice) is transmitted through a communication channel before the video conference is established, and once the video conference is established, audio is transmitted through a different communication channel (instead of the communication channel used during the telephone call).

In order to provide a seamless transition (e.g., handoff) of audio data from the telephone call to the video conference, some embodiments do not terminate the telephone call before establishing the video conference. For instance, some embodiments establish a peer-to-peer video conference connection (e.g., after completing the message sequence illustrated in FIG. 7) before terminating the phone call and starting to transmit audio/video data through the peer-to-peer communication session. Alternatively, other embodiments establish a peer-to-peer video conference connection (e.g., after completing the message sequence illustrated in FIG. 7) and start transmitting audio/video data through the peer-to-peer communication session, before terminating the phone call and starting to present the received audio/video data.

A peer-to-peer video conference connection of some embodiments allows the mobile devices in the video conference to directly communicate with each other (instead of communicating through a central server, for example). Some embodiments of a peer-to-peer video conference allow the mobile devices in the video conferences to share resources with each other. For instance, through a control communication channel of a video conference, one mobile device can remotely control operations of another mobile device in the video conference by sending instructions from the one mobile device to the other mobile device to direct the other mobile device to process images differently (i.e., share its image processing resource) such as an exposure adjustment operation, a focus adjustment operation, and/or a switch camera operation, described in further detail below.

C. Video Conference Architecture

As mentioned above, FIG. 12 conceptually illustrates a software architecture for a video conferencing and processing module 1200 of a dual camera mobile device of some embodiments. As shown, the video conferencing and processing module 1200 includes a client application 1265, a video conference module 1202, a media exchange module 1220, a buffer 1225, a captured image processing unit (CIPU) driver 1230, an encoder driver 1235, and a decoder driver 1240. In some embodiments, the buffer 1225 is a frame buffer that stores images of a video for display on a display 1245 of the dual camera mobile device.

In some embodiments, the client application 1265 is the same as the video conference client 645 of FIG. 6. As mentioned above, the client application 1265 may be integrated into another application or implemented as a stand-alone application. The client application 1265 may be an application that uses the video conferencing functions of the video conference module 1202, such as a video conferencing application, a voice-over-IP (VOIP) application (e.g., Skype), or an instant messaging application.

The client application 1265 of some embodiments sends instructions to the video conference module 1202 such as instructions to start a conference and end a conference, receives instructions from the video conference module 1202, routes instructions from a user of the dual camera mobile device to the video conference module 1202, and generates user interfaces that are displayed on the dual camera mobile device and allow a user to interact with the application.

D. Video Conference Manager

Figure 12:
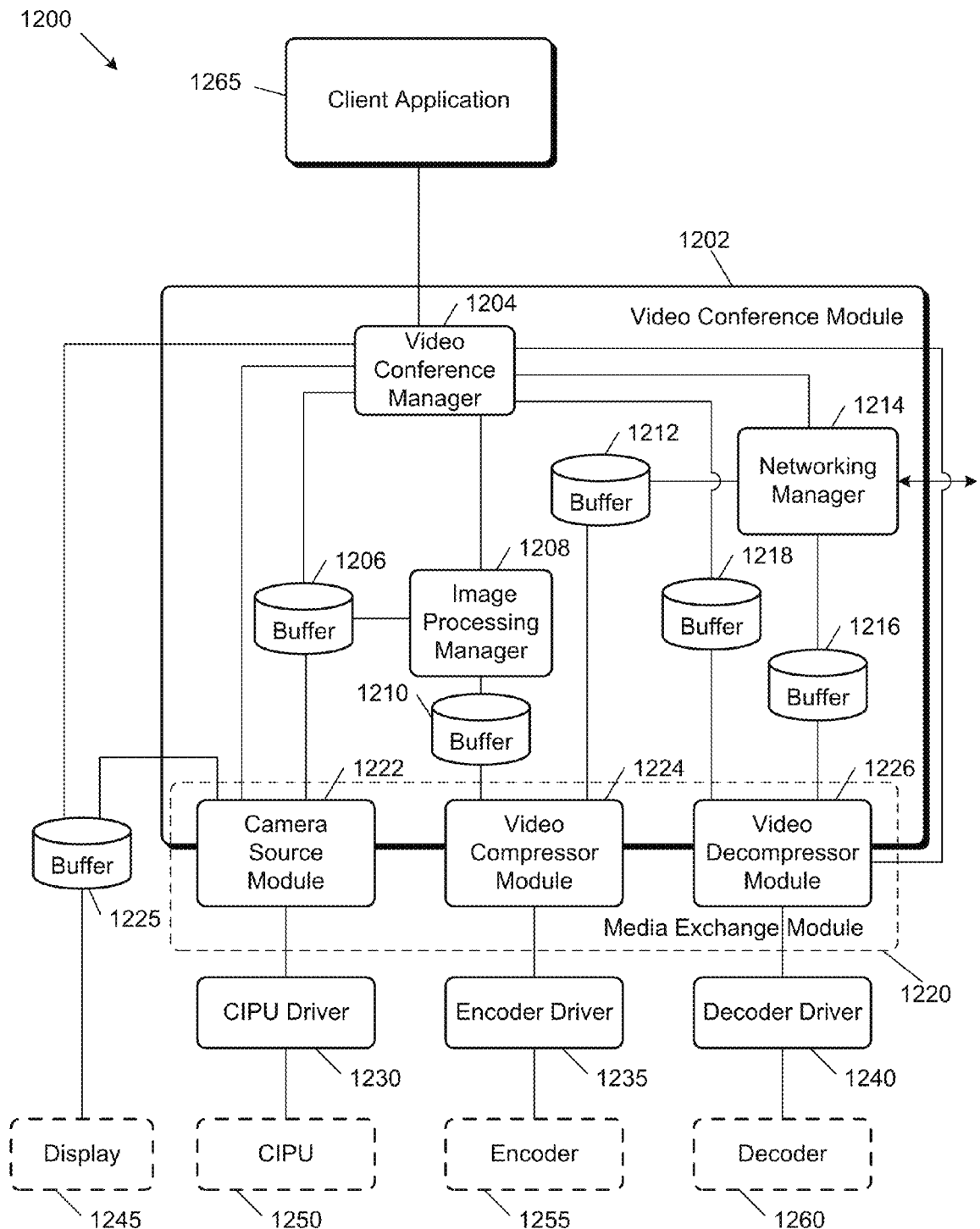
FIG. 12 conceptually illustrates another software architecture for a video conferencing and processing module of a dual camera mobile device of some embodiments.

As shown in FIG. 12, the video conference module 1202 includes a video conference manager 1204, an image processing manager 1208, a networking manager 1214, and buffers 1206, 1210, 1212, 1216, and 1218. In some embodiments, the video conference module 1202 is the same as the video conference module 625 illustrated in FIG. 6 and thus performs some or all of the same functions described above for the video conference module 625.

In some embodiments, the video conference manager 1204 is responsible for initializing some or all of the other modules of the video conference module 1202 (e.g., the image processing manager 1208 and the networking manager 1214) when a video conference is starting, controlling the operation of the video conference module 1202 during the video conference, and ceasing the operation of some or all of the other modules of the video conference module 1202 when the video conference is ending.

The video conference manager 1204 of some embodiments also processes images received from one or more devices in the video conference and images captured by one of both cameras of the dual camera mobile device for display on the dual camera mobile device. For instance, the video conference manager 1204 of some embodiments retrieves decoded images, that were received from another device participating in the video conference, from the buffer 1218 and retrieves images processed by CIPU 1250 (i.e., images captured by the dual camera mobile device) from the buffer 1206. In some embodiments, the video conference manager 1204 also scales and composites the images before displaying the images on the dual camera mobile device. That is, the video conference manager 1204 generates the PIP or other composite views to display on the mobile device in some embodiments. Some embodiments scale the images retrieved from the buffers 1206 and 1218 while other embodiments just scale images retrieved from one of the buffers 1206 and 1218.

Although FIG. 12 illustrates the video conference manager 1204 as part of the video conference module 1202, some embodiments of the video conference manager 1204 are implemented as a component separate from the video conference module 1202. As such, a single video conference manager 1204 can be used to manage and control several video conference modules 1202. For instance, some embodiments will run a separate video conference module on the local device to interact with each party in a multi-party conference, and each of these video conference modules on the local device are managed and controlled by the one video conference manager.

The image processing manager 1208 of some embodiments processes images captured by the cameras of the dual camera mobile device before the images are encoded by the encoder 1255. For example, some embodiments of the image processing manager 1208 perform one or more of exposure adjustment, focus adjustment, perspective correction, dynamic range adjustment, and image resizing on images processed by the CIPU 1250. In some embodiments, the image processing manager 1208 controls the frame rate of encoded images that are transmitted to the other device in the video conference.

Some embodiments of the networking manager 1214 manage one or more connections between the dual camera mobile device and the other device participating in the video conference. For example, the networking manager 1214 of some embodiments establishes the connections between the dual camera mobile device and the other device of the video conference at the start of the video conference and tears down these connections at the end of the video conference.

During the video conference, the networking manager 1214 transmits images encoded by the encoder 1255 to the other device of the video conference and routes images received from the other device of the video conference to decoder 1260 for decoding. In some embodiments, the networking manager 1214, rather than the image processing manager 1208, controls the frame rate of the images that are transmitted to the other device of the video conference. For example, some such embodiments of the networking manager 1214 control the frame rate by dropping (i.e., not transmitting) some of the encoded frames that are supposed to be transmitted to the other device of the video conference.

As shown, the media exchange module 1220 of some embodiments includes a camera source module 1222, a video compressor module 1224, and a video decompressor module 1226. The media exchange module 1220 is the same as the media exchange module 310 shown in FIG. 3, with more detail provided. The camera source module 1222 routes messages and media content between the video conference module 1202 and the CIPU 1250 through the CIPU driver 1230, the video compressor module 1224 routes message and media content between the video conference module 1202 and the encoder 1255 through the encoder driver 1235, and the video decompressor module 1226 routes messages and media content between the video conference module 1202 and the decoder 1260 through the decoder driver 1240. Some embodiments implement the TNR module 315 included in the media exchange module 310 (not shown in FIG. 12) as part of the camera source module 1222 while other embodiments implement the TNR module 315 as part of the video compressor module 1224.

In some embodiments, the CIPU driver 1230 and the encoder driver 1235 are the same as the CIPU driver 305 and the encoder driver 320 illustrated in FIG. 3. The decoder driver 1240 of some embodiments acts as a communication interface between the video decompressor module 1226 and decoder 1260. In such embodiments, the decoder 1260 decodes images received from the other device of the video conference through the networking manager 1214 and routed through the video decompressor module 1226. After the images are decoded, they are sent back to the video conference module 1202 through the decoder driver 1240 and the video decompressor module 1226.

Figure 13:
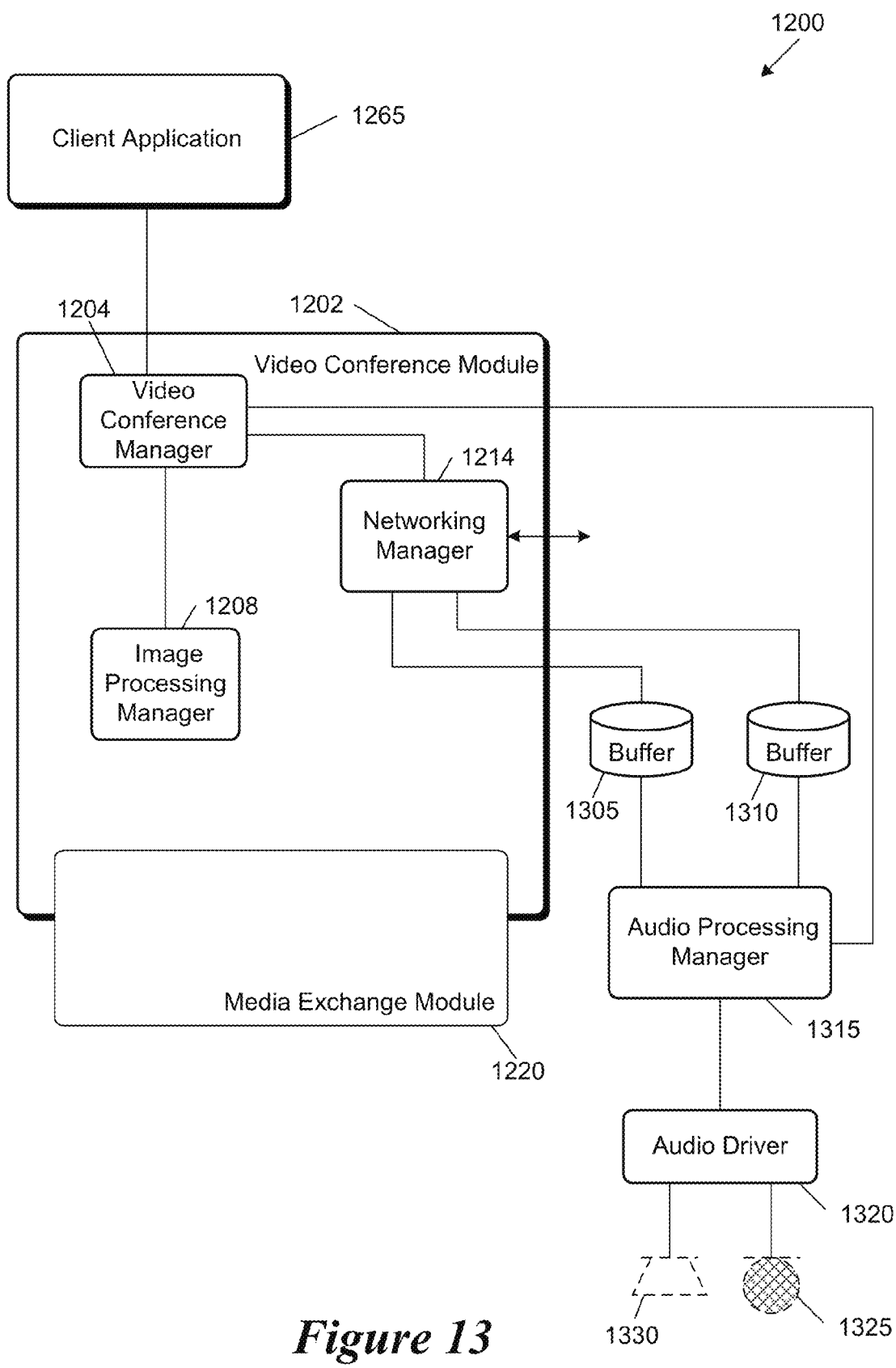
FIG. 13 conceptually illustrates another software architecture for a dual camera mobile device of some embodiments.

In addition to performing video processing during a video conference, the video conferencing and processing module 1200 for the dual camera mobile device of some embodiments also performs audio processing operations during the video conference. FIG. 13 illustrates such a software architecture. As shown, the video conferencing and processing module 1200 includes the video conference module 1202 (which includes the video conference manager 1204, the image processing manager 1208, and the networking manager 1214), the media exchange module 1220, and the client application 1265. Other components and modules of the video conferencing and processing module 1200 shown in FIG. 12 are omitted in FIG. 13 to simplify the description. The video conferencing and processing module 1200 also includes frame buffers 1305 and 1310, audio processing manager 1315, and audio driver 1320. In some embodiments, the audio processing manager 1315 is implemented as a separate software module while in other embodiments the audio processing manager 1315 is implemented as part of the media exchange module 1220.

The audio processing manager 1315 processes audio data captured by the dual camera mobile device for transmission to the other device in the video conference. For example, the audio processing manager 1315 receives audio data through the audio driver 1320, which is captured by microphone 1325, and encodes the audio data before storing the encoded audio data in the buffer 1305 for transmission to the other device. The audio processing manager 1315 also processes audio data captured by and received from the other device in the video conference. For instance, the audio processing manager 1315 retrieves audio data from the buffer 1310 and decodes the audio data, which is then output through the audio driver 1320 to the speaker 1330.

In some embodiments, the video conference module 1202 along with the audio processing manager 1315 and its associated buffers are part of a larger conference module. When a multi-participant audio conference is conducted between several devices without exchange of video content, this video conferencing and processing module 1200 only uses the networking manager 1214 and the audio processing manager 1315 to facilitate the exchange of audio over an Internet Protocol (IP) layer.

Figure 14:
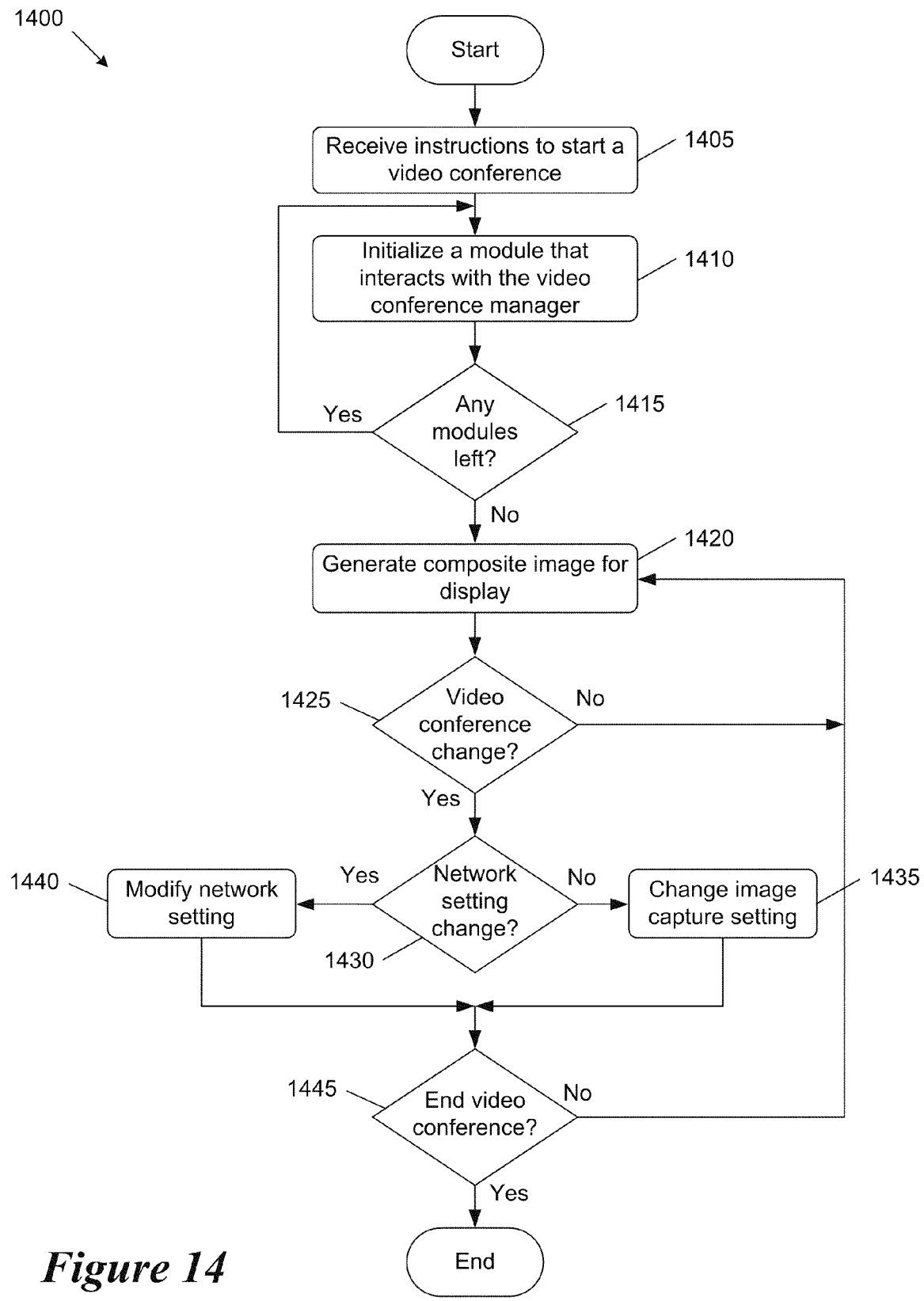
FIG. 14 conceptually illustrates a process performed by a video conference manager of some embodiments such as that illustrated in FIG. 12.

The operation of the video conference manager 1204 of some embodiments will now be described by reference to FIG. 14. FIG. 14 conceptually illustrates a process 1400 performed by a video conference manager of some embodiments such as video conference manager 1204 illustrated in FIG. 12. This can be equivalent to being performed by the management layer 635 of FIG. 6. In some embodiments, the video conference manager 1204 performs process 1400 when a user of the dual camera mobile device accepts (e.g., through a user interface displayed on the dual camera mobile device) a video conference request or when a user of another device accepts a request sent by the user of the dual camera mobile device.

The process 1400 begins by receiving (at 1405) instructions to start a video conference. In some embodiments, the instructions are received from the client application 1265 or are received from a user through a user interface displayed on the dual camera mobile device and forwarded to the video conference manager 1204 by the client application 1265. For example, in some embodiments, when a user of the dual camera mobile device accepts a video conference request, the instructions are received through the user interface and forwarded by the client application. On the other hand, when a user of the other device accepts a request sent from the local device, some embodiments receive the instructions from the client application without user interface interaction (although there may have been previous user interface interaction to send out the initial request).

Next, the process 1400 initializes (at 1410) a first module that interacts with the video conference manager 1204. The modules of some embodiments that interact with the video conference manager 1204 include the CIPU 1250, the image processing manager 1208, the audio processing manager 1315, and the networking manager 1214.

In some embodiments, initializing the CIPU 1250 includes instructing the CIPU 1250 to start processing images captured by one or both cameras of the dual camera mobile device. Some embodiments initialize the image processing manager 1208 by instructing the image processing manager 1208 to start retrieving images from the buffer 1210 and processing and encoding the retrieved images. To initialize the audio processing manager 1315, some embodiments instruct the audio processing manager 1315 to begin encoding audio data captured by the microphone 1325 and decoding audio data stored in the buffer 1310 (which was received from the other device) in order to output to the speaker 1330. The initializing of the networking manager 1214 of some embodiments includes instructing the networking manager 1214 to establish a network connection with the other device in the video conference.

The process 1400 then determines (at 1415) whether there are any modules left to initialize. When there are modules left to initialize, the process 1400 returns to operation 1410 to initialize another of the modules. When all of the required modules have been initialized, the process 1400 generates (at 1420) composite images for displaying on the dual camera mobile device (i.e., local display). These composite images may include those illustrated in FIG. 65 in the above-incorporated U.S. patent application Ser. No. 12/794,766, now issued as U.S. Pat. No. 8,744,420, entitled "Establishing a Video Conference During a Phone Call," and can include various combinations of images from the cameras of the local dual camera mobile device and images from cameras of the other device participating in the video conference.

Next, the process 1400 determines (at 1425) whether a change has been made to the video conference. Some embodiments receive changes to the video conference through user interactions with a user interface displayed on the dual camera mobile device while other embodiments receive changes to the video conference from the other device through the networking manager 1214 (i.e., remote control). The changes to video conference settings may also be received from the client application 1265 or other modules in the video conference module 1202 in some embodiments. The video conference settings may also change due to changes in the network conditions.

When a change has been made, the process 1400 determines (at 1430) whether the change to the video conference is a change to a network setting. In some embodiments, the changes are either network setting changes or image capture setting changes. When the change to the video conference is a change to a network setting, the process modifies (at 1440) the network setting and then proceeds to operation 1445. Network setting changes of some embodiments include changing the bit rate at which images are encoded or the frame rate at which the images are transmitted to the other device.

When the change to the video conference is not a change to a network setting, the process 1400 determines that the change is a change to an image capture setting and then proceeds to operation 1435. The process 1400 then performs (at 1435) the change to the image capture setting. In some embodiments, change to the image capture settings may include switching cameras (i.e., switching which camera on the dual camera mobile device will capture video), focus adjustment, exposure adjustment, displaying or not displaying images from one or both cameras of the dual camera mobile device, and zooming in or out of images displayed on the dual camera mobile device, among other setting changes.

At operation 1445, the process 1400 determines whether to end the video conference. When the process 1400 determines to not end the video conference, the process 1400 returns to operation 1420. When the process 1400 determines that the video conference will end, the process 1400 ends. Some embodiments of the process 1400 determine to end the video conference when the process 1400 receives instructions from the client application 1265 to end the video conference (i.e., due to instructions received through the user interface of the local dual camera mobile device or received from the other device participating in the video conference).

In some embodiments, the video conference manager 1204 performs various operations when the video conference ends that are not shown in process 1400. Some embodiments instruct the CIPU 1250 to stop producing images, the networking manager 1214 to tear down the network connection with the other device in the video conference, and the image processing manager 1208 to stop processing and encoding images.

E. Image Processing Manager & Encoder

In addition to temporal noise reduction and image processing operations performed by the CIPU and/or CIPU driver, some embodiments perform a variety of image processing operations at the image processing layer 630 of the video conference module 625. These image processing operations may include exposure adjustment, focus adjustment, perspective correction, adjustment of dynamic range, and image resizing, among others.

Figure 15:
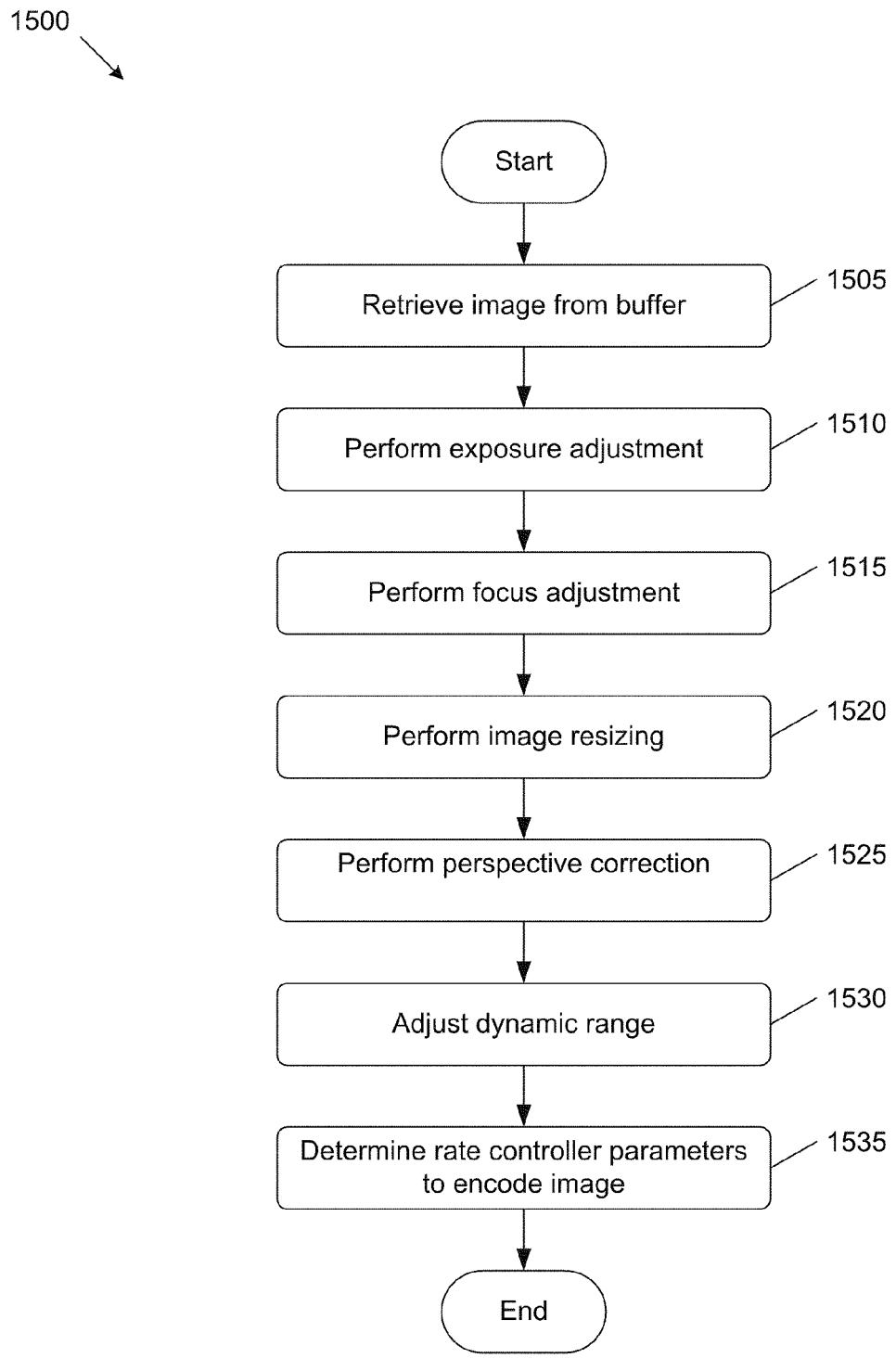
FIG. 15 conceptually illustrates a process performed by an image processing manager of some embodiments such as that illustrated in FIG. 6.

FIG. 15 conceptually illustrates a process 1500 for performing such image processing operations. In some embodiments, some or all of the operations of the process 1500 are performed by a combination of the image processing manager 1208 and the encoder driver 1235 of FIG. 12. In some of such embodiments, the image processing manager 1208 performs the pixel-based processing (e.g., resizing, dynamic range adjustment, perspective correction, etc.). Some embodiments perform process 1500 during a video conference on images that are to be transmitted to another device participating in the video conference.

The process 1500 will now be described by reference to FIG. 12. The process starts by retrieving (at 1505) an image from the buffer 1206. In some embodiments, the retrieved image is an image of a video (i.e., an image in a sequence of images). This video may have been captured by a camera of a device on which the process 1500 is performed.

Figure 16:
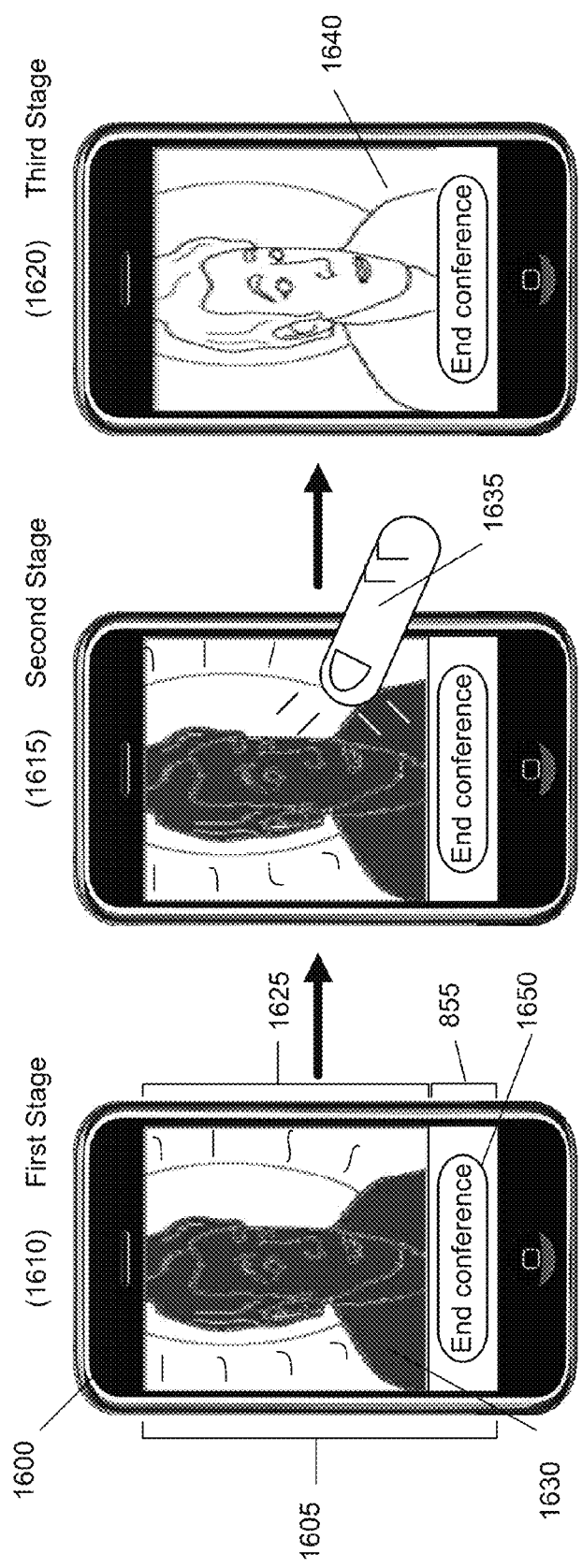
FIG. 16 illustrates a user interface of some embodiments for an exposure adjustment operation.

Next, the process 1500 performs (at 1510) exposure adjustment on the retrieved image. Some embodiments perform exposure adjustments through a user interface that is displayed on the dual camera mobile device. FIG. 16 illustrates an example exposure adjustment operation of such embodiments.

This figure illustrates the exposure adjustment operation by reference to three stages 1610, 1615, and 1620 of a UI 1605 of a device 1600. The first stage 1610 illustrates the UI 1605, which includes a display area 1625 and a display area 855. As shown, the display area 1625 displays an image 1630 of a sun and a man with a dark face and body. The dark face and body indicates that the man is not properly exposed. The image 1630 could be a video image captured by a camera of the device 1600. As shown, the display area 855 includes a selectable UI item 1650 for ending the video conference. In some embodiments, the layout of the display area 855 is the same as the layout of the display area 855 of FIG. 9, described above.

The second stage 1615 illustrates a user of the device 1600 initiating an exposure adjustment operation by selecting an area of the display area 1625. In this example, a selection is made by placing a finger 1635 anywhere within the display area 1625. In some embodiments, a user selects exposure adjustment from a menu of possible image setting adjustments.

The third stage 1620 shows an image 1640 of the man after the exposure adjustment operation is completed. As shown, the image 1640 is similar to the image 1630, but the man in the image 1640 is properly exposed. In some embodiments, the properly exposed image is an image that is captured after the improperly exposed image. The exposure adjustment operation initiated in the second stage 1615 adjusts the exposure of subsequent images captured by the camera of the device 1600.

Figure 17:
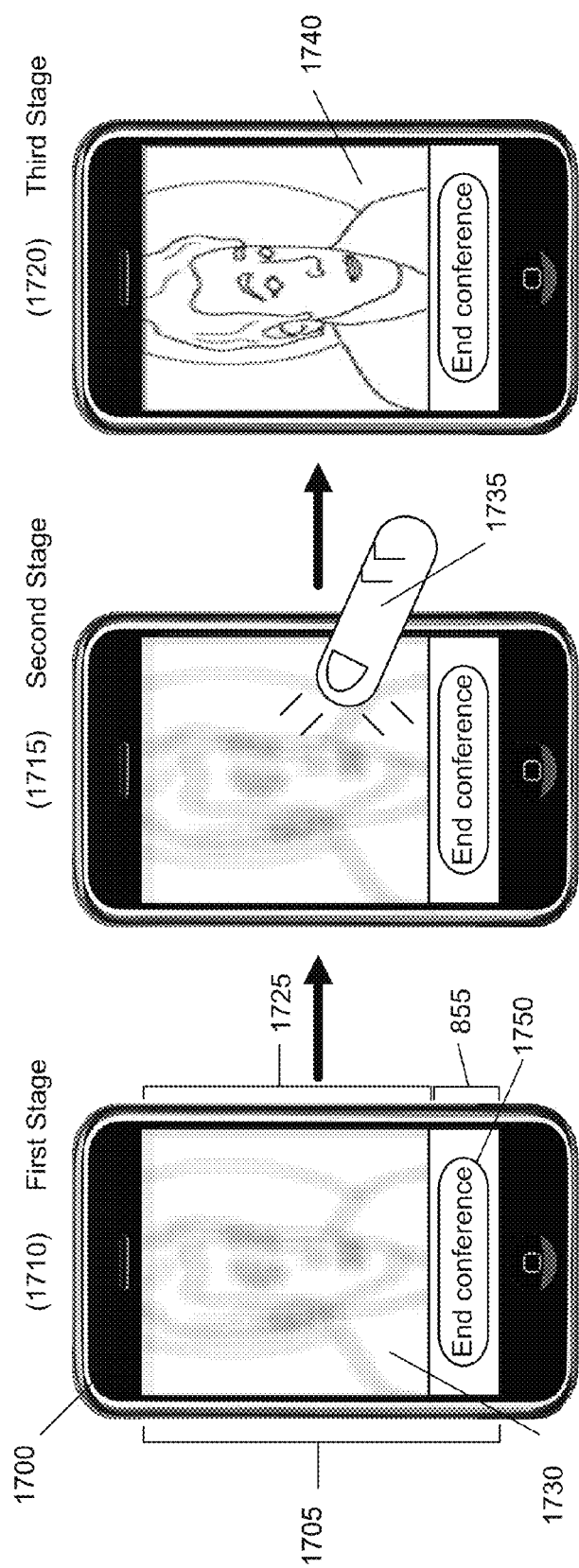
FIG. 17 illustrates a user interface of some embodiments for a focus adjustment operation.

Returning to FIG. 15, the process 1500 next performs (at 1515) focus adjustment on the image. Some embodiments perform focus adjustment through a user interface that is displayed on the dual camera mobile device. FIG. 17 conceptually illustrates an example of such focus adjustment operations.

FIG. 17 illustrates a focus adjustment operation by reference to three different stages 1710, 1715, and 1720 of a UI 1705 of a device 1700. The first stage 1710 illustrates the UI 1705 including a display area 1725 and a display area 855. The display area 1725 presents a blurry image 1730 of a man captured by a camera of the device 1700. The blurriness indicates that the image 1730 of the man is out of focus. That is, the lens of the camera was not focused on the man when the image 1730 of the man was captured by the camera. Also, the image 1730 could be a video image captured by a camera of the device 1700. As shown, the display area 855 includes a selectable UI item 1750 for ending the video conference. In some embodiments, the layout of the display area 855 is the same as the layout of the display area 855 of FIG. 9, described above.

The second stage 1715 illustrates a user of the device 1700 initiating a focus adjustment operation by selecting an area of the display area 1725. In this example, a selection is made by placing a finger 1735 anywhere within the display area 1725. In some embodiments, a user selects focus adjustment from a menu of possible image setting adjustments.

The third stage 1720 shows an image 1740 of the man after the focus adjustment operation is completed. As shown, the image 1740 is the same as the image 1730, but the man in the image 1740 appears sharper. This indicates that the lens of the camera is properly focused on the man. In some embodiments, the properly focused image is an image that is captured after the improperly focused image. The focus adjustment operation initiated in the second stage 1715 adjusts the focus of subsequent images captured by the camera of the device 1700.

Back to FIG. 15, the process 1500 performs (at 1520) image resizing on the image. Some embodiments perform image resizing on the image to reduce the number of bits used to encode the image (i.e., lower the bit rate). In some embodiments, the process 1500 performs image resizing as described by reference to FIG. 26 in the above-incorporated U.S. patent application Ser. No. 12/794,766, now issued as U.S. Pat. No. 8,744,420, entitled "Establishing a Video Conference During a Phone Call,".

The process 1500 next performs (at 1525) perspective correction on the image. In some embodiments, the process 1500 performs perspective correction as described in FIG. 24 in the above-incorporated U.S. patent application Ser. No. 12/794,766, now issued as U.S. Pat. No. 8,744,420, entitled "Establishing a Video Conference During a Phone Call,". Such perspective correction involves using data taken by one or more accelerometer and/or gyroscope sensors that identifies orientation and movement of the dual camera mobile device. This data is then used to modify the image to correct for the perspective being off.

After perspective correction is performed on the image, the process 1500 adjusts (at 1530) the dynamic range of the image. In some embodiments, the dynamic range of an image is the range of possible values that each pixel in the image can have. For example, an image with a dynamic range of 0-255 can be adjusted to a range of 0-128 or any other range of values. Adjusting the dynamic range of an image can reduce the amount of bits that will be used to encode the image (i.e., lower the bit rate) and thereby smooth out the image.

Adjusting the dynamic range of an image can also be used for various other purposes. One purpose is to reduce image noise (e.g., the image was captured by a noisy camera sensor). To reduce noise, the dynamic range of the image can be adjusted so that the black levels are redefined to include lighter blacks (i.e., crush blacks). In this manner, the noise of the image is reduced. Another purpose of dynamic range adjustment is to adjust one or more colors or range of colors in order to enhance the image. For instance, some embodiments may assume that the image captured by the front camera is an image of a person's face. Accordingly, the dynamic range of the image can be adjusted to increase the red and pinks colors to make the person's cheeks appear rosy/rosier. The dynamic range adjustment operation can be used for other purposes as well.

Finally, the process 1500 determines (at 1535) one or more rate controller parameters that are used to encode the image. Such rate controller parameters may include a quantization parameter and a frame type (e.g., predictive, bi-directional, intra-coded) in some embodiments. The process then ends.

While the various operations of process 1500 are illustrated as being performed in a specific order, one of ordinary skill will recognize that many of these operations (exposure adjustment, focus adjustment, perspective correction, etc.) can be performed in any order and are not dependent on one another. That is, the process of some embodiments could perform focus adjustment before exposure adjustment, or similar modifications to the process illustrated in FIG. 15.

F. Networking Manager

Figure 18:
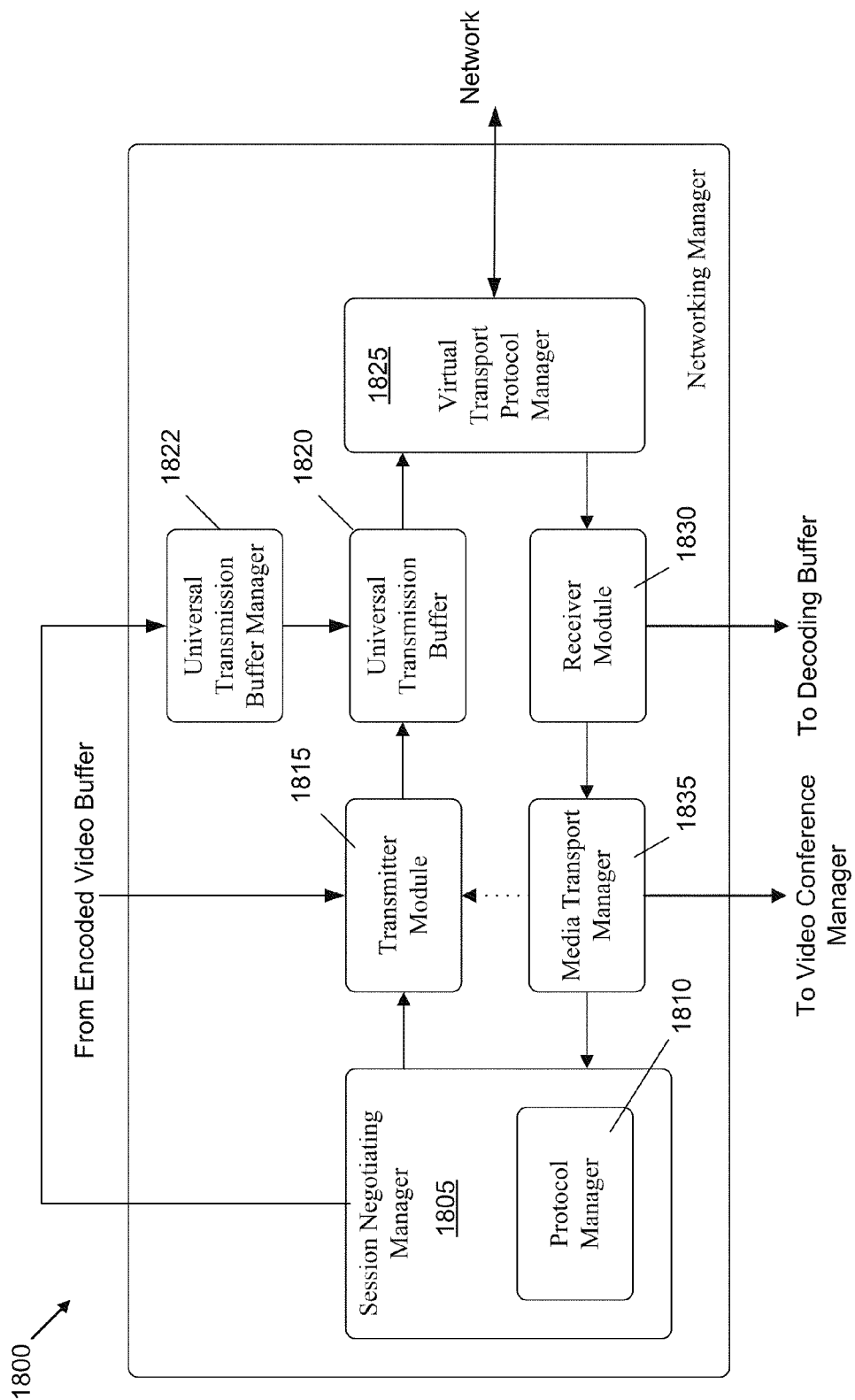
FIG. 18 conceptually illustrates a software architecture for a networking manager of some embodiments such as that illustrated in FIG. 12.

FIG. 18 conceptually illustrates the software architecture of a networking manager 1800 of some embodiments such as the networking manager 1214 illustrated in FIG. 12. As described above, the networking manager 1800 manages network connections (e.g., connection establishment, connection monitoring, connection adjustments, connection tear down, etc.) between a dual camera mobile device on which it operates and a remote device in a video conference. During the video conference, the networking manager 1800 of some embodiments also processes data for transmission to the remote device and processes data received from the remote device.

As shown in FIG. 18, the networking manager 1800 includes a session negotiating manager 1805, a transmitter module 1815, a universal transmission buffer 1820, a universal transmission buffer manager 1822, a virtual transport protocol (VTP) manager 1825, a receiver module 1830, and a media transport manager 1835.

The session negotiating manager 1805 includes a protocol manager 1810. The protocol manager 1810 ensures that the transmitter module 1815 uses a correct communication protocol to transmit data to a remote device during the video conference and enforces rules of the communication protocol that is used. Some embodiments of the protocol manager 1810 support a number of communication protocols, such as a real-time transport protocol (RTP), a transmission control protocol (TCP), a user datagram protocol (UDP), and a hypertext transfer protocol (HTTP), among others.

The session negotiating manager 1805 is responsible for establishing connections between the dual camera mobile device and one or more remote devices participating in the video conference, as well as tearing down these connections after the conference. In some embodiments, the session negotiating manager 1805 is also responsible for establishing multimedia communication sessions (e.g., to transmit and receive video and/or audio streams) between the dual camera mobile device and the remote devices in the video conference (e.g., using a session initiation protocol (SIP)).

The session negotiating manager 1805 also receives feedback data from the media transport manager 1835 and, based on the feedback data, determines the operation of the universal transmission buffer 1820 (e.g., whether to transmit or drop packets/frames) through the universal transmission buffer manager 1822. This feedback, in some embodiments, may include one-way latency and a bandwidth estimation bit rate.

In other embodiments, the feedback includes packet loss information and roundtrip delay time (e.g., determined based on packets sent to the remote device in the video conference and the receipt of acknowledgements from that device). Based on the information from the media transport manager 1835, the session negotiating manager 1805 can determine whether too many packets are being sent and instruct the universal transmission buffer manager 1822 to have the universal transmission buffer 1820 transmit fewer packets (i.e., to adjust the bit rate).

The transmitter module 1815 retrieves encoded images (e.g., as a bitstream) from a video buffer (e.g., the buffer 1212 of FIG. 12) and packetizes the images for transmission to a remote device in the video conference through the universal transmission buffer 1820 and the virtual transport protocol manager 1825. The manner in which the encoded images are created and sent to the transmitter module 1815 can be based on instructions or data received from the media transport manager 1835 and/or the session negotiating manager 1805. In some embodiments, packetizing the images involves breaking the received bitstream into a group of packets each having a particular size (i.e., a size specified by the session negotiating manager 1805 according to a particular protocol), and adding any required headers (e.g., address headers, protocol specification headers, etc.).

The universal transmission buffer manager 1822 controls the operation of the universal transmission buffer 1820 based on data and/or instructions received from the session negotiating manager 1805. For example, the universal transmission buffer manager 1822 may be instructed to direct the universal transmission buffer 1820 to transmit data, stop transmitting data, drop data, etc. As described above, in some embodiments when a remote device participating in the conference appears to be dropping packets, this will be recognized based on acknowledgements received from the remote device. To reduce the packet dropping, the universal transmission buffer manager 1822 may be instructed to transmit packets at a slower rate to the remote device.

The universal transmission buffer 1820 stores data received from the transmitter module 1815 and transmits the data to the remote device through the VTP manager 1825. As noted above, the universal transmission buffer 1820 may drop data (e.g., images of the video) based on instructions received from the universal transmission buffer manager 1822.

In some embodiments, RTP is used to communicate data packets (e.g., audio packets and video packets) over UDP during a video conference. Other embodiments use RTP to communicate data packets over TCP during the video conference. Other transport layer protocols can be used as well in different embodiments.

Some embodiments define a particular communication channel between two mobile devices by a pair of port numbers (i.e., source port number and destination port number). For instance, one communication channel between the mobile devices can be defined by one pair of port numbers (e.g., source port 50 and destination port 100) and another different communication channel between the mobile devices can be defined by another different pair of port numbers (e.g., source port 75 and destination port 150). Some embodiments also use a pair of internet protocol (IP) addresses in defining communication channels. Different communication channels are used to transmit different types of data packets in some embodiments. For example, video data packets, audio data packets, and control signaling data packets can be transmitted in separate communication channels. As such, a video communication channel transports video data packets and an audio communication channel transports audio data packets.

In some embodiments, a control communication channel is for messaging between the local mobile device and a remote device during a video conference. Examples of such messaging include sending and receiving requests, notifications, and acknowledgements to such requests and notifications. Another example of messaging includes sending remote control instruction messages from one device to another. For instance, the remote control operations described in the above-incorporated U.S. patent application Ser. No. 12/794, 766, now issued as U.S. Pat. No. 8,744,420, entitled "Establishing a Video Conference During a Phone Call," (e.g., instructing a device to only send images from one particular camera or to only capture images with a particular camera) can be performed by sending instructions from a local device to a remote device through the control communication channel for the local device to remotely control operations of the remote device. Different embodiments implement the control communication using different protocols like a real-time transport control protocol (RTCP), an RTP extension, SIP, etc. For instance, some embodiments use RTP extension to relay one set of control messages between two mobile devices in a video conference and use SIP packets to relay another set of control messages between the mobile devices during the video conference.

The VTP manager 1825 of some embodiments allows different types of data packets that are specified to be transmitted through different communication channels (e.g., using different pairs of port numbers) to be transmitted through a single communication channel (e.g., using the same pair of port numbers). One technique for doing this involves identifying the data packet types, identifying the communication channel through which data packets are specified to be transmitted by extracting the specified pair of port numbers of the data packets, and specifying the data packets to be transmitted through the single communication channel by modifying the pair of port numbers of the data packets to be the pair of port numbers of the single communication channel (i.e., all the data packets are transmitted through the same pair of port numbers).

To keep track of the original pair of port numbers for each type of data packet, some embodiments store a mapping of the original pair of port numbers for the data packet type. Some of these embodiments than use the packet type field of the protocol to differentiate the different packets that are being multiplexed into one communication channel. For instance, some embodiments that have the VTP manager multiplex audio, video and control packets into one RTP stream, use the RTP packet type field to differentiate between the audio, video and control packets that are transmitted in the one RTP channel to the other device in the video conference. In some of these embodiments, the VTP manger also routes control messaging in SIP packets to the other device.

Some embodiments identify examine the data packet signatures (i.e., packet header formats) to distinguish between different packets that are communicated using different protocols (e.g., to differentiate between packets transported using RTP and packets transported using SIP). In such embodiments, after the data packets of the different protocols are determined, the fields of the data packets that use the same protocol (e.g., audio data and video data using RTP) are examined as described above to identify the different data types. In this manner, the VTP manager 1825 transmits different data packets, which are intended to be transmitted through different communication channels, through a single communication channel.

Although one way of combining different types of data through a single communication channel is described above, other embodiments utilize other techniques to multiplex different packet types into one communication stream. For example, one technique of some embodiments involves keeping track of the original pair of port numbers of the data packets and storing the original pair of port numbers in the data packet itself to be later extracted. Still other ways exist for combining different types of data between two video conference participants into one port pair channel.

When the VTP manager 1825 receives data packets from the remote device through a virtualized communication channel, the VTP manager 1825 examines the signatures of the data packets to identify the different packets that are sent using the different protocols. Such signatures can be used to differentiate SIP packets from RTP packets. The VTP manager of some embodiments also uses the packet type field of some or all of the packets to demultiplex the various different types of packets (e.g., audio, video and control packets) that were multiplexed into a single virtualized channel. After identifying these different types of packets, the VTP manager associates each different type of packet with its corresponding port pair numbers based on a mapping of port pair numbers and packet types that it keeps. The VTP manager 1825 then modifies the pair of port numbers of the data packets with the identified pair of port numbers and forwards the data packets to be depacketized. In other embodiments that use different techniques for multiplexing different packet types into the single channel, the VTP manager uses different techniques for parsing out the packets.

By using such techniques for multiplexing and de-multiplexing the different packets, the VTP manager 1825 creates a single virtualized communication channel (e.g., a single pair of port numbers), transmits the video data, audio data, and control signaling data through the single virtualized communication channel, and receives audio, video, and control packets from the remote device through the single virtualized communication channel. Thus, from the perspective of the network, data is transmitted through this single virtualized communication channel, while, from the perspective of the session negotiating manager 1805 and the protocol manager 1810, the video data, audio data, and control signaling data are transmitted through different communication channels.

Similar to the images that are transmitted to the remote device in the video conference, images transmitted from the remote device in the video conference are received in packet format. The receiver module 1830 receives the packets and depacketizes them in order to reconstruct the images before storing the images in a video buffer (e.g., the buffer 1216 of FIG. 12) to be decoded. In some embodiments, depacketizing the images involves removing any headers and reconstructing a bitstream that only has image data (and potentially size data) from the packets.

The media transport manager 1835 processes feedback data (e.g., one-way latency, bandwidth estimation bit rate, packet loss data, roundtrip delay time data, etc.) received from the network to dynamically and adaptively adjust the rate of data transmission (i.e., bit rate). The media transport manager 1835 also controls error resilience based on the processed feedback data in some other embodiments, and may also send the feedback data to the video conference manager 1204 in order to adjust other operations of the video conference module 1202 such as scaling, resizing, and encoding. In addition to having the universal transmission buffer drop packets when a remote device in the conference is not able to process all of the packets, the video conference module and encoder can use a lower bit rate for encoding the images so that fewer packets will be sent for each image.

In some embodiments, the media transport manager 1835 may also monitor other variables of the device such as power consumption and thermal levels that may affect how the operational power modes of the cameras are configured, as discussed above. This data may also be used as additional inputs into the feedback data (e.g., if the device is getting too hot, the media transport manager 1835 may try to have the processing slowed down).

Several example operations of the networking manager 1800 will now be described by reference to FIG. 12. The transmission of images captured by a camera of the dual camera mobile device to a remote device in the video conference will be described first, followed by the description of receiving images from the remote device. The transmitter module 1815 retrieves encoded images from the buffer 1212, which are to be transmitted to the remote device in the video conference.

The protocol manager 1810 determines the appropriate protocol to use (e.g., RTP to transmit audio and video) and the session negotiating manager 1805 informs the transmitter module 1815 of such protocol. Next, the transmitter module 1815 packetizes the images and sends the packetized images to the universal transmission buffer 1820. The universal transmission buffer manager 1822 receives instructions from the session negotiating manager 1805 to direct the universal transmission buffer 1820 to transmit or drop the images. The VTP manager 1825 receives the packets from the universal transmission buffer 1820 and processes the packets in order to transmit the packets through a single communication channel to the remote device.

When receiving images from the remote device, the VTP manager 1825 receives packetized images from the remote device through the virtualized single communication channel and processes the packets in order to direct the images to the receiver module 1830 through a communication channel that is assigned to receive the images (e.g., a video communication channel).

The receiver module 1830 depacketizes the packets to reconstruct the images and sends the images to the buffer 1216 for decoding by the decoder 1260. The receiver module 1830 also forwards control signaling messages to the media transport manager 1835 (e.g., acknowledgements of received packets from the remote device in the video conference).

Several example operations of the networking manager 1800 were described above. These are only illustrative examples, as various other embodiments will perform these or different operations using different modules or with functionalities spread differently between the modules. Furthermore, additional operations such as dynamic bit rate adjustment may be performed by the modules of networking manager 1800 or other modules.

IV. IN-CONFERENCE ADJUSTMENT AND CONTROL OPERATIONS

A. Picture-in-Picture Modifications

1. Rotate

Figure 19:
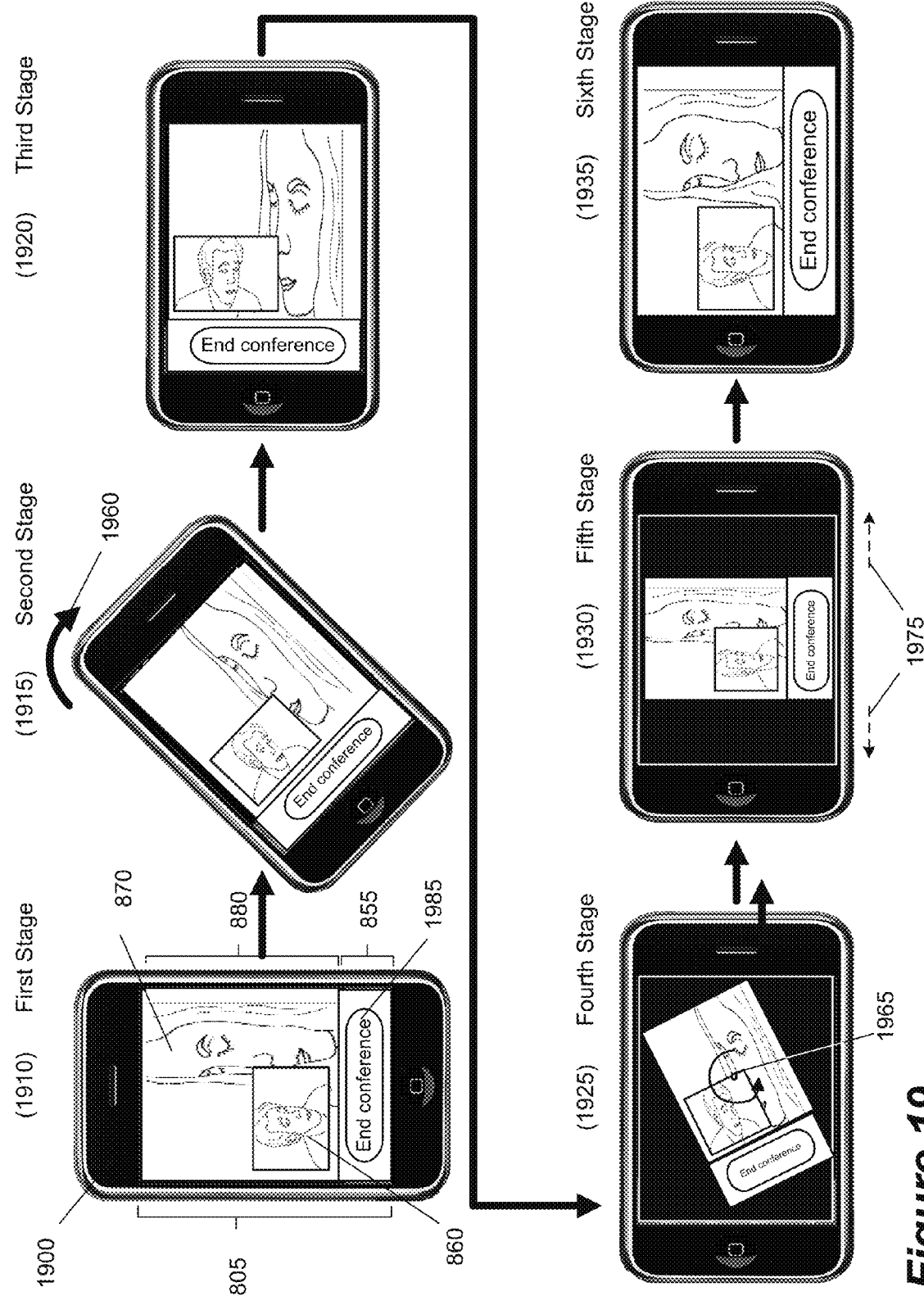
FIG. 19 illustrates a user interface of some embodiments for a PIP display rotation operation.

Some embodiments rotate the PIP display that is presented during a video conference when a user of the mobile device used for the video conference rotates the device during the conference. FIG. 19 illustrates the rotation of a UI 805 of a device 1900 when the device is rotated from a vertical position to a horizontal position. The device 1900 is held vertically when the long side of the screen is vertical whereas the device 1900 is held horizontally when the long side of the screen is horizontal. In the example illustrated in FIG. 19, the UI 805 rotates from a portrait view that is optimized for a vertical holding of the device to a landscape view that is optimized for horizontal holding of the device 1900. This rotation functionality allows the user to view the UI 805 displayed in an upright position when the mobile device 1900 is held either vertically or horizontally.

FIG. 19 illustrates the rotation of the UI 805 in terms of six different operational stages 1910, 1915, 1920, 1925, 1930 and 1935. The first stage 1910 illustrates the UI 805 during a video conference between the local user of the device and a remote user of a remote device. The UI 805 in FIG. 19 shows a PIP display 880 that is the same PIP display shown in the fifth stage of FIG. 8 after the video conference has been established. In this example, the video captured by the local user's device is displayed in the inset display area 860 and the video captured by the remote user's device is displayed in the background display area 870. In the display area 855 below the PIP display 880 includes a selectable UI item 1985 (e.g., an End Conference button 1985), which the user may select to end the video conference (e.g., through a single finger tap).

The second stage 1915 illustrates the UI 805 after the user begins to tilt the device 1900 sideways. In this example, the user has started to tilt the device 1900 from being held vertically to being held horizontally, as indicated by the arrow 1960. The appearance of the UI 805 has not changed. In other situations, the user may want to tilt the device 1900 from being held horizontally to being held vertically instead, and, in these situations, the UI 805 switches from a horizontally optimized view to a vertically optimized view.

The third stage 1920 illustrates the UI 805 in a state after the device 1900 has been tilted from being held vertically to being held horizontally. In this state, the appearance of the UI 805 still has not changed. In some embodiments, the rotation operation is triggered after the device 1900 is tilted past a threshold amount and is kept past this point for a duration of time. In the example illustrated in FIG. 19, it is assumed that the threshold amount and the speed of the rotation do not cause the UI 805 to rotate until a short time interval after the device has been placed in the horizontal position. Different embodiments have different threshold amounts and waiting periods for triggering the rotation operation. For example, some embodiments may have such a low threshold to triggering the rotation operation as to make the UI 805 appear as if it were always displayed in an upright position, notwithstanding the orientation of the device 1900. In other embodiments, the user of the device 1900 may specify when the rotation operation may be triggered (e.g., through a menu preference setting). Also, some embodiments may not delay the rotation after the device is tilted past the threshold amount. Moreover, different embodiments may allow the rotation operation to be triggered in different ways, such as by toggling a switch on the mobile device, by giving voice commands, upon selection through a menu, etc.

The fourth stage 1925 illustrates the UI 805 after the rotation operation has started. Some embodiments animate the rotation display areas to provide feedback to the user regarding the rotation operation. FIG. 19 illustrates an example of one such animation. Specifically, it shows in its fourth stage 1925 the start of the rotation of the display areas 880 and 855 together. The display areas 880 and 855 rotate around an axis 1965 going through the center of the UI 805 (i.e., the z-axis). The display areas 880 and 855 are rotated the same amount but in the opposite direction of the rotation of the device 1900 (e.g., through the tilting of the device 1900). In this example, since the device 1900 has rotated ninety degrees in a clockwise direction (by going from being held vertically to being held horizontally) the rotation operation would cause the display areas 880 and 855 to rotate ninety degrees in a counter clockwise direction. As the display areas 880 and 855 rotate, the display areas 880 and 855 shrink proportionally to fit the UI 805 so that the display areas 880 and 855 may still appear entirely on the UI 805. Some embodiments may provide a message to indicate the state of this device 1900 (e.g., by displaying the word "Rotating").

The fifth stage 1930 illustrates the UI 805 after the display areas 880 and 855 have rotated ninety degrees counter clockwise from portrait view to landscape view. In this stage, the display areas 880 and 855 have been rotated but have not yet expanded across the full width of the UI 805. The arrows 1975 indicate that at the end of the fifth stage, the display areas 880 and 855 will start to laterally expand to fit the full width of the UI 805. Different embodiments may not include this stage since the expansion could be performed simultaneously with the rotation in the fourth stage 1925.

The sixth stage 1935 illustrates the UI 805 after the display areas 880 and 855 have been expanded to occupy the full display of the UI 805. As mentioned above, other embodiments may implement this rotation differently. For some embodiments, simply rotating the screen of a device past a threshold amount may trigger the rotation operation, notwithstanding the orientation of the device 1900.

Figure 20:
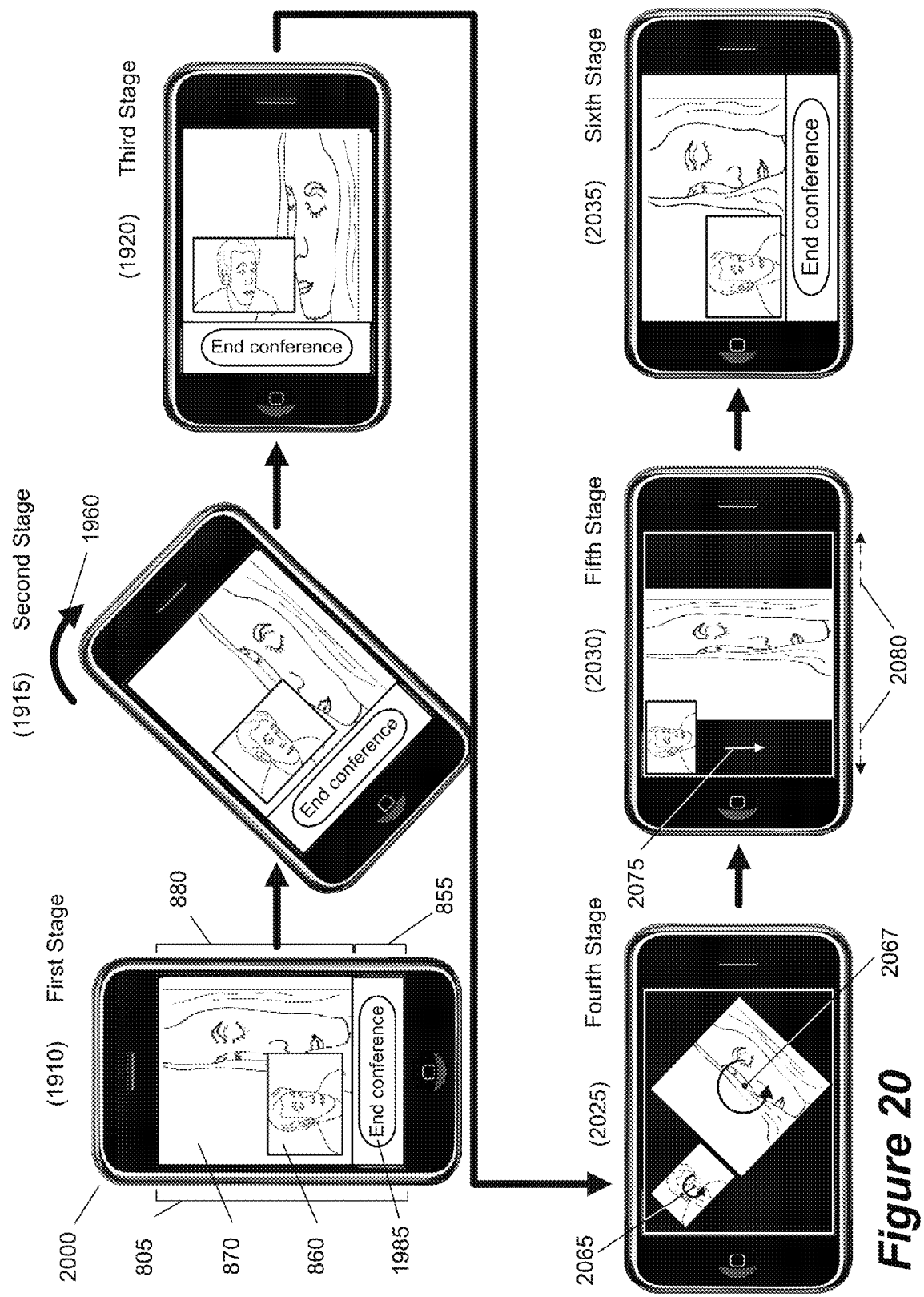
FIG. 20 illustrates another user interface of some embodiments for a PIP display rotation operation.

Also, other embodiments might provide a different animation for indicating the rotation operation. The rotation operation performed in FIG. 19 involves the display areas 880 and 855 rotating about the center of the UI 805. Alternatively, the display areas may be individually rotated about the center axis of their individual display areas. One such approach is shown in FIG. 20. FIG. 20 shows an alternative method to animating the rotation of the display areas 870 and 860 of PIP display 880 of a UI 805. The PIP display 880 illustrated in FIG. 20 is the same PIP display 880 illustrated in FIG. 8.

FIG. 20 illustrates the rotation of the PIP display 880 in terms of six different operational stages 1910, 1915, 1920, 2025, 2030, and 2035. The first three stages of operation of the UI 805 are identical to the first three stages of operation as described in the UI 805 in FIG. 19. At the third stage for both FIGS. 19 and 20, the device 2000 has gone from being held vertically to being held horizontally and the rotation of the UI 805 has not yet begun.

The fourth stage 2025 illustrates the alternative method to animating the rotation. In this stage, the rotation operation has started. Specifically, the fourth stage shows 2025 the start of the rotation of the display areas 870 and 860. The display areas 870 and 860 each rotate around axes 2067 and 2065, respectively, going through the center of each of the display areas (i.e., the z-axis). The display areas 870 and 860 are rotated the same amount but in the opposite direction of the rotation of the device 2000 (e.g., through the tilting of the device 2000). Similar to that illustrated in the fourth stage 1925 of FIG. 19 above, since the device 2000 has rotated ninety degrees in a clockwise direction (by going from being held vertically to being held horizontally) the rotation operation would cause the display areas 870 and 860 to rotate ninety degrees in a counter clockwise direction. As the display areas 870 and 860 rotate, the display areas 870 and 860 shrink proportionally to fit the UI 805 so that the display areas 870 and 860 may still appear entirely on the UI 805.

The fifth stage 2030 illustrates the UI 805 after each of the display areas 870 and 860 have rotated ninety degrees counter clockwise from portrait view to landscape view. In this stage, the display areas 870 and 860 have been rotated but have not yet expanded across the full width of the UI 805. Moreover, the display area 860 has not moved into its final position. The final position of the inset display area 860 in the PIP display 880 is determined by the position of the inset display area 860 in the PIP display 880 as shown in the first stage 1910 (e.g., the inset display area 860 in the lower left corner of the PIP display 880). In this stage, the inset display area 860 is still in the upper left corner of the UI 805.

The arrows 2080 indicate that at the end of the fifth stage 2030, the display areas 870 and 860 will start to laterally expand until the main display area 870 fits the full width of the UI 805 for a device that is held horizontally. Moreover, the arrow 2075 indicates that the inset display area 860 will slide to the lower left corner of the PIP display 880.

Different embodiments may implement this differently. In some embodiments, the moving of the inset display area 860 may occur simultaneously as the expansion of the main display area 870 or sequentially. Moreover, some embodiments may resize the inset display areas 860 before, during or after the expansion of the main display area 870 to create the new PIP display 880. In this example, the display area 855 disappears while the display areas 860 and 870 are rotating. However, the display area 855 may remain on the UI 805 during the rotation and rotate along with the display areas 860 and 870 in some embodiments.

The sixth stage 2035 illustrates the UI 805 after the inset display area 860 has reached its new location and the display areas 860 and 870 have been properly expanded to fit the full width of the UI 805. In this example, the inset display area 860 is now in the lower left corner of the PIP display 880, overlapping the main display area 870. The PIP display 880 now has the same display arrangement as the PIP display 880 from the first stage 1910. The appearance of the display area 855 below the PIP display 880 in the sixth stage indicates that the rotation operation is completed. As noted above, simply rotating the screen of a device past a threshold amount may trigger the rotation operation, notwithstanding the orientation of the device 2000.

Figure 21:
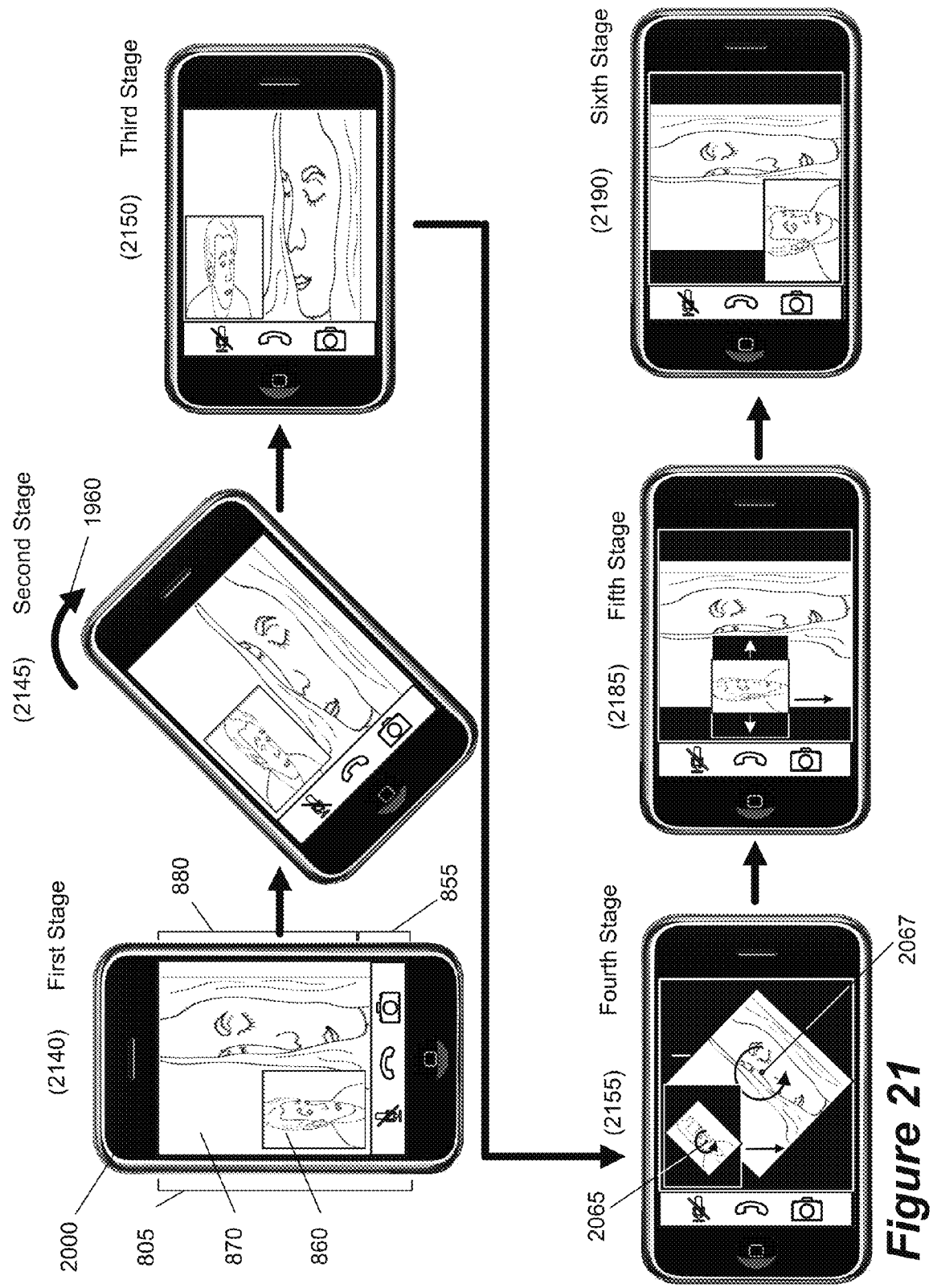
FIG. 21 illustrates another user interface of some embodiments for a PIP display rotation operation.

In the examples described above by reference to FIGS. 19 and 20, the orientation of the display area 870 also changes (i.e., from portrait to landscape). That is, after the display area 870 is rotated in the third stage 1920, the orientation of the display area 870 changes from portrait to landscape by horizontally expanding the PIP display 880 so that it fills the entire UI 805. In some embodiments, when the device 2000 is rotated, video captured by the remote device rotates but the orientation of the display area that displays the video captured by the remote device remains unchanged. One such example is illustrated in FIG. 21. This figure is similar to FIG. 20 except that video displayed in the display area 870 rotates but the display area 870 remains displayed in portrait orientation.

FIG. 21 also illustrates an example of a rotation operation in which the display area 855 remains in the same position (instead of rotating and expanding horizontally to fill the PIP display 880 as shown in FIG. 20). Moreover, this figure includes a layout of the display area 855 that is the same as the layout of the display area 855, described above in FIG. 9. As shown, the display area 855 remains in the same position as the device 2000 rotates in the stages 2140, 2145, 2150, 2155, 2185, and 2190.

Some embodiments provide a rotation operation in which the orientation of the display area that displays video captured by the local device changes (instead of remaining in the same orientation as shown in FIG. 20) to reflect the orientation of the local device after the rotation operation is performed on the local device. FIG. 21 illustrates an example of such a rotation operation of a UI 805 by reference to six different stages 2140, 2145, 2150, 2155, 2185, and 2190. In this figure, the first stage 2140 shows the inset display area 860, which displays video captured by a camera of the device 2000, in a portrait orientation. The second and third stages 2145 and 2150 are similar to the second and third stages 1915 and 1920 of FIG. 20 as they show the tilting of the device 2000 at various stages of the rotation operation. At this point, the camera of the device 2000 is capturing images in a landscape orientation. To indicate this transition, some embodiments provide an animation as shown in fourth and fifth stages 2155 and 2185 while other embodiments do not provide any animation at all.

In the fourth stage 2155, the image displayed in the inset display area 860 is rotated, but not the inset display area 860 itself since the tilting of the device 2000 in the second and third stages 1945 and 2150 has rotated the inset display area 860 to a landscape orientation. In the fifth stage 2185, the rotated image in the inset display area 860 is horizontally expanded to fill the inset display area 860 and the inset display area 860 starts to move towards the lower left area of the PIP display 880 to position the inset display area 860 in the same relative position as the inset display area 860 in the PIP display of the first stage 2140.

Figure 22:
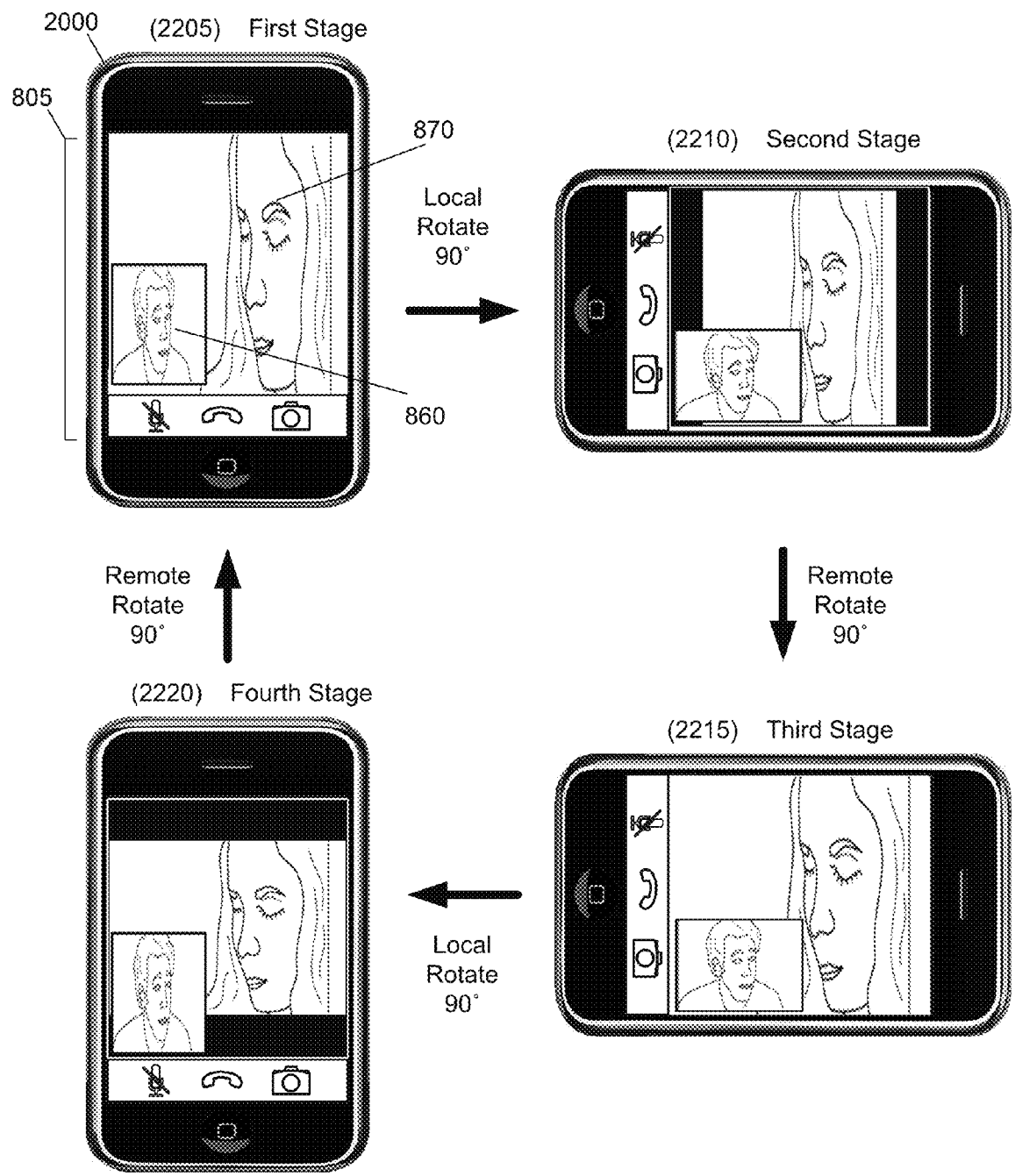
FIG. 22 illustrates another user interface of some embodiments for a PIP display rotation operation.

In some embodiments, the orientation of the display area that displays the video captured by the remote device also changes to reflect the orientation of the remote device after a rotation operation is performed on the remote device. FIG. 22 illustrates four different stages of a UI 805 of the device 2000 in which (1) the orientation of the display area that displays the video captured by the local device (display area 860 in this example) changes to reflect the orientation of the local device after a rotation operation is performed on the local device and (2) the orientation of the display area that displays video captured by the remote device (display area 870 in this example) changes to reflect the orientation of the remote device after a rotation operation is performed on the remote device.

In the first stage 2205, the UI 805 is the same as the UI 805 in FIG. 21. Specifically, the first stage 2205 shows the display areas 860 and 870 in a portrait orientation because the device 2000 is shown in a portrait orientation and the remote device is in a portrait orientation (not shown). From the first stage 2205 to the second stage 2210, a rotation operation is performed on the local device by rotating the device 2000 ninety degrees from an upright position to a sideways position. The second stage 2210 shows the UI 805 after the rotation operation of the device 2000 is completed. In this stage, the videos displayed in the display areas 870 and 860 have rotated to an upright position. However, only the display area 860 of the locally captured video has rotated from a portrait orientation to a landscape orientation since the rotation operation is only performed on the local device (i.e., the device 2000). The display area 870 remains in the portrait orientation.

From the second stage 2210 to the third stage 2215, a rotation operation is performed on the remote device by rotating the remote device from an upright position to a sideways position (not shown). The third stage 2215 shows the UI 805 after the rotation operation of the remote device is completed. In this stage, the video displayed in the display area 870 and the display area 870 of the remotely captured video have rotated from a portrait orientation to a landscape orientation since the rotation operation is only performed on the remote device. Thus, this stage of the UI 805 displays the display areas 870 and 860 of the locally and remotely captured videos both in landscape orientation.

From the third stage 2215 to the fourth stage 2220, a rotation operation is performed on the local device by rotating the device 2000 ninety degrees from a sideways position to an upright position. The fourth stage 2220 shows the UI 805 after the completion of this rotation operation. In this fourth stage 2220, the videos displayed in the display areas 860 and 870 have rotated to an upright position. However, only the display area 860 of the locally captured video has rotated from a landscape orientation to a portrait orientation since the rotation operation is only performed on the local device (i.e., the device 2000). The display area 870 remains in the landscape orientation.

From the fourth stage 2220 to the first stage 2205, a rotation operation is performed on the remote device by rotating the remote device ninety degrees from a sideways position to an upright position (not shown). In this case, the first stage 2205 shows the display area 870 after the completion of this rotation operation. Therefore, the UI 805 of this stage shows the display areas 860 and 870 in a portrait orientation. Although FIG. 22 illustrates a sequence of different rotation operations, other embodiments can perform any number of rotation operations in any number of different sequences.

FIGS. 19, 20, 21, and 22 describe rotate operations performed on local and remote devices during a video conference. When a rotate operation is performed on the local mobile device, some embodiments notify the remote device of the rotate operation in order for the remote device to perform any modifications to the local device's video (such as rotating the display area that is displaying the local device's video). Similarly, when a rotate operation is performed on the remote device, the remote device notifies the local device of this operation to allow the local device to perform any modifications the remote device's video. Some embodiments provide a control communication channel for communicating the notification of rotate operations between the local and remote devices during the video conference.

Even though FIGS. 19, 20, 21, and 22 illustrate different manners in which the animation of a rotation can be performed, one of ordinary skill will realize that other embodiments may display the animation of the rotation in other different ways. In addition, the animation of the rotation operation can cause changes to the image processing operations of the local mobile device such as causing the video conference manager 1204 to re-composite the display area(s) at different angles in the UI 805 and scale the images displayed in the display area(s).

2. Identifying Regions of Interest

Figure 23:
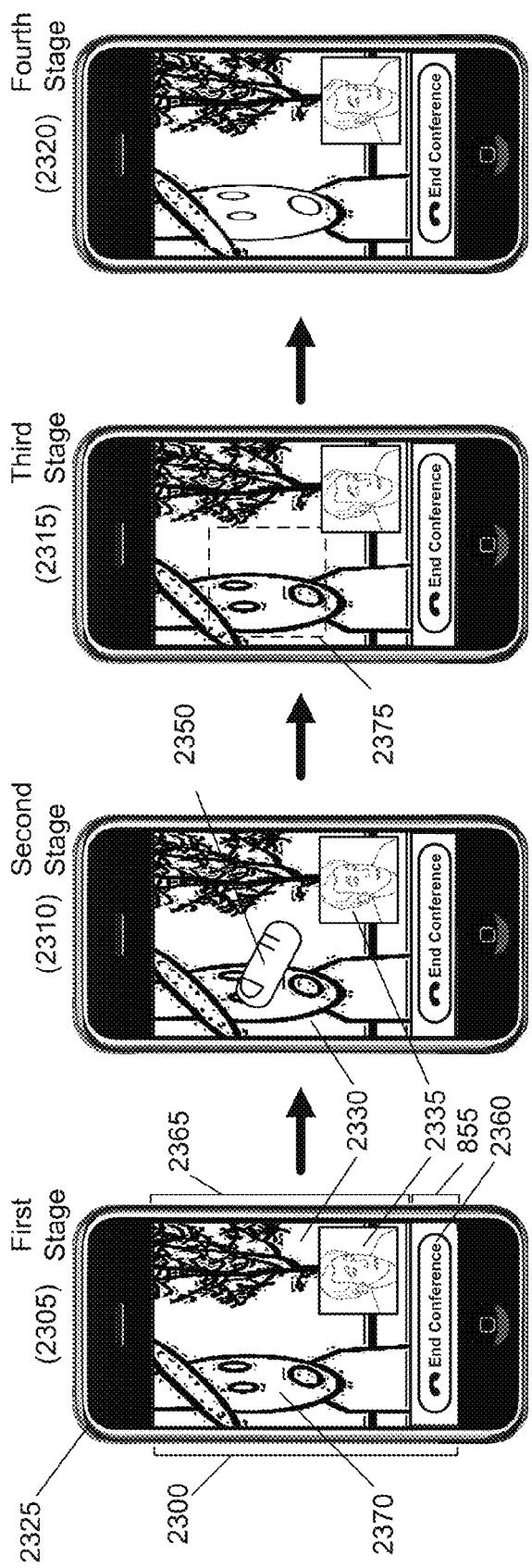
FIG. 23 illustrates a user interface of some embodiments for identifying a region of interest in a display.

Some embodiments allow a user to identify a region of interest (ROI) in a displayed video during a video conference in order to modify the image processing (e.g., the image processing manager 1208 in FIG. 12), the encoding (e.g., the encoder 1255 in FIG. 12), the behavior of the mobile devices and their cameras during the video conference, or a combination thereof. Different embodiments provide different techniques for identifying such a region of interest in a video. FIG. 23 illustrates a user interface of some embodiments for identifying a region of interest in a video in order to improve the image quality of the video.

In FIG. 23, a UI 2300 of a mobile device 2325 presents a PIP display 2365 during a video conference with a remote user of another mobile device. The PIP display in FIG. 23 includes two video displays: a background main display 2330 and a foreground inset display 2335. In this example, the background main display 2330 presents a video of a tree and a person with a hat, which are assumed to be a tree and a person whose video is being captured by the remote device's front camera or a tree and a person whose video is being captured by the remote device's back camera. The foreground inset display 2335 presents a video of a man, which in this example is assumed to be a man whose video is being captured by the local device's front camera or a person whose video is being captured by the local device's back camera. Below the PIP display is a display area 855 that includes a selectable UI item 2360 labeled "End Conference" (e.g. a button 2360) that allows the user to end the video conference by selecting the item.

This PIP display is only one manner of presenting a composite view of the videos being captured by the remote and local devices. Some embodiments may provide other composite views. For instance, instead of having a larger background display for the video from the remote device, the larger background display can be of the video from the local device and the smaller foreground inset display can be of the video from the remote device. Also, some embodiments allow the local and remote videos to appear in the UI in two side-by-side display areas (e.g. left and right display windows, or top and bottom display windows) or two diagonally aligned display areas. In other embodiments, the PIP display may also contain a larger background display and two smaller foreground inset displays. The manner of the PIP display or a default display mode may be specified by the user in some embodiments.

FIG. 23 illustrates the ROI identification operation in terms of four operational stages of the UI 2300. As shown in the first stage 2305, the video presented in the background display 2330 has very low quality (i.e., the video images are fuzzy). In this example, a user of a mobile device 2325 would like to identify the area in the background display 2330 where the person's face 2370 appears as the region of interest.

In the second stage 2310, the operation of identifying a region of interest is initiated. In this example, the operation is initiated by selecting an area in the video presented in the background display 2330 that the user wants to identify as the region of interest (e.g., by tapping a finger 2350 on the device's screen at a location about the displayed person's face 2370 in the background display 2330).

As shown in the third stage 2315, the user's selection of the area causes the UI 2300 to draw an enclosure 2375 (e.g., a dotted square 2375) surrounding the area of the user's selection. The fourth stage 2320 displays the UI 2300 after the identification of the region of interest has been completed. As a result of this process, the quality of the video within the region of interest has been substantially improved from that in the first stage 2305. The removal of the enclosure 2375 indicates that the ROI selection operation is now completed. In some embodiments, the ROI identification process also causes the same changes to the same video displayed on the remote device as it does to the local device 2325. In this example for instance, the picture quality within the region of interest of the same video displayed on the remote device is also substantially improved.

In some embodiments, the user may enlarge or shrink the enclosure 2375 in the third stage 2315 (e.g., by holding the finger 2350 down on the display and moving the finger 2350 toward the upper right corner of the screen to enlarge the enclosure 2375 or moving the finger 2350 toward the lower left corner of the screen to shrink the enclosure 2375). Some embodiments also allow the user to relocate the enclosure 2375 in the third stage 2315 (e.g., by holding the finger 2350 down on the display and moving the finger 2350 horizontally or vertically on the display). In some other embodiments, the selection of the area may not cause the UI 2300 to draw the enclosure 2375 at all in the third stage 2315.

Figure 24:
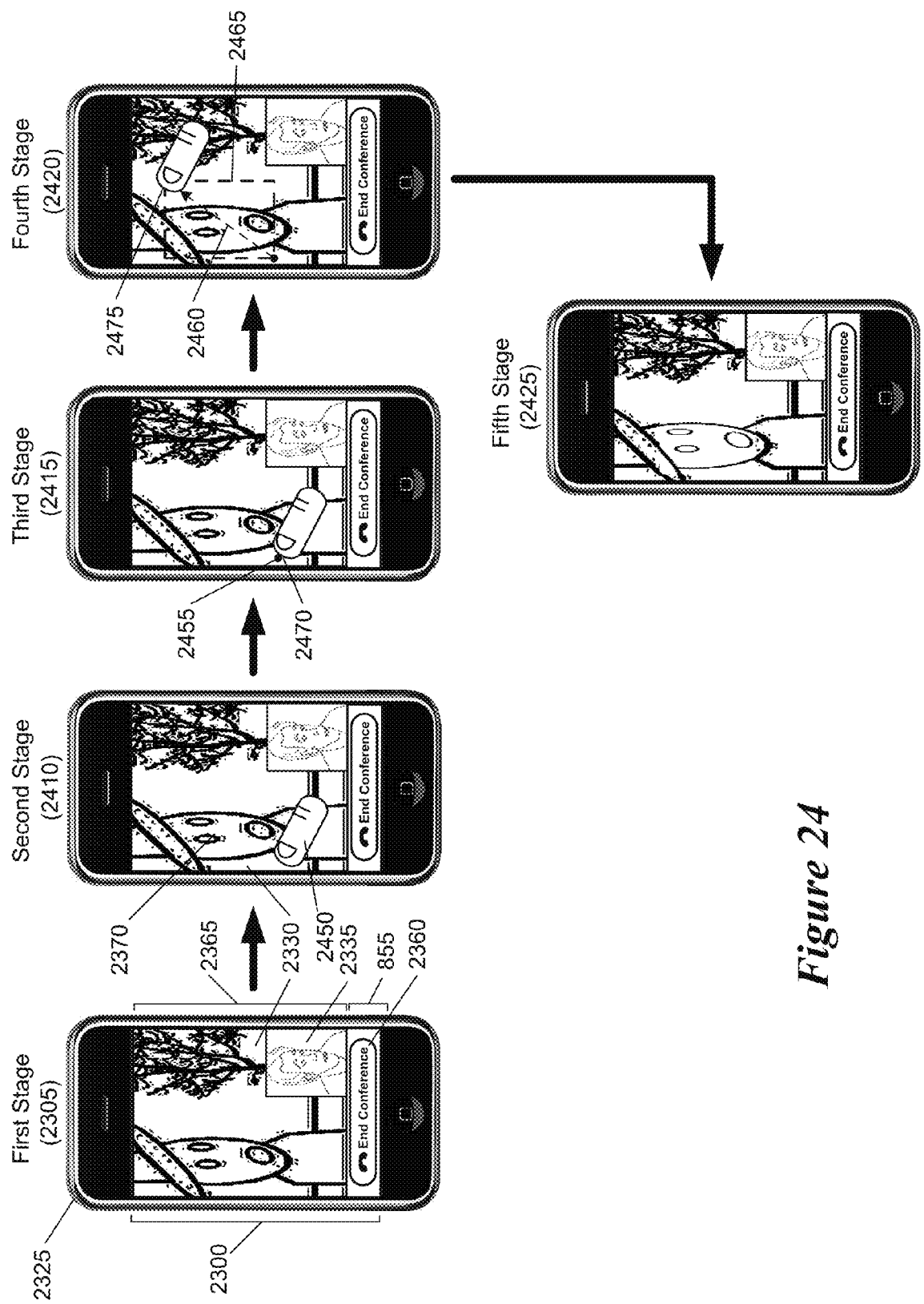
FIG. 24 illustrates another user interface of some embodiments for identifying a region of interest in a display.

Other embodiments provide different techniques for allowing a user to identify a region of interest in a video. FIG. 24 illustrates one such other technique. In FIG. 24, the user identifies a region of interest by drawing a shape that bounds the region. The shape in this example is a rectangle, but it can be other shapes (e.g., any other polygon, a circle, an ellipse, etc.). Some embodiments provide this alternative technique of FIG. 24 in a device UI that also provides the technique illustrated in FIG. 23. Other embodiments, however, do not provide both these techniques in the same UI.

FIG. 24 illustrates this ROI identification operation in terms of five operational stages of a UI 2300. The first stage 2305 in FIG. 24 is identical to the first stage 2305 in FIG. 23. Specifically, in this first stage 2305, the UI 2300 illustrates a PIP display 2365 with a larger background main display 2330 and a smaller foreground inset display 2335 at the bottom left corner of the PIP display 2365.

In the second stage 2410, the operation of identifying a region of interest is initiated. In this example, the operation is initiated by selecting for a duration of time a first position for defining the region of interest in a video presented in the background display area 2330 (e.g., by holding a finger 2450 down on the device's screen at a location about the displayed person's face 2370 in the background display 2330 for a duration of time). In the third stage 2415, the UI 2300 indicates that the first position 2470 has been selected in terms of a dot 2455 next to the selected first position on the background display area 2330.

The fourth stage 2420 illustrates the UI 2300 after the user has selected a second position 2475 for defining the region of interest. In this example, the user selects this second position 2475 by dragging the finger 2450 across the device's screen from the first location after the dot 2455 appears and stopping at a location between the displayed hat and the displayed tree in the background display area 2330, as indicated by an arrow 2460. As shown in the fourth stage, this dragging caused the UI 2300 to draw a rectangular border 2465 for the region of interest area that has the first and second positions 2470 and 2475 at its opposing vertices.

The fifth stage 2425 illustrates the UI 2300 after identification of the region of interest has been completed. In this example, the user completes identification of the region of interest by stopping the dragging of the finger 2450 and removing the finger 2450 from the device's display screen once the desired region of interest area has been identified. The fifth stage 2425 illustrates that as a result of the drawing process, the quality of the video within the region of interest has been substantially improved from that in the first stage 2305. In some embodiments, the drawing process also causes the same changes to the display on the remote device as it does to the local device 2325. In this example for instance, the picture quality within the region of interest of the same video displayed on the remote device will be substantially improved.

The description of FIGS. 23 and 24, above, illustrates different manners of identifying a region of interest in a video in order to improve the picture quality of the identified region. In some embodiments, improving the picture quality of the identified region of interest causes changes to the encoding operations of the dual camera mobile device such as allocating more bits to the identified region when encoding the video.

Figure 25:
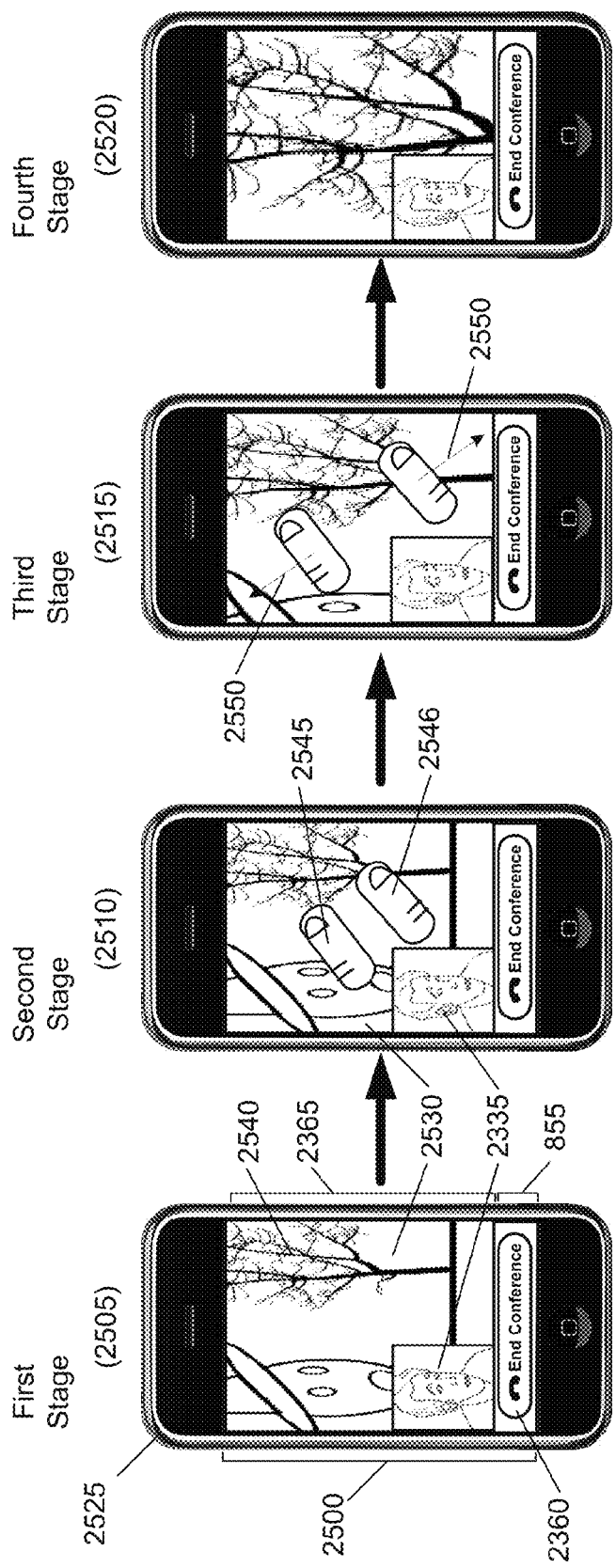
FIG. 25 illustrates another user interface of some embodiments for identifying a region of interest in a display.

Some embodiments allow the user to identify a region of interest in a video to make different changes to the mobile devices or their cameras. For instance, FIG. 25 illustrates an example of identifying a region of interest in a video to expand or shrink the region of interest area on the display. In this approach, the user identifies a region of interest in a video by selecting an area on the display as the center of the region of interest and then expanding or shrinking the region of interest area.

In FIG. 25, a UI 2500 of a mobile device 2525 presents a PIP display 2365 during a video conference with a remote user of another mobile device. The PIP display 2365 in FIG. 25 is substantially similar to the PIP display 2365 of FIG. 23, but the foreground inset display 2335 of FIG. 25 is located in the lower left corner of the PIP display 2365.

FIG. 25 illustrates the ROI selection operation in terms of four operational stages of the UI 2500. As shown in the first stage 2505, the background display 2530 presents a video with a man on the left and a tree 2540 on the right of the display 2530. Moreover, the tree 2540 is relatively small and occupies only the right side of the background display area 2530. In this example, a user of a mobile device 2525 would like to identify the area where the tree 2540 appears on the display 2530 as the region of interest.

In the second stage 2510, the operation of identifying a region of interest is initiated. In this example, the operation is initiated by selecting an area 2540 in the video presented in the background display 2530 that the user wants to identify as the region of interest (e.g., by holding two fingers 2545 and 2546 down on the background display area 2530 where the tree 2540 is displayed). At this stage 2510, the user can make the region of interest area 2540 expand and take a larger portion of the background display area 2530 by dragging his fingers 2545 and 2546 farther away from each other. The user can also make the region of interest 2540 shrink to take a smaller portion of the background display area 2530 by dragging his fingers 2545 and 2546 closer together.

The third stage 2515 illustrates the UI 2500 after the user has started to make the region of interest 2540 expand to take up a larger portion of the background display area 2530 by moving his fingers 2545 and 2546 farther away from each other (i.e., the finger 2545 moves toward the upper left corner of the background display area 2530 and the finger 2546 moves toward the lower right corner of the display 2530), as indicated by arrows 2550. In some embodiments, the finger movement also causes the same changes to the display of the remote device as it does to the local device. In this example for instance, the region of interest of the same video will expand and take up a larger portion of the background display area 2530 of the remote device. In some embodiments, the expansion of the region of interest in the local display and/or remote display causes one or both of the mobile devices or their cameras to modify one or more of their other operations, as further described below.

The fourth stage 2520 displays the UI 2500 after the identification of the region of interest has been completed. In this example, the user completes the identification of the region of interest by stopping the dragging of his fingers 2545 and 2546 and removing the fingers 2545 and 2546 from the device's display screen once the region of interest has reached the desired proportion in the background display area 2530. As a result of this process, the region of interest has taken up a majority of the background display 2530. The identification of the region of interest operation is now completed.

Some of the examples above illustrate how a user may identify a region of interest in a video for improving the image quality within the selected region of interest in the video (e.g., by increasing the bit rate for encoding the region of interest portion of the video). In some embodiments, identifying a region of interest in the video causes changes to the image processing operations of the mobile device such as exposure, scaling, focus, etc. For example, identifying a region of interest in the video can cause the video conferencing manager 1204 to scale and composite the images of the video differently (e.g., identifying a region of interest to which to zoom).

In other embodiments, identifying a region of interest in the video causes changes to the operation of the mobile device's camera(s) (e.g., frame rate, zoom, exposure, scaling, focus, etc.). In yet other embodiments, identifying a region of interest in the video causes changes to the encoding operations of the mobile device like allocating more bits to the identified region, scaling, etc. In addition, while the example ROI identification operations described above may cause only one of the above-described modifications to the mobile device or its cameras, in some other embodiments the ROI identification operation may cause more than one of the modifications to the operation of the mobile device or its cameras. In addition, in some embodiments, the layout of the display area 855 in FIGS. 23-25 is the same as the layout of the display area 855 of FIG. 9, described above.

B. Switch Camera

Some embodiments provide procedures to switch cameras (i.e., change the camera by which images are captured) during a video conference. Different embodiments provide different procedures for performing the switch camera operation. Some embodiments provide procedures performed by a dual camera mobile device for switching cameras of the device (i.e., local switch) while other embodiments provide procedures for the dual camera mobile device to instruct another dual camera mobile device in the video conference to switch cameras of the other device (i.e., remote switch). Yet other embodiments provide procedures for both. Section IV.B.1 will describe a process for performing a local switch camera operation on a dual camera mobile device. Section IV.B.2 will describe a process for performing a remote switch camera operation on the dual camera mobile device.

1. Local Switch Camera

Figure 26:
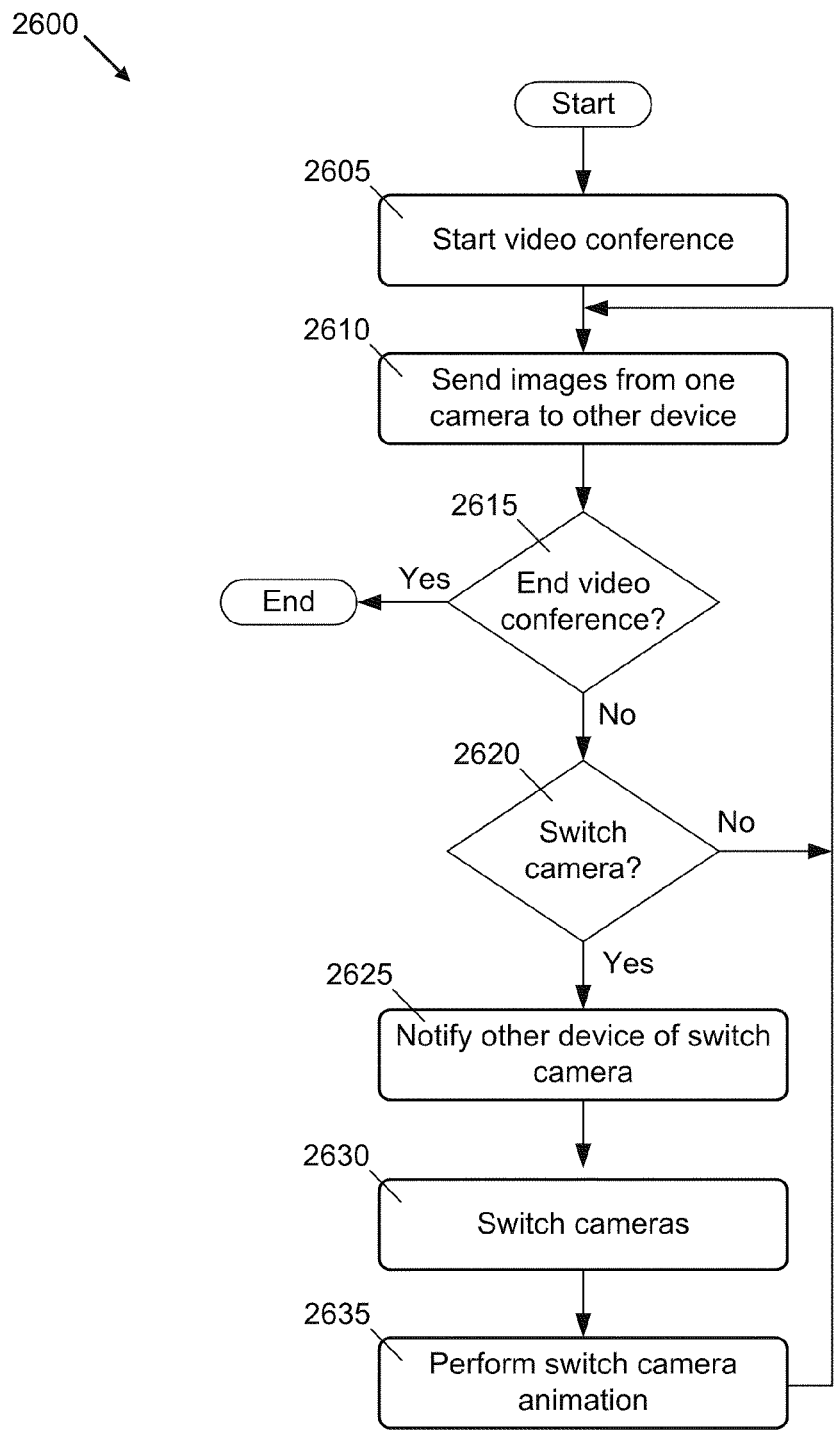
FIG. 26 illustrates a process of some embodiments for performing a local switch camera operation on a dual camera mobile device.

FIG. 26 illustrates a process 2600 that some embodiments perform on a local dual camera mobile device to switch between the two cameras of the device during a video conference with a remote mobile device that includes at least one camera. In some embodiments, the process 2600 is performed by the video conference manager 1204 shown in FIG. 12. For purposes of explanation, the discussion will refer to one camera of the local dual camera mobile device as camera 1 and the other camera of the local dual camera mobile device as camera 2.

The process 2600 begins by starting (at 2605) a video conference between the local dual camera mobile device and the remote mobile device. Next, the process 2600 sends (at 2610) a video image from the currently selected camera (e.g., the camera 1) of the local dual camera mobile device to the remote mobile device for display on the remote mobile device. At 2610, the process also generates and displays a composite display based on this video image and the video image that it receives from the remote mobile device.

The process 2600 then determines (at 2615) whether a request to end the video conference is received. As described above, a video conference can end in some embodiments at the request of a user of the local dual camera mobile device (e.g., through a user interface of the local dual camera mobile device) or a user of the remote mobile device (e.g., through a user interface of the remote mobile device). When the process 2600 receives a request to end the video conference, the process 2600 ends.

When the process 2600 does not receive a request to end the video conference, the process 2600 then determines (at 2620) whether the user of the local dual camera mobile device has directed the device to switch cameras for the video conference. The process 2600 returns to operation 2610 when the process 2600 determines (at 2620) that it has not been directed to switch cameras. However, when the process 2600 determines (at 2620) that it has been so directed, the process 2600 transitions to 2625.

At 2625, the process 2600 sends a notification to the remote mobile device to indicate that the local dual camera mobile device is switching cameras. In some embodiments, the process 2600 sends the notification through the video conference control channel that is multiplexed with the audio and video channels by the VTP Manager 1825 as described above.

After sending its notification, the process 2600 performs (at 2630) a switch camera operation. In some embodiments, performing (at 2630) the switch camera operation includes instructing the CIPU to stop capturing video images with the camera 1 and to start capturing video images with the camera 2. These instructions can simply direct the CIPU to switch capturing images from the pixel array associated with the camera 2 and to start processing these images. Alternatively, in some embodiments, the instructions to the CIPU are accompanied by a set of initialization parameters that direct the CIPU (1) to operate the camera 2 based on a particular set of settings, (2) to capture video generated by the camera 2 at a particular frame rate, and/or (3) to process video images from the camera 2 based on a particular set of settings (e.g., resolution, etc.).

In some embodiments, the switch camera instruction (at 2630) also includes instructions for switching the unused camera to the fourth operational power mode as described above. In this example, the switch camera instructions include instructions for the camera 2 to switch to its fourth operational power mode. In addition, the switch camera instructions also include instructions for the camera 1 to switch from its fourth operational power mode to another operational power mode such as the first operational power mode to conserve power or to the third operational power mode so it can quickly switch to the fourth operational power mode and start capturing images when requested to do so. The switch camera operation 2630 also involves compositing images captured by the camera 2 of the local dual camera mobile device (instead of images captured by the camera 1) with images received from the remote mobile device for display on the local dual camera mobile device.

After directing the switch camera at 2630, the process 2600 performs (at 2635) a switch camera animation on the local dual camera mobile device to display a transition between the display of images from the camera 1 and the display of images from the camera 2. Following the switch camera animation on the local dual camera mobile device, the process 2600 loops back through operations 2610-2620 until an end video conference request or a new switch camera request is received.

Figure 27:
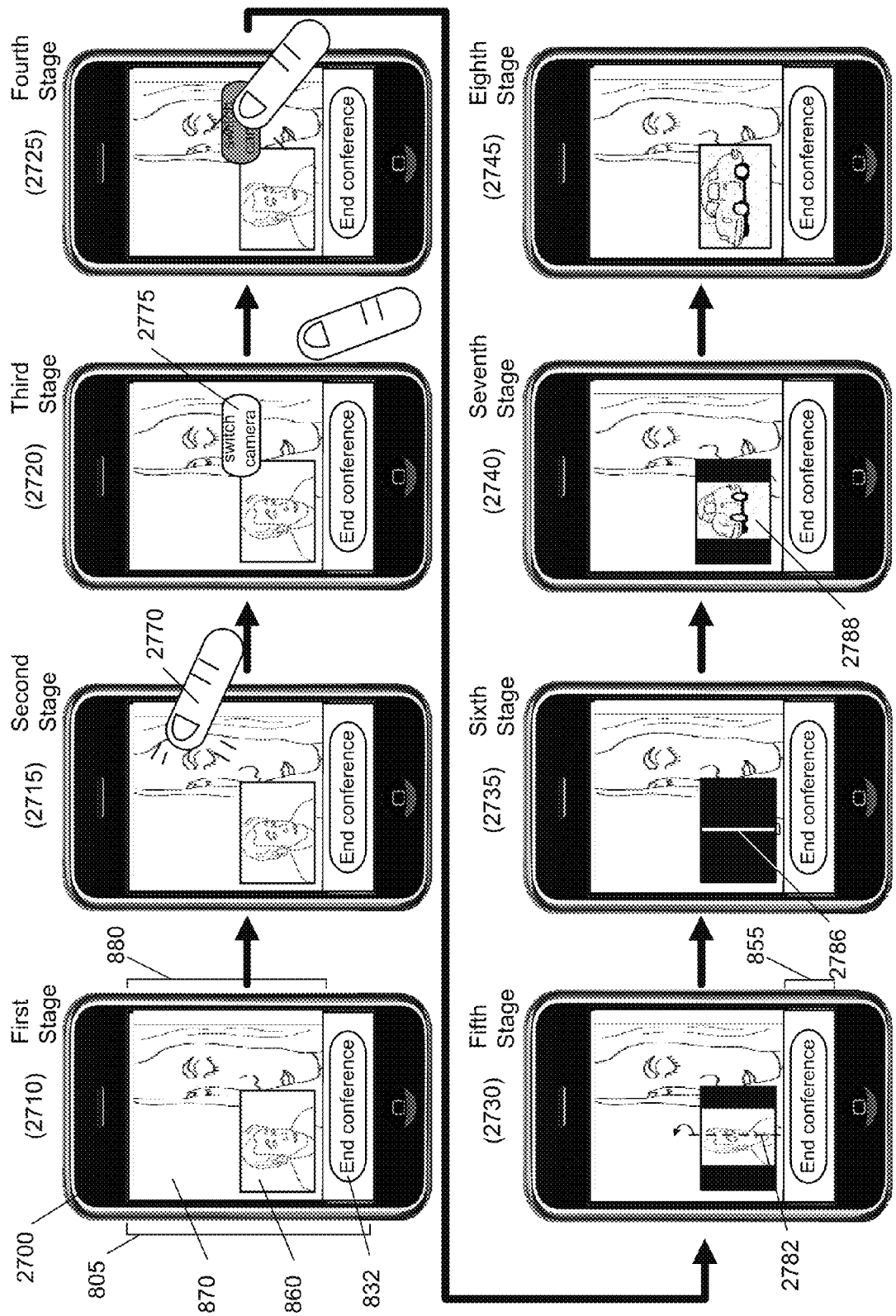
FIG. 27 illustrates a user interface of some embodiments for a switch camera operation.

FIG. 27 illustrates one example of how some embodiments allow a switch camera operation to be requested through a UI 805 of a dual camera device and how these embodiments animate the switch camera operation. This figure illustrates the switch camera operation in terms of eight different operational stages 2710, 2715, 2720, 2725, 2730, 2735, 2740, and 2745 of the UI 805 of the device. The first four stages 2710, 2715, 2720, and 2725 of the UI 805 illustrate an example of receiving a user's request to switch cameras. The user of the device has other mechanisms to make such a request in some embodiments of the invention.

The first stage 2710 is the same as the fifth stage 830 of the UI 805 of FIG. 8, which shows the UI 805 after a video conference is set up. At this stage, the UI 805 displays a PIP display that includes two video displays: a larger background display from the remote camera and a smaller foreground inset display from the local camera. In this example, the background main display area 870 presents a video of a lady, which in this example is assumed to be a lady whose video is being captured by the remote device, while the foreground inset display area 860 presents a video of a man, which in this example is assumed to be a man whose video is being captured by the local device's front camera.

The second stage 2715 then shows the initiation of the switch camera operation through the selection of the PIP display area 880 of the UI 805. As shown, a selection is made by placing the user's finger 2770 on the PIP display 880. The third stage 2720 shows the UI 805 that includes a selectable UI item 2775 (e.g., switch camera button 2775) for requesting a switch between the cameras of the local device 2700 during the video conference. The fourth stage 2725 illustrates the UI 805 after the user of the local device 2700 selects (e.g., through a single finger tap) the selectable UI item 2775, and after this selection is indicated through the highlighting of the selectable UI item 2775. By selecting this selectable UI item 2775, the user is directing the device 2700 to switch from the front camera of the device 2700 to the back camera of the device 2700 during the video conference. In other examples where the back camera of the device 2700 is capturing video, the user's selection of the selectable UI item 2775 directs the device 2700 to switch from the back camera of the device 2700 to the front camera of the device 2700. After the fourth stage, the video conference manager sends instructions to the CIPU and the remote device to start the switch camera operation.

The last four stages 2730, 2735, 2740, and 2745 of the UI 805 illustrate an example of a switch camera animation on the local device. This animation is intended to provide an impression that the video captured from the front and the back cameras of the local device are being concurrently displayed on two opposing sides of a viewing pane that can have only one of its sides viewed by the user at any given time. When a switch camera is requested in the middle of a video conference, this viewing pane is made to appear to rotate around the vertical axis such that the presentation of one camera's video on one side of the viewing pane that was previously showing one camera's video to the user rotates away from the user until it is replaced by the other side of the viewing pane, which shows the video of the other camera. This animation and appearance of the perceived viewing pane's rotation is achieved by (1) gradually shrinking and applying perspective correction operations on the video image from one camera in the display area for that camera, followed by (2) a gradual expansion and reduction in perspective correction operation to the video image from the other camera in the display area.

Accordingly, the fifth stage 2730 illustrates the start of the "rotation of the viewing pane" about the vertical axis 2782. To give an appearance of the rotation of the viewing pane, the UI 805 has reduced the size of the front camera's video image in the video display area 860, and has applied perspective operations to make it appear that the right side of the video image is farther from the user than the left side of the video image.

The sixth stage 2735 illustrates that the viewing pane has rotated by 90 degrees such that the user can only view the edge of this pane, as represented by the thin line 2786 displayed in the middle of the display area 860. The seventh stage 2740 illustrates that the viewing pane has continued to rotate such that the backside of the viewing pane 2788 is now gradually appearing to the user in order to show the video captured from the user's back camera. Again, this representation of the rotation animation is achieved in some embodiments by reducing the size of the back camera's video image in the video display area 2788, and applying perspective operations to make it appear that the left side of the video image is farther from the user than the right side of the video image.

The eighth stage 2745 illustrates the completion of the animation that shows the switch camera operation. Specifically, this stage displays in the display area 860 the video image of a car that is being captured by the back camera of the device 2700.

Figure 28:
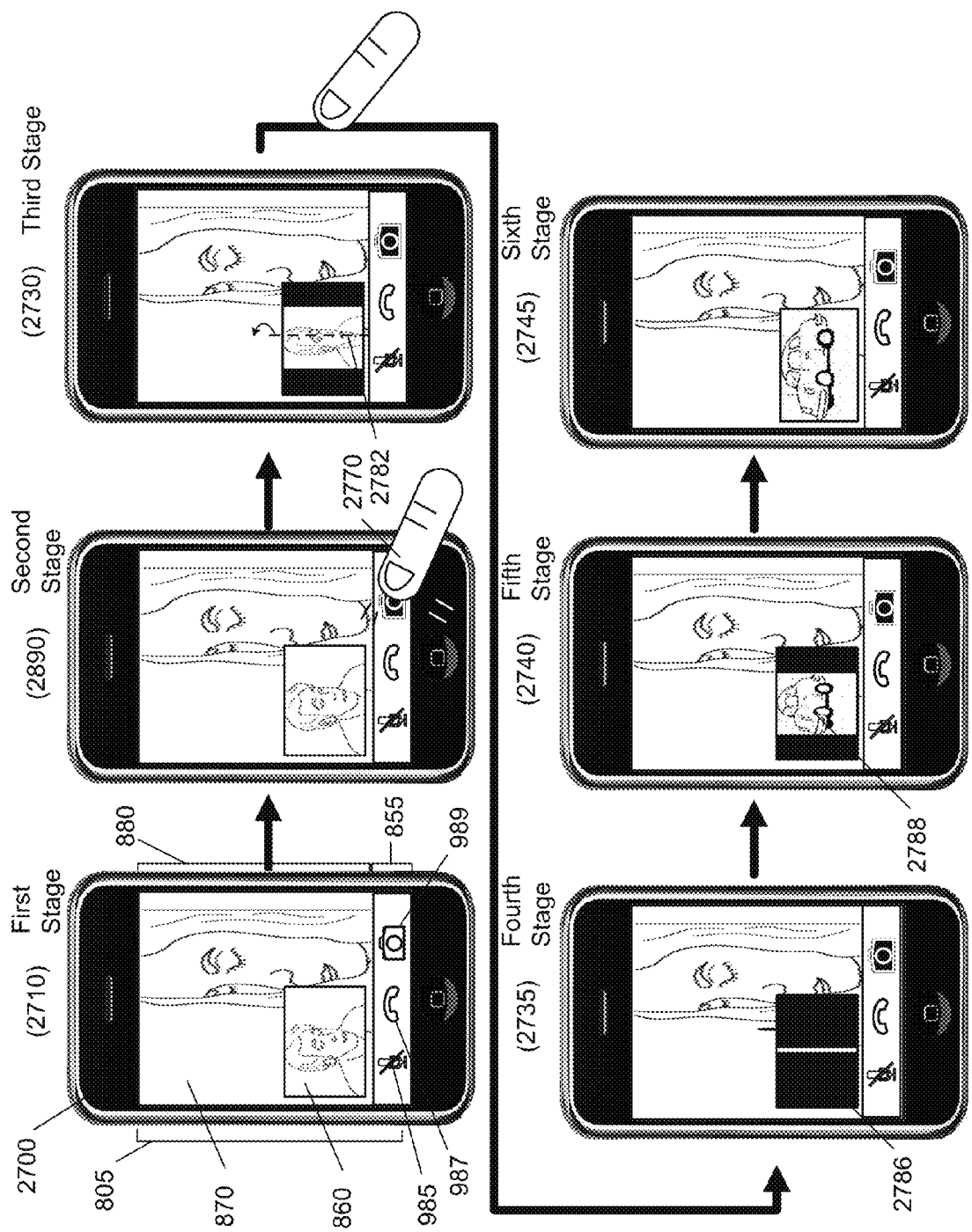
FIG. 28 illustrates another user interface of some embodiments for a switch camera operation.

The example described above by reference to FIG. 27 invokes a switch camera operation through a switch camera user interface. Other embodiments invoke a switch camera operation differently. For example, some embodiments invoke the switch camera operation by having a switch camera selectable UI item permanently displayed on a UI during a video conference such the UI 805 of FIG. 28. In FIG. 28, a switch camera button 989 is shown in a display area 855 along with a mute button 985 and an end conference button 987. The layout of the display area 855 is the same layout of the display area 855, described above by reference to FIG. 9.

FIG. 28 illustrates the switch camera operation of a UI 805 in terms of six stages: 2710, 2890, 2730, 2735, 2740, and 2745. The first stage 2710 of FIG. 28 is similar to the first stage 2710 of FIG. 27 except that the layout of the display area 855 shows a mute button 985, an end conference button 987, and a switch camera button 989 instead of a single end conference button. The second stage 2890 illustrates the UI 805 after the user of the local device 2700 selects (e.g., through a single finger tap using a finger 2770) the switch camera selectable UI item 989. In this example, by selecting this selectable UI item 989, the user directs the device 2700 to switch from the front camera of the device 2700 to the back camera of the device 2700 during the video conference. The last four stages of FIG. 28 are similar to the last four stages of FIG. 27 except the layout of the display area 855 is the same as the layout described above in the first stage 2710 and therefore will not be further described in order to not obscure the description of the invention with unnecessary detail.

Figure 29:
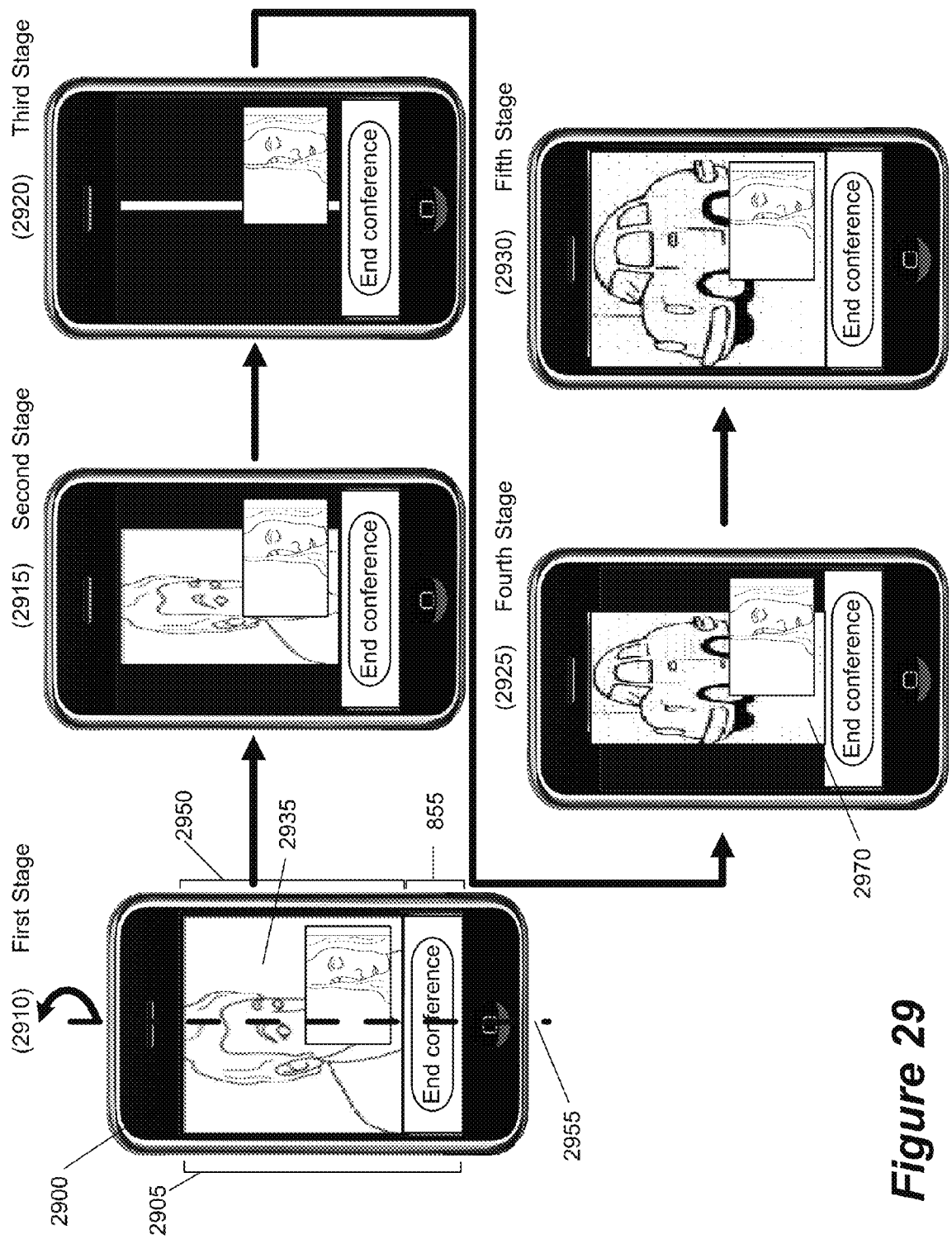
FIG. 29 illustrates another user interface of some embodiments for a switch camera operation.

In some embodiments, when the remote mobile device receives images from a different camera of the local dual camera mobile device (i.e., the local dual camera mobile device switched cameras), the remote mobile device also performs a switch camera animation to display a transition between the display of image from one camera of the local dual camera mobile device and the display of images from the other camera of the local dual camera mobile device. FIG. 29 illustrates an example of one of such switch camera animation in terms of five operational stages 2910, 2915, 2920, 2925, and 2930 of a UI 2905. This figure shows an example switch camera animation on the remote mobile device 2900. The operational stages are the same as the example animation of FIG. 27 except the animation is performed on images displayed in the display area 2935, which is where images from the local dual camera mobile device are displayed on the remote mobile device 2900. As such, the image of the man displayed in the display area 2935 is animated to appear to rotate 180 degrees on a vertical axis 2955 located in the middle of the display area 2950 to show the transition between the display of the image of the man in the display area 2935 and the display of the image of a car 2970. The implementation of the switch camera animation of some embodiments is the same as the implementation of the animation described above.

Figure 30:
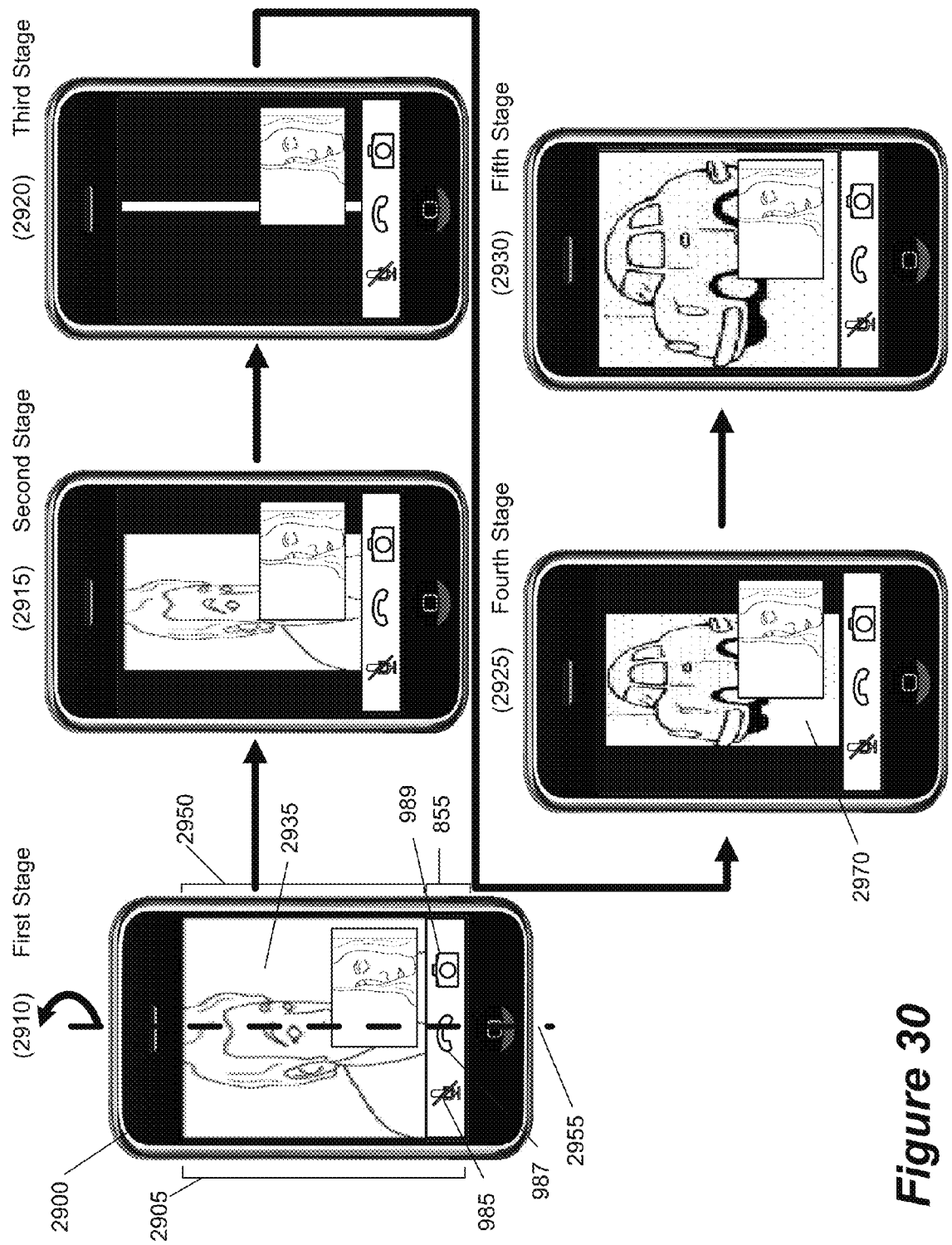
FIG. 30 illustrates another user interface of some embodiments for a switch camera operation.

The above example illustrates a switch camera animation on a remote device with a particular user interface layout. Other embodiments might perform this switch camera animation on a remote device with a different user interface layout. For instance, FIG. 30 illustrates one such example of a remote device 2900 that has a different user interface layout 2905. In particular, UI 2905 of FIG. 30 has a mute button 985, an end conference button 987, and a switch camera button 989 included in a display area 855, which is permanently displayed on one side of the composite display 2950 during a video conference. The layout of the three buttons is described above by reference to FIG. 29. Other than the different user interface layout, the five stages 2910, 2915, 2920, 2925, and 2930 of FIG. 30 are identical to the five stages 2910, 2915, 2920, 2925, and 2930 of FIG. 29.

2. Remote Switch Camera

Figure 31:
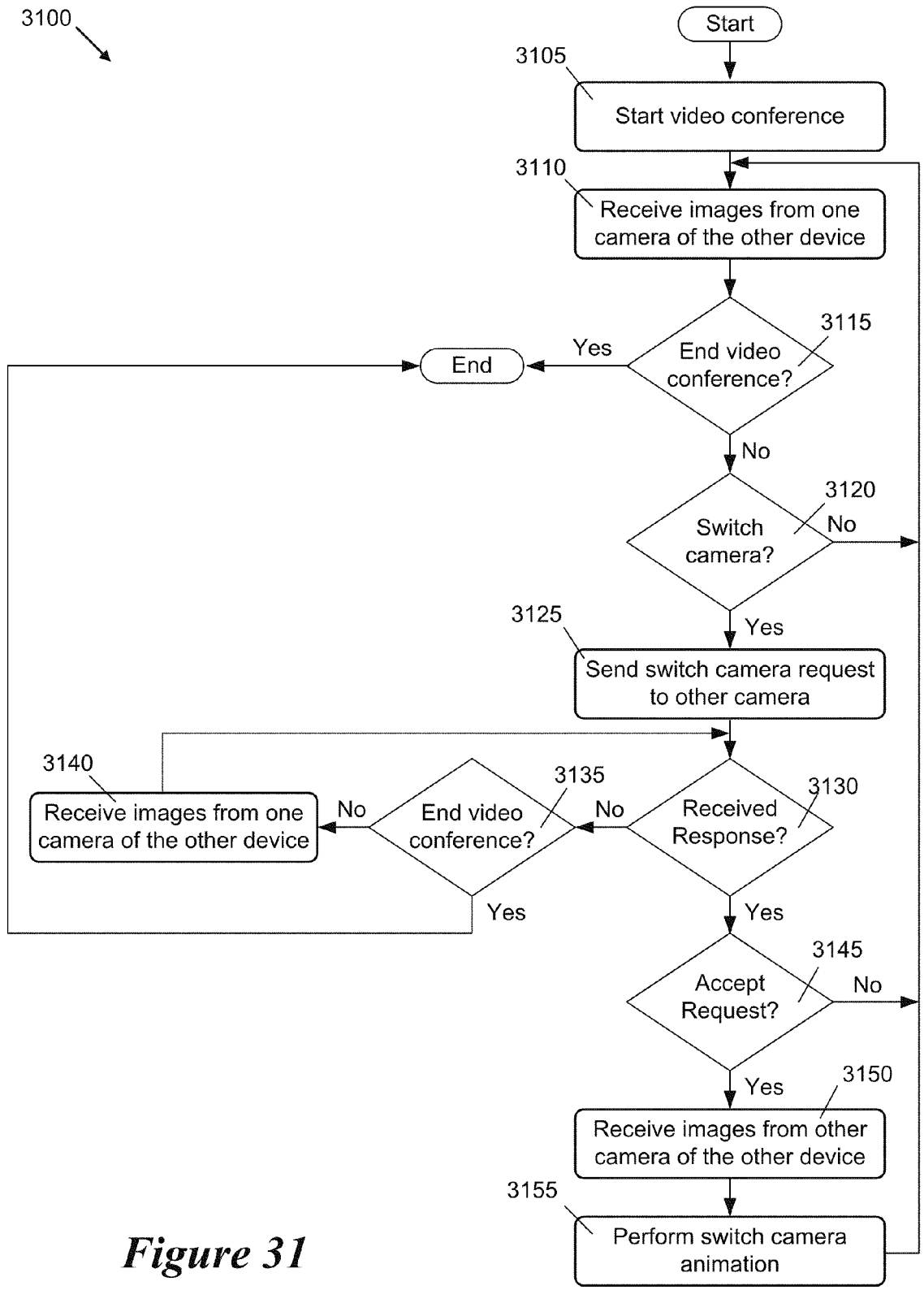
FIG. 31 illustrates a process of some embodiments for performing a remote switch camera operation on a dual camera mobile device.

FIG. 31 illustrates a process 3100 for switching between two cameras of a remote dual camera device during a video conference. This process 3100 is performed by a video conference manager of a device that includes at least one camera. In the following discussion, the device through which a user directs a remote switch camera is referred to as the local device while the device that switches between its two cameras is referred to as the remote device. Also, in the discussion below, the remote device is said to switch between its front camera (or camera 1) and its back camera (or camera 2).

Figure 32:
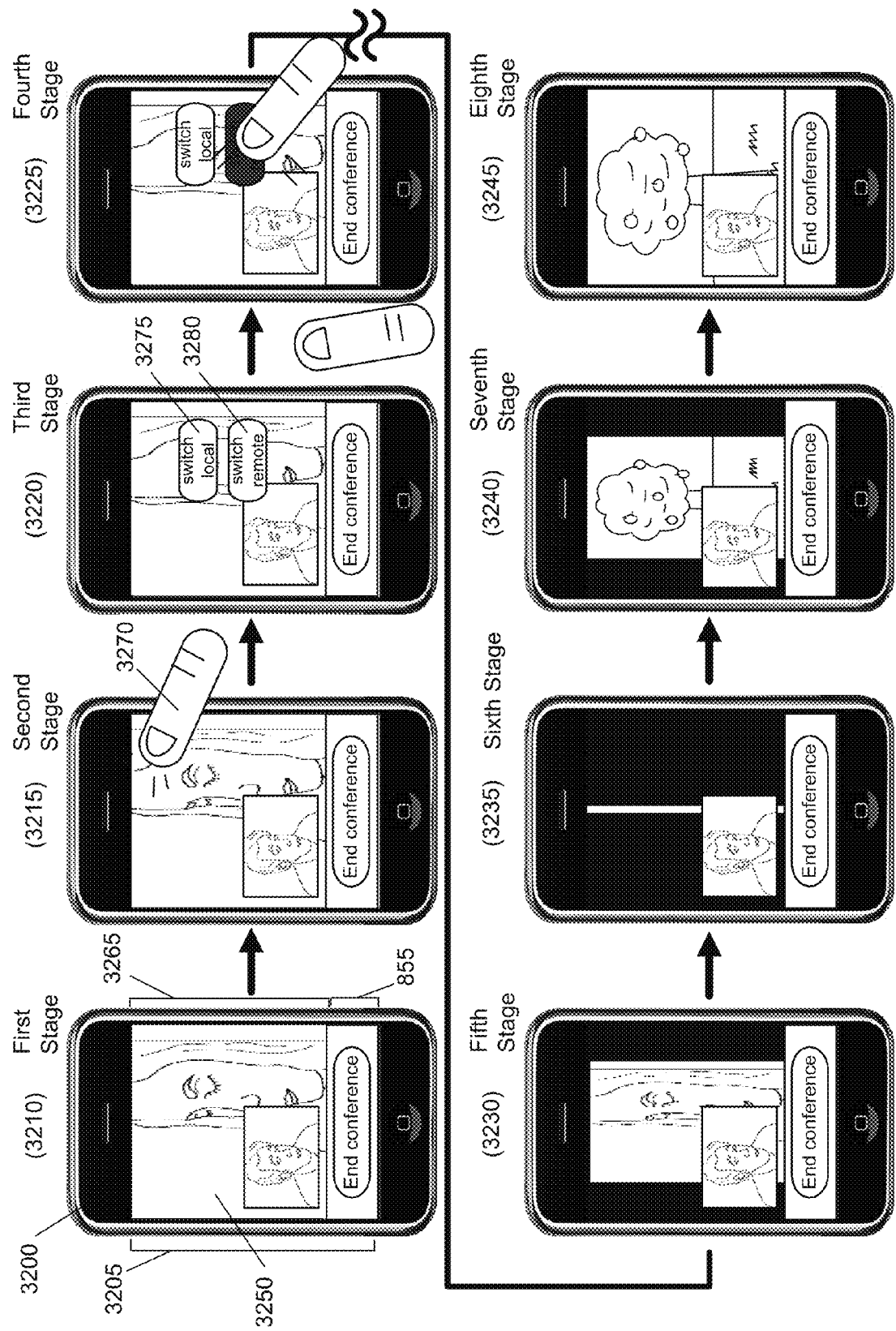
FIG. 32 illustrates a user interface of some embodiments for a remote control switch camera operation.
Figure 33:
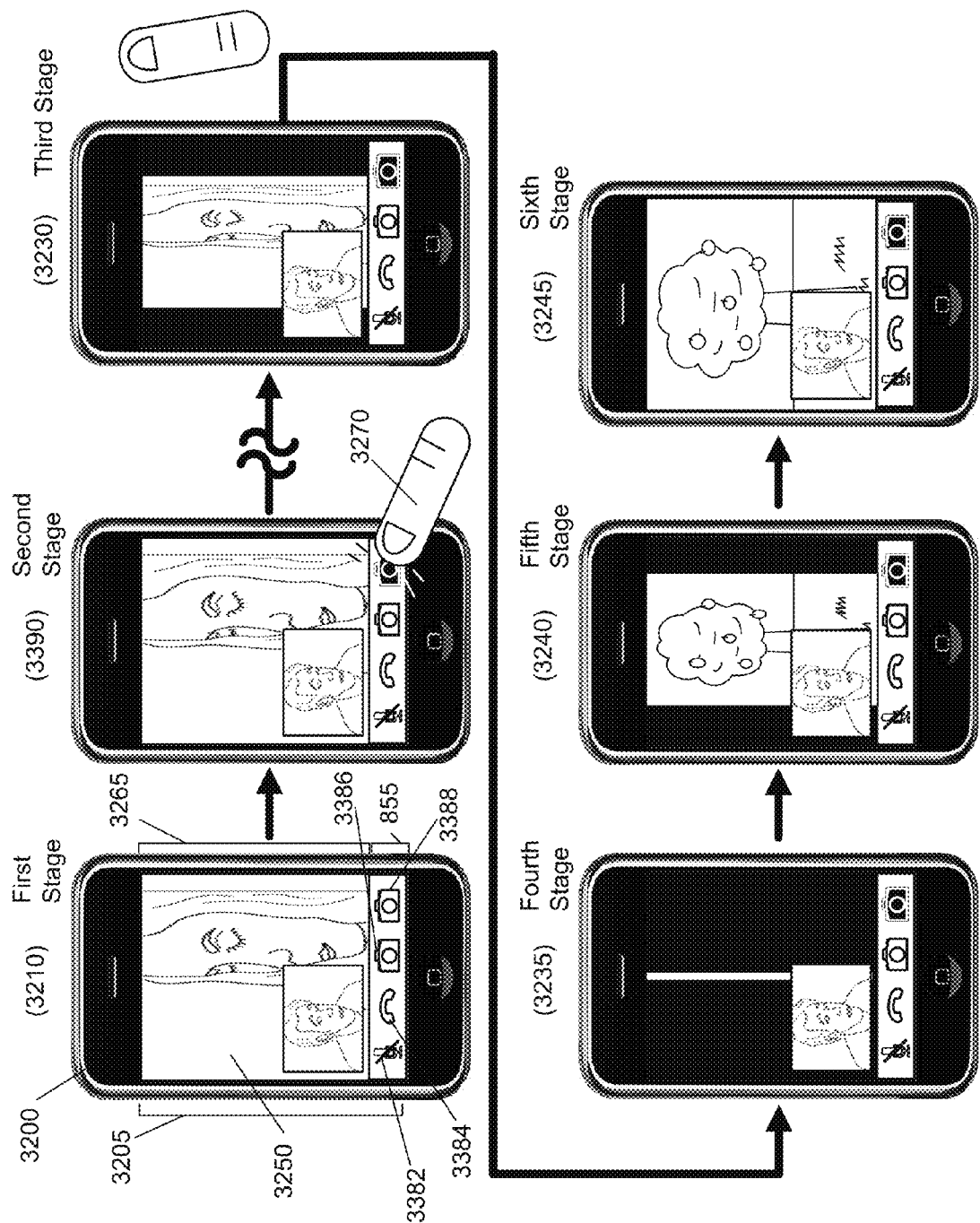
FIG. 33 illustrates another user interface of some embodiments for a remote control switch camera operation.
Figure 34:
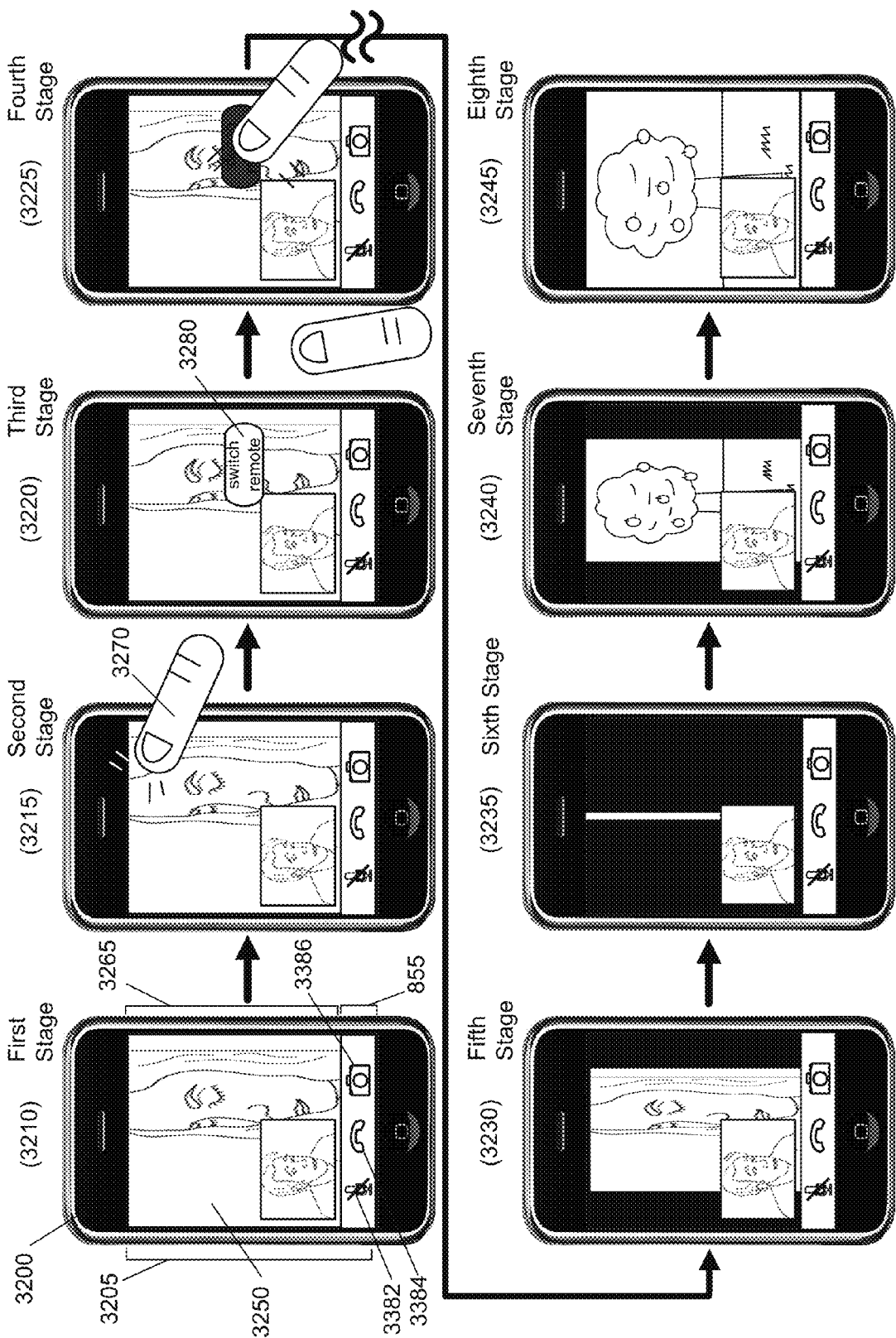
FIG. 34 illustrates another user interface of some embodiments for a remote control switch camera operation.
Figure 35:
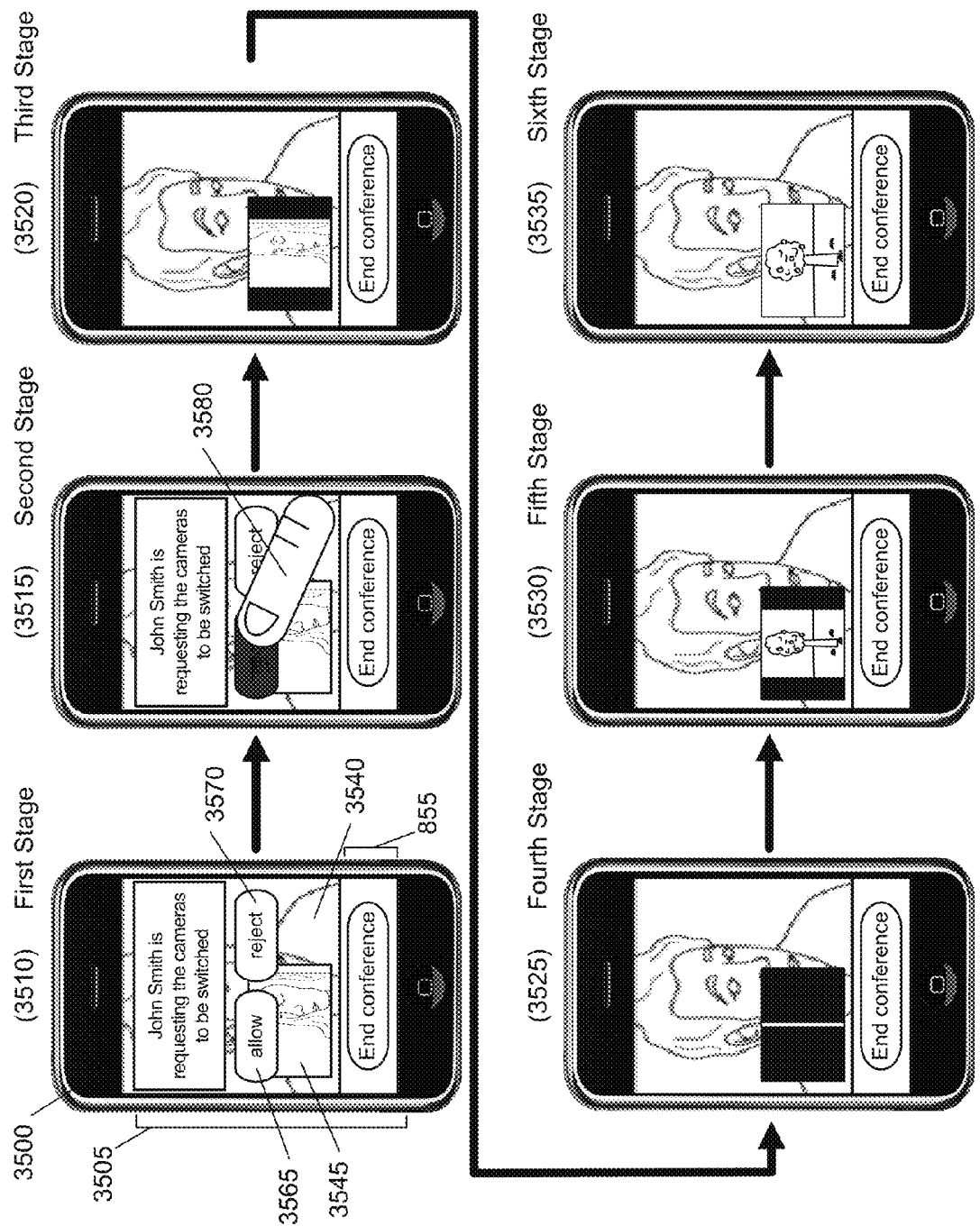
FIG. 35 illustrates another user interface of some embodiments for a remote control switch camera operation.

The process 3100 of FIG. 31 will be described by reference to FIGS. 32, 33, 34, and 35. FIG. 32 illustrates a UI 3205 of a local device 3200 through which a user requests that a remote device switch between its two cameras during a video conference. This figure illustrates eight different operational stages 3210, 3215, 3220, 3225, 3230, 3235, 3240, and 3245 of this UI 3205. FIG. 35 illustrates a UI 3505 of a remote device 3500 that receives the switch camera request from the local device 3200. FIG. 35 illustrates six different operational stages 3510, 3515, 3520, 3525, 3530, and 3535 of the UI 3505.

As shown in FIG. 31, the process 3100 begins by starting (at 3105) a video conference between the local and remote devices. The process 3100 then (at 3110) receives images from one camera of each device (e.g., from the front camera of each device) and generates a composite view for the video conference based on these images. At 3110, the process 3100 also sends a video image from the local device to the remote device.

Next, the process 3100 determines (at 3115) whether a request to end the video conference has been received. As described above, a video conference can end in some embodiments at the request of a user of the local or remote device. When the process 3100 receives a request to end the video conference, the process 3100 ends.

When the process 3100 does not receive a request to end the video conference, the process 3100 then determines (at 3120) whether the user of the device on which the process 3100 is executing (i.e., the user of the local device) has directed the device to request that the remote device switch between its cameras for the video conference. The process 3100 returns to operation 3110 when the process 3100 determines (at 3120) that it has not been directed to initiate a remote switch camera. When the process 3100 determines (at 3120) that it has been so directed, the process 3100 transitions to 3125, which will be described further below.

The first four stages 3210, 3215, 3220, and 3225 of the UI 3205 of FIG. 32 illustrate an example of receiving a user's request to switch cameras of the remote device. The first and second stages 3210 and 3215 are the same as the first and second stages 2710 and 2715 of FIG. 27. The third stage 3220 is the same as the third stage 2720 except the third stage 3220 includes a selectable UI item 3280 for a request to the remote device 3200 to switch cameras in addition to the selectable UI item 3275 for requesting the local device 3200 to switch cameras. The fourth stage 3225 illustrates the user of the local device 3200 selecting the UI item 3280 (e.g., through a single finger tap 3270 of the selectable UI item 3280) for requesting the remote device to switch cameras. The selection is indicated by the highlighting of the selectable UI item 3280. FIG. 32 shows one example of performing this operation, but other embodiments may differently perform the operation for requesting the remote device to switch cameras.

The example described above by reference to FIG. 32 invokes a remote switch camera operation through a remote switch camera user interface. Other embodiments invoke a remote switch camera operation differently. For instance, some embodiments invoke the switch camera operation by having a switch camera selectable UI item permanently displayed on a UI during a video conference such as the UI 3205 of FIG. 33. In FIG. 33, a remote switch camera button 3388 is shown in a display area 855 along with a mute button 3382, an end conference button 3384, and a local switch camera button 3386.

FIG. 33 illustrates the remote switch camera operation of the UI 3205 of the device 3200 in terms of six different stages 3210, 3390, 3230, 3235, 3240, and 3245. The first stage 3210 of FIG. 33 is similar to the first stage 3210 of FIG. 32 except that the layout of the display area 855 shows a mute button 3382, a local switch camera button 3386, a remote switch camera button 3388, and an end conference button 3384. The second stage 3390 illustrates the UI 805 after the user of the local device 3200 selects (e.g., through a single finger tap 3270) the remote switch camera selectable UI item 3388. The last four stages of FIG. 33 are similar to the last four stages of FIG. 32 except the layout of the display area 855 is the same as the layout described above in the first stage 3210 and therefore will not be further described in order to not obscure the description of the invention with unnecessary detail.

Some embodiments provide a similar layout as the one illustrated in FIG. 33 except the remote switch camera selectable UI item is displayed in PIP display 3265 instead of the display area 855. FIG. 34 illustrates such a layout 3205. In particular, the figure shows the PIP display with the remote switch camera selectable UI item 3280 and the display area 855 with only a mute button 3382, a local switch camera button 3386, and an end conference button 3384.

As mentioned above, the process 3100 transitions to 3125 when the user requests a remote switch camera. At 3125, the process 3100 sends the request to switch cameras to the remote device. In some embodiments, this request is sent through the video conference control channel that is multiplexed with the audio and video channels by the VTP Manager 1825 as described above.

After the request to switch cameras is received, the process 3100 determines (at 3130) whether the remote device has responded to the request to switch cameras. In some embodiments, the remote device automatically sends an accept response (i.e., sends an acknowledgement) to the local device through the video-conference control channel. In other embodiments, however, the user of the remote device has to accept this request through the user interface of the remote device.

The first two stages 3510 and 3515 of the UI 3505 of FIG. 35 illustrate an example of the remote user accepting a request to switch cameras of the remote device 3500. The first stage 3510 shows (1) a display area 3540 for displaying text that notifies the remote user of the request, (2) a selectable UI item 3565 (e.g., allow button 3565) for accepting the request to switch cameras of the remote device, and (3) a selectable UI item 3570 (e.g., reject button 3570) for rejecting the request to switch cameras of the remote device. The second stage 3515 then illustrates the UI 3505 after the user of the remote device has selected (e.g., through a single finger tap 3580) the UI item 3565 for accepting the request to switch cameras, as indicated by the highlighting of the selectable UI item 3565.

When the process 3100 determines (at 3130) that it has not yet received a response from the remote device, the process 3100 determines (at 3135) whether a request to end the video conference has been received. If so, the process 3100 returns to operation 3110 to continue to receive images from the camera of the other device. Otherwise, the process receives (at 3140) images from the currently used cameras of the remote and local devices, generates a composite view for the video conference based on these images, transmit the local device's video image to the remote device, and then transitions back to 3130.

When the process 3100 determines (at 3130) that it has received a response from the remote device, it determines (at 3145) whether the remote device accepted the request to switch cameras. If not, the process 3100 ends. Otherwise, the process receives (at 3150) images from the other camera of the remote device and then performs (at 3155) a switch camera animation on the local device to display a transition between the video of the previously utilized remote camera and the video of the currently utilized remote camera (i.e., the received images at operation 3150). After 3155, the process transitions back to 3110, which was described above.

The last four operational stages 3230, 3235, 3240, and 3245 that are illustrated for the UI 3205 in FIG. 32 illustrate one example of such a remote switch camera animation on the local device 3200. The example animation is similar to the example animation illustrated in the stages 2915, 2920, 2925, and 2930 of FIG. 29 except FIG. 32 shows in the display area 3250 an animation that replaces the video of a woman that is captured by the front camera of the remote device with the video of a tree that is captured by the back camera of the remote device. The last four stages of FIG. 33 and FIG. 34 illustrate the same animation as the one in FIG. 32 except the display area 855 of FIGS. 33 and 34 contains different selectable UI items than the display area 855 in FIG. 32.

In some embodiments, when the remote device switches cameras, the UI of the remote device also performs a switch camera animation to display a transition between the two cameras. The last four operational stages 3520, 3525, 3530, and 3535 that are illustrated for the UI 3505 in FIG. 35 illustrate an example of a switch camera animation that is displayed on the remote device 3500 when the remote device 3500 switches between cameras. This animation is similar to the animation illustrated in the stages 2730, 2735, 2740, and 2745 of FIG. 27 except that the animation in the display area 3545 replaces the video of a woman that is captured by the front camera of the remote device 3500 with the video of a tree that is captured by the back camera of the remote device 3500.

As noted above, FIGS. 27, 28, 29, 30, 32, 33, 34, and 35 show various examples of switch camera animations performed on a user interface. In some embodiments, the switch camera animation causes changes to the image processing operations of the respective dual camera mobile device such as scaling, compositing, and perspective distortion, which can be performed by the video conference manager 1204 and the image processing manager 1208, for example.

C. Exposure Adjustment

During a video conference between a dual camera mobile device and another mobile device, different embodiments provide different techniques for adjusting the exposure of images captured by cameras of either mobile device. Some embodiments provide techniques for a user of the dual camera mobile device to adjust the exposure of images captured by a camera of the other device while other embodiments provide techniques for the user to adjust the exposure of images captured by a camera of the dual camera mobile device. Several example techniques will be described in detail below.

Figure 36:
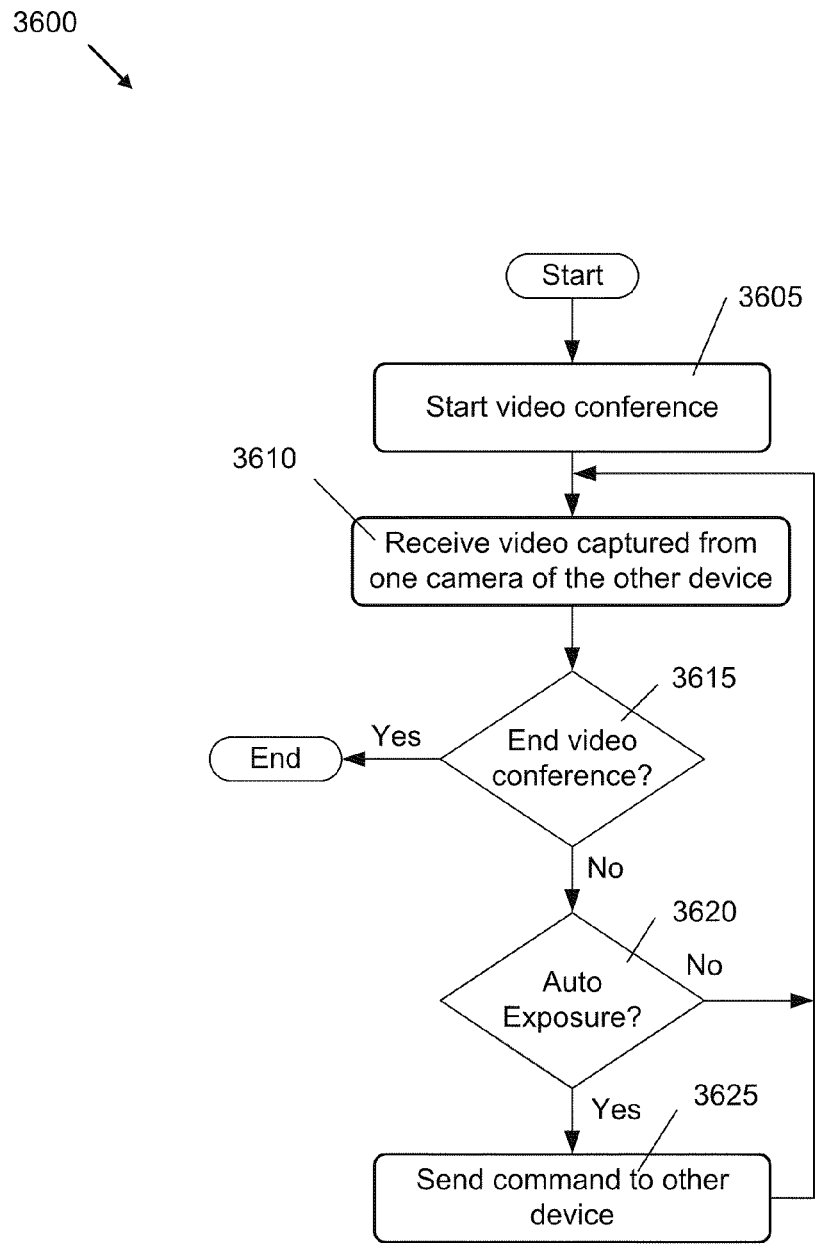
FIG. 36 conceptually illustrates a process of some embodiments for performing an exposure adjustment operation.

FIG. 36 illustrates a process 3600 for performing a remote exposure adjustment operation on a dual camera mobile device of some embodiments during a video conference. In the following discussion, the device through which a user directs a remote device to adjust its exposure level is referred to as the local device. In some embodiments, the process 3600 is performed by the video conference manager of the local device. In addition, the process 3600 will be described by reference to FIGS. 37, 38, and 39 which illustrate various ways for the user of the local device to request the remote device to perform an exposure adjustment operation.

As shown in FIG. 36, the process 3600 begins by starting (at 3605) a video conference between the local and remote devices. The process 3600 then receives (at 3610) a video from the remote device for display on the display screen of the local device. Next, the process 3600 determines (at 3615) whether a request to end the video conference has been received. As described above, some embodiments can receive a request to end the video conference from a user of the local or remote device. When the process 3600 receives a request to end the video conference, the process 3600 ends.

Figure 37:
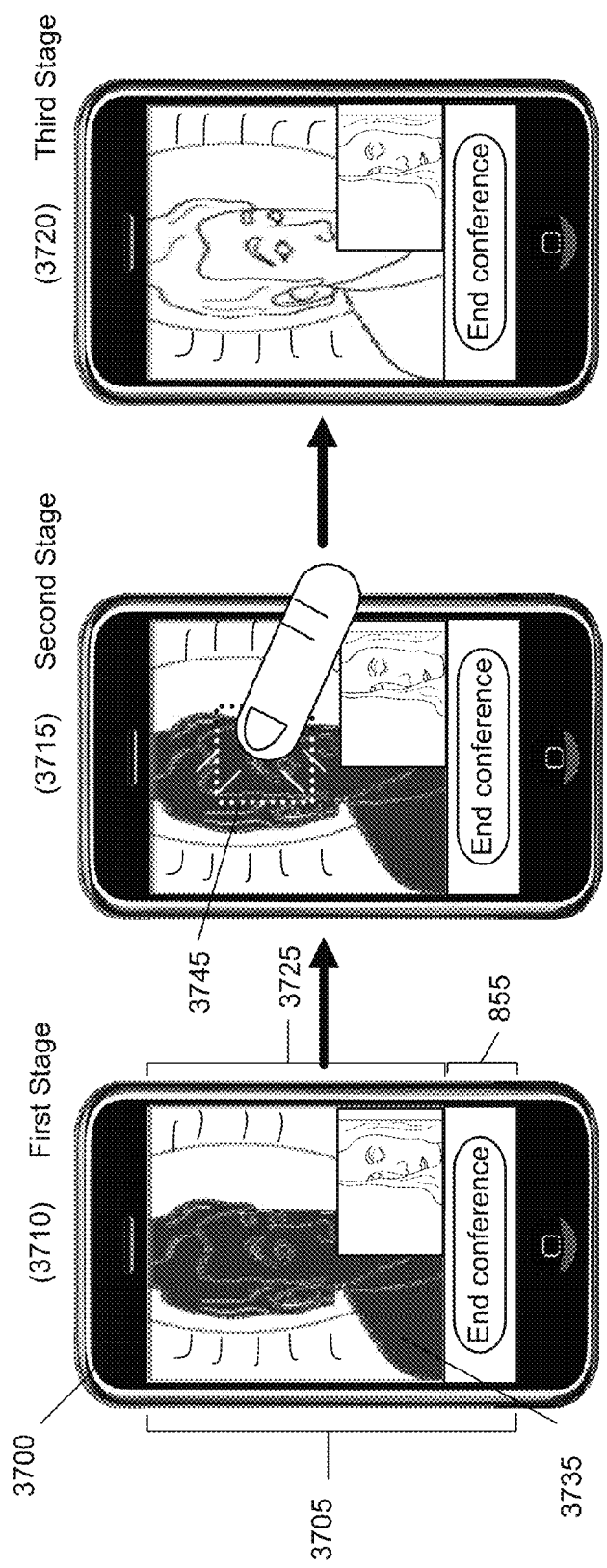
FIG. 37 illustrates a user interface of some embodiments for an exposure adjustment operation.
Figure 38:
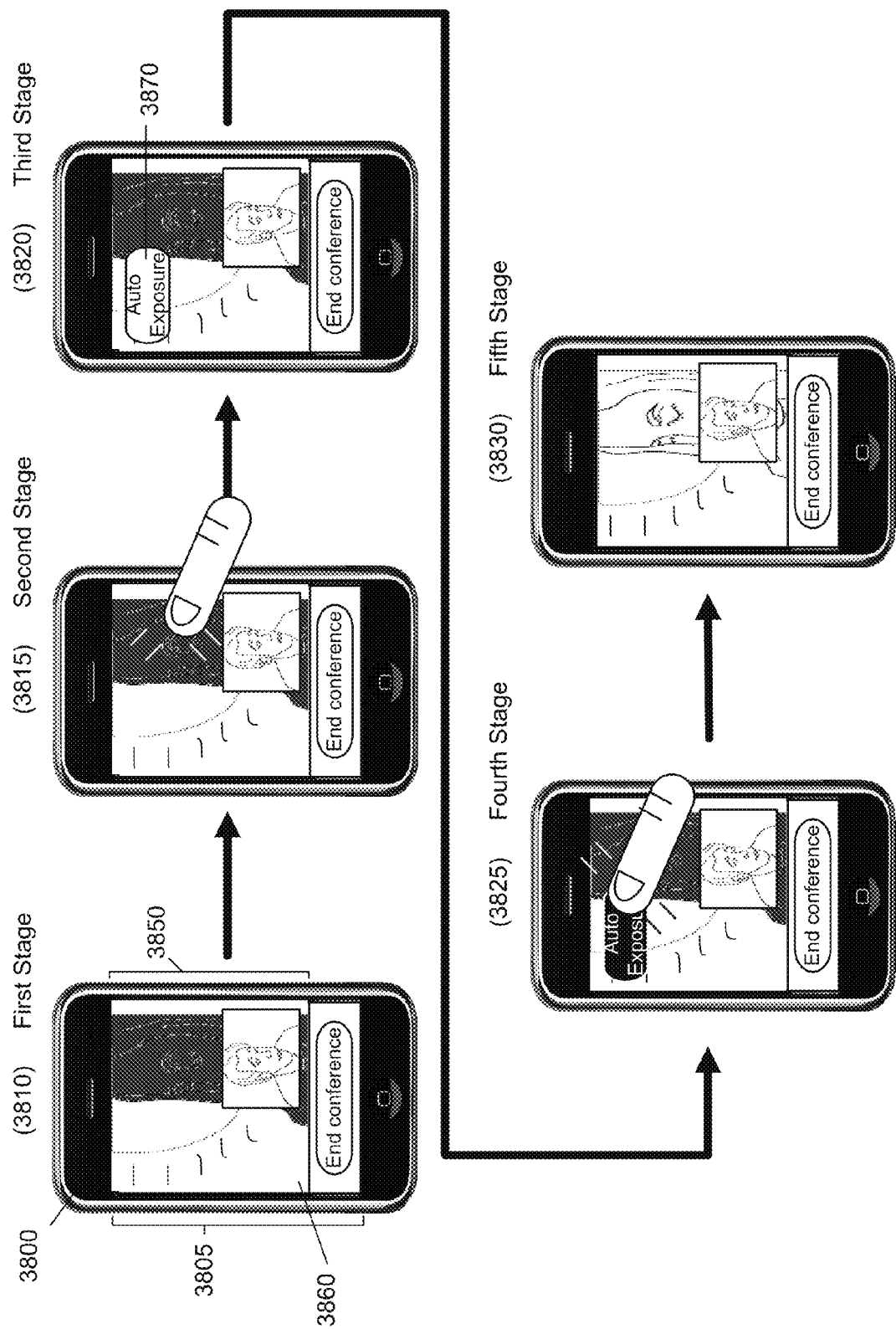
FIG. 38 illustrates another user interface of some embodiments for an exposure adjustment operation.
Figure 39:
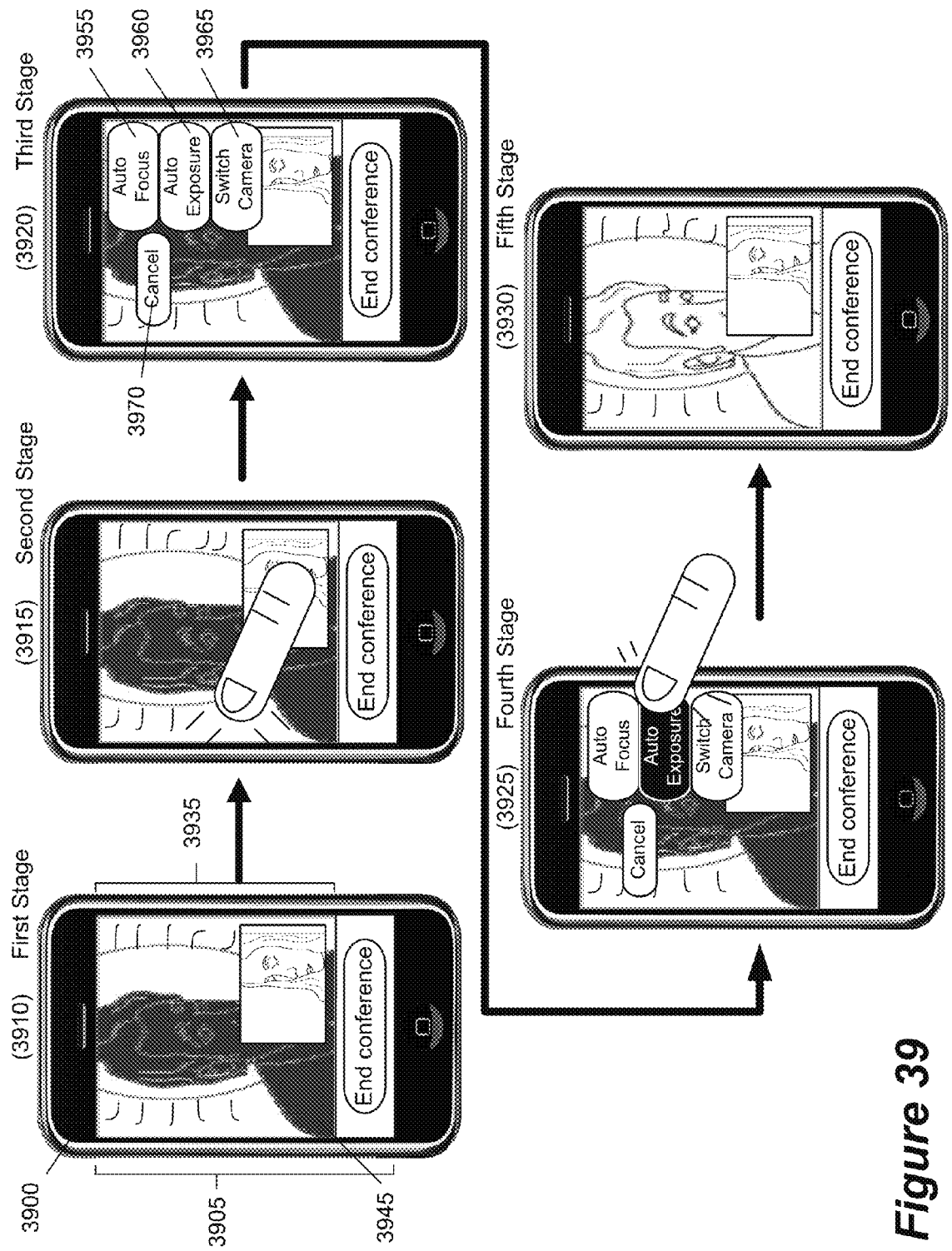
FIG. 39 illustrates another user interface of some embodiments for an exposure adjustment operation.

However, when the process 3600 does not receive a request to end the video conference, the process 3600 then determines (at 3620) whether a request for adjusting the exposure of the remote device's camera has been received. When the process 3600 determines that a request for adjusting the exposure of the remote device's camera has not been received, the process 3600 returns back to operation 3610 to receive additional video captured from the remote device. FIGS. 37, 38, and 39 illustrate three different examples of providing a way for a user to make such a request. In FIGS. 37, 38, and 39, the first stages 3710, 3810, and 3910 all show PIP displays 3725, 3850, and 3935 of the local devices 3700, 3800, and 3900 that display two videos: one captured by a camera of the local device and the other captured by a camera of the remote device. In first stages 3710, 3810, and 3910 the man in the background display 3735, 3860, and 3945 is dark, indicating that the man is not properly exposed.

The second stage 3715 of FIG. 37 illustrates one way for the user of the local device 3700 to request the remote device to perform an exposure adjustment by selecting the remote device's video (e.g., through a single tap on the background display 3735). In this way, the UI 3705 automatically associates the user's selection of a region of interest defined by a box 3745 with the user's desire to direct the remote device to perform an exposure adjustment on the region of interest and thus directs the video conference manager of the local device to contact the remote device to perform an exposure adjustment operation. The defined region of interest is used by the remote device in the calculation of the exposure adjustment.

Like the second stage 3715 of FIG. 37, the second stage 3815 of FIG. 38 shows the local user's selection of the remote device's video except this selection directs the UI 3805 to display a selectable UI item 3870 as shown in the third stage 3820. The fourth stage 3825 illustrates the user of the local device selecting the selectable UI item 3870 to direct the remote device to perform an exposure adjustment operation as described above.

The second stage 3915 of FIG. 39 is similar to the second stage 3815 of FIG. 38, but instead of the user's selection of the remote device's video directing the UI to display a single selectable UI item, the user's selection directs the UI 3905 to display a menu of selectable UI items 3955, 3960, 3965, and 3970, as shown in the third stage 3920. The selectable UI items include an Auto Focus item 3955, an Auto Exposure item 3960, a Switch Camera item 3965, and a Cancel item 3970. In some embodiments, the Switch Camera selectable UI item 3965 is used to request a local switch camera operation while in other embodiments the Switch Camera selectable UI item 3965 is used to request a remote switch camera operation. The fourth stage 3925 illustrates the user selecting the Auto Exposure item 3960 to direct the remote device to perform an exposure adjustment operation as described above.

When the process 3600 determines (at 3620) that the local user directed the local device to request an exposure adjustment operation, the process 3600 sends (at 3625) a command to the remote device through the video conference control channel to adjust the exposure of the video captured by the camera that is currently capturing and transmitting video to the local device. After operation 3625, the process 3600 transitions back to operation 3610, which is described above.

In some embodiments, the user of the remote device is required to provide permission before the remote device performs an exposure adjustment operation, while in other embodiments the remote device performs the exposure adjustment operation automatically upon receiving the request from the local device. Moreover, in some embodiments, some of the video conference functionalities are implemented by the video conference manager 1204. In some of these embodiments, the video conference manager 1204 performs the exposure adjustment operation by instructing the CIPU 1250 to adjust the exposure setting of the sensor of the remote device camera being used.

The last stages 3720, 3830, and 3930 of FIGS. 37, 38, and 39 show the remote device's video lighter, which indicates that the man is properly exposed. Although FIGS. 37, 38, and 39 provide examples of receiving an exposure adjustment request to correct the exposure of a remote device, some embodiments provide ways for user of the local device to request that the local device adjust the exposure of a camera of the local device. Such a request can be made similar to the ways illustrated in FIGS. 37, 38, and 39 for requesting a remote device to adjust its camera's exposure.

FIGS. 37-39 described above show several user interfaces for performing exposure adjustment operations. In some embodiments, the exposure adjustment operation can cause changes to the image processing operations of the dual camera mobile device such as invoking the exposure adjustment process 4000, which is described in further detail below. The exposure adjustment operation can also cause changes to the operation of the camera of the dual camera mobile device that is capturing the video like changing the exposure level setting of the camera, for example.

Figure 40:
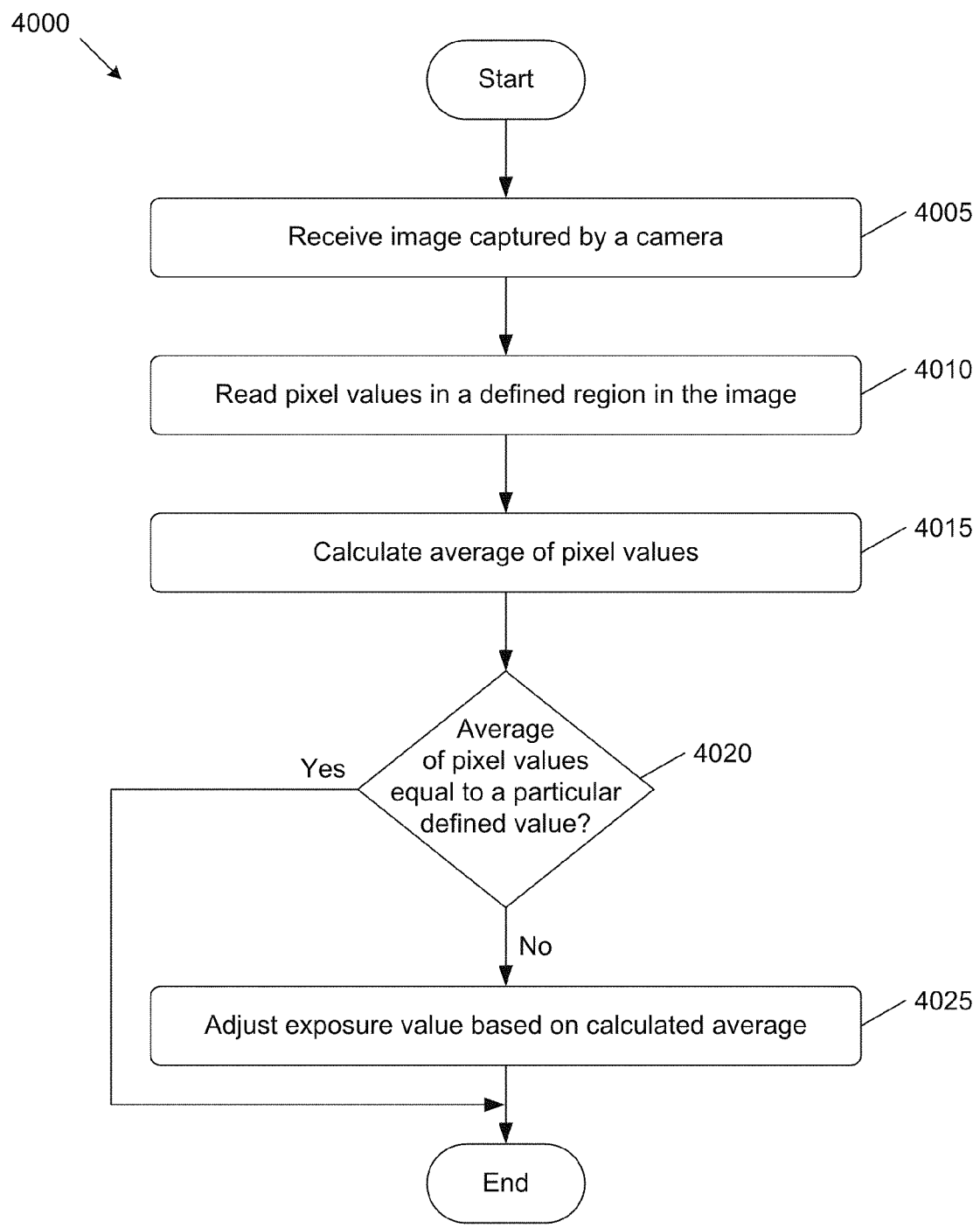
FIG. 40 conceptually illustrates an exposure adjustment process performed by an image processing manager of some embodiments such as that illustrated in FIG. 12.

FIG. 40 conceptually illustrates an exposure adjustment process 4000 performed by an image processing manager of some embodiments such as that illustrated in FIG. 12. In some embodiments, the process 4000 is part of the exposure adjustment operations described above by reference to FIGS. 36, 37, 38, and 39. In some of such embodiments, the image processing manager 1208 performs the process 4000 and adjusts a camera's exposure setting by sending instructions to the video conference manager 1204, which instructs the CIPU 1250 to adjust the camera sensor 405*a* or 405*b*, as mentioned above.

In some embodiments, the process 4000 is performed by the image processing layer 630 shown in FIG. 6 while in other embodiments the process 4000 is performed by the statistics engine 465 shown in FIG. 4. Some embodiments perform the process 4000 on images captured by cameras of (local or remote) devices in a video conference while other embodiments perform the process 4000 as part of the process 1500 (e.g., operation 1510) illustrated in FIG. 15. Some embodiments perform an exposure adjustment operation to expose images captured by the cameras of the dual camera mobile device that are not too light and not too dark. In other words, the process 4000 is performed to capture images in a manner that maximizes the amount of detail as possible.

The process 4000 begins by receiving (at 4005) an image captured by a camera of the dual camera mobile device. In some embodiments, when the received image is a first image captured by a camera of a device in a video conference, the process 4000 is not performed on the first image (i.e., there was no image before the first image from which to determine an exposure value). The process 4000 then reads (at 4010) pixel values of a defined region in the received image. Different embodiments define regions differently. Some of such embodiments define differently shaped regions such as a square, a rectangle, a triangle, a circle, etc. while other of such embodiments define regions in different locations in the image such as center, upper center, lower center, etc.

Next, the process 4000 calculates (at 4015) an average of the pixel values in the defined region of the image. The process 4000 determines (at 4020) whether the calculated average of the pixel values is equal to a particular defined value. Different embodiments define different particular values. For example, some embodiments define the particular value as the median pixel value of the image's dynamic range. In some embodiments, a range of values is defined instead of a single value. In such embodiments, the process 4000 determines (at 4020) whether the calculated average of the pixel values is within the define range of values.

When the calculated average of the pixel values is not equal to the particular defined value, the process 4000 adjusts (at 4025) the exposure value based on the calculated average. When the calculated average of the pixel values is equal to the particular defined value, the process 4000 ends. In some embodiments, an exposure value represents an amount of time that a camera sensor is exposed to light. In some embodiments, the adjusted exposure value is used to expose the next image to be captured by the camera that captured the received image. After the exposure value is adjusted based on the calculated average, the process 4000 ends.

In some embodiments, the process 4000 is repeatedly performed until the calculated average of pixel values is equal to the particular defined value (or falls within the defined range of values). Some embodiments constantly perform the process 4000 during a video conference while other embodiments perform the process 4000 at defined intervals (e.g., 5 seconds, 10 seconds, 30 seconds, etc.) during the video conference. Furthermore, during the video conference, the process 4000 of some embodiments dynamically re-defines the particular pixel value before performing the process 4000.

Figure 41:
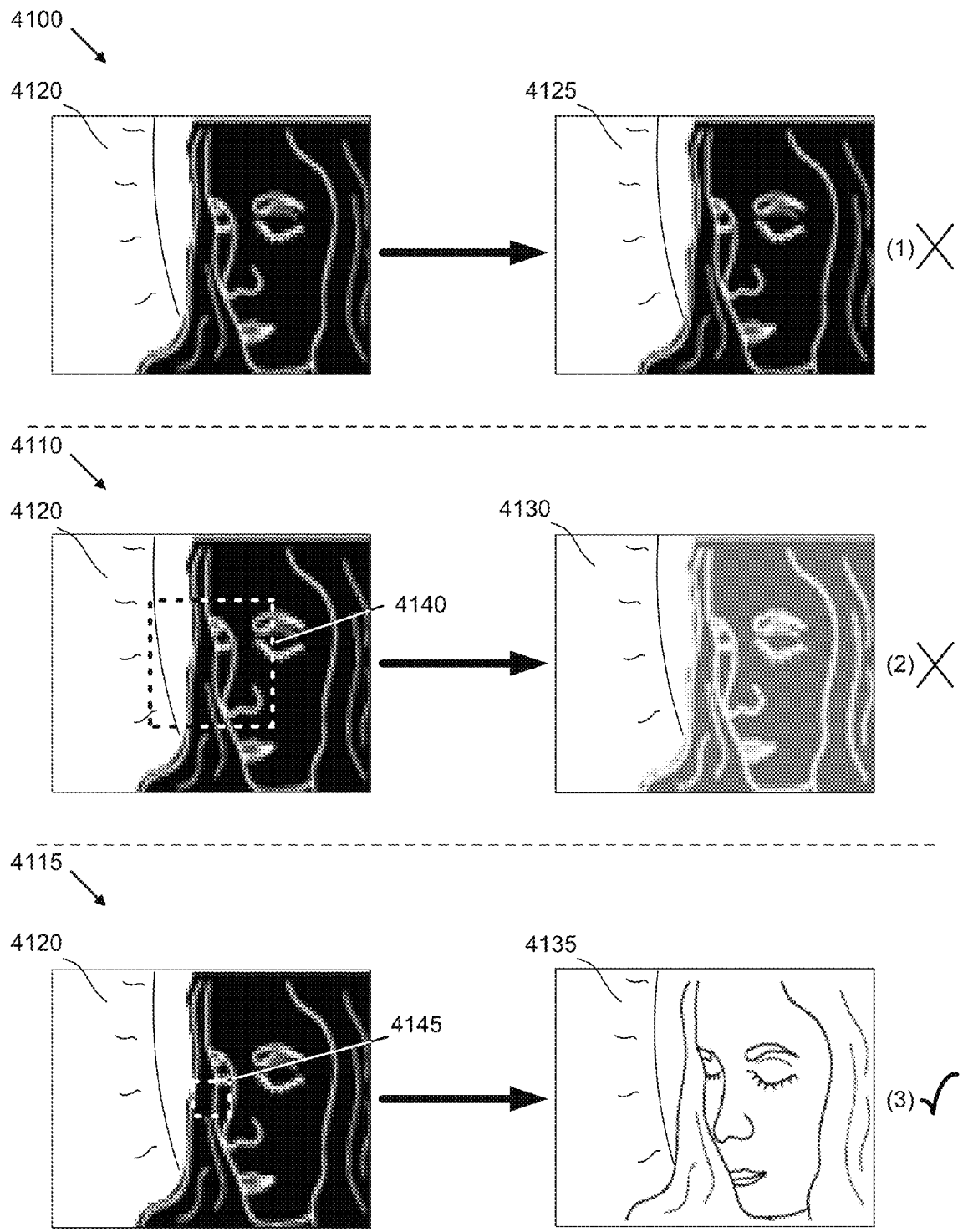
FIG. 41 conceptually illustrates exposure adjustment operations of some embodiments.

FIG. 41 conceptually illustrates examples of exposure adjustment operations of some embodiments. Each of the examples 4100, 4110, and 4115 shows an image 4120 captured by a camera of the dual camera mobile device on the left side. Specifically, the image 4120 shows a dark person in front of a sun. The dark person indicates that the exposure level of the image is not high enough to expose the person's face or body. The right side of each example 4100, 4110, and 4115 shows an image 4125, 4130, and 4135, respectively, captured after the image 4120. In some embodiments, the image 4120 and the images on the right side are images of a video captured by the camera of the dual camera mobile device. In other embodiments, the image 4120 and the image on the right side are still images captured by the camera of the dual camera mobile device at different instances in time.

The first example 4100 illustrates an operation with no exposure adjustment. As such, the image 4125 appears the same as the image 4120. Since no exposure adjustment was performed, the person in the image 4125 remains dark like the person in the image 4120.

In the second example 4110, an exposure adjustment operation is performed on the image 4120. In some embodiments, the exposure adjustment operation is performed by the process 4000 using the defined region 4140. Based on the exposure adjustment operation, the exposure level of the camera is adjusted and the camera captures the image 4130 using the adjusted exposure level. As shown in FIG. 41, the person in the image 4130 is not as dark as the in the image 4125. However, the person's face and body in the image 4130 is still not clear.

The third example 4115 shows an exposure adjustment operation performed on the image 4120. Similar to the second example 4110, the exposure adjustment operation of the example 4115 of some embodiments is performed by the process 4000 using the defined region 4145. Based on the exposure adjustment operation, the exposure level of the camera is adjusted and the camera captures the image 4135 using the adjusted exposure level. As seen in FIG. 41, the person in the image 4135 is perfectly exposed since the person's face and body is visible.

In some embodiments, the selection of the defined region may be made by the user of the dual camera mobile device. The device itself may also automatically adjust its defined region for the exposure adjustment operation through the feedback loop for exposure adjustment mentioned above in the CIPU 400. The statistics engine 465 in FIG. 4 may collect data to determine whether the exposure level is appropriate for the images captured and adjust the camera sensors (e.g., though a direct connection to the sensor module 415) accordingly.

D. Focus Adjustment

Figure 42:
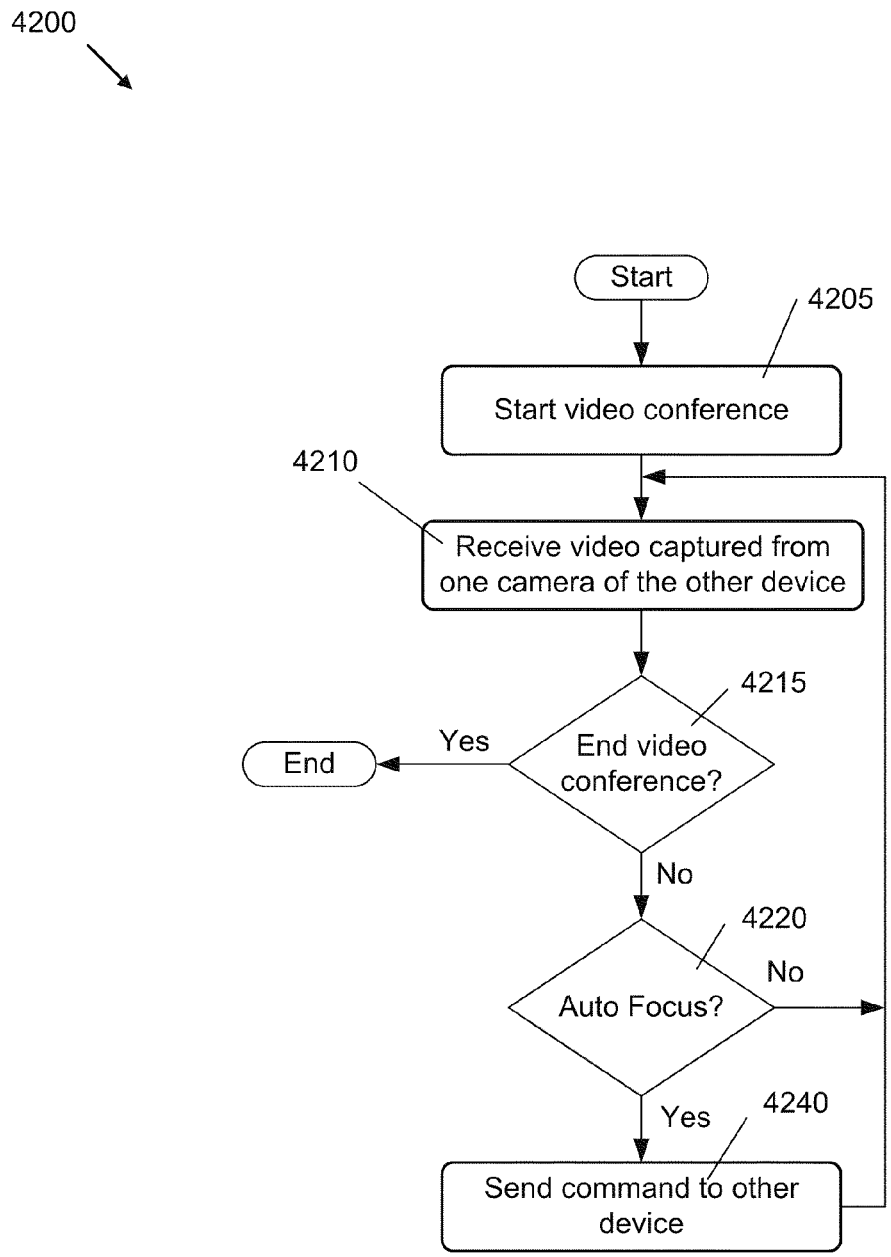
FIG. 42 conceptually illustrates a process of some embodiments for performing a focus adjustment operation.

FIG. 42 illustrates a process 4200 for adjusting the focus of a dual camera mobile device during a video conference. In the following discussion, the device through which a user directs a remote device to adjust its camera focus is referred to as the local device. The process 4200 of FIG. 42 is in some embodiments performed by the video conference manager 1204 of the local device. Also, this process will be described below by reference to FIGS. 43 and 44, which provide two exemplary manners for the user of the local device to request a focus adjustment operation to be performed by the remote device.

As shown in FIG. 42, the process 4200 begins by starting (at 4205) a video conference between the local and remote devices. The process 4200 then receives (at 4210) a video from the remote device for display on the display screen of the local device. Next, at 4215, the process 4200 determines whether a request to end the video conference has been received. As described above, a video conference can end in some embodiments at the request of a user of the local or remote device. When the process 4200 receives a request to end the video conference, the process 4200 ends.

Figure 43:
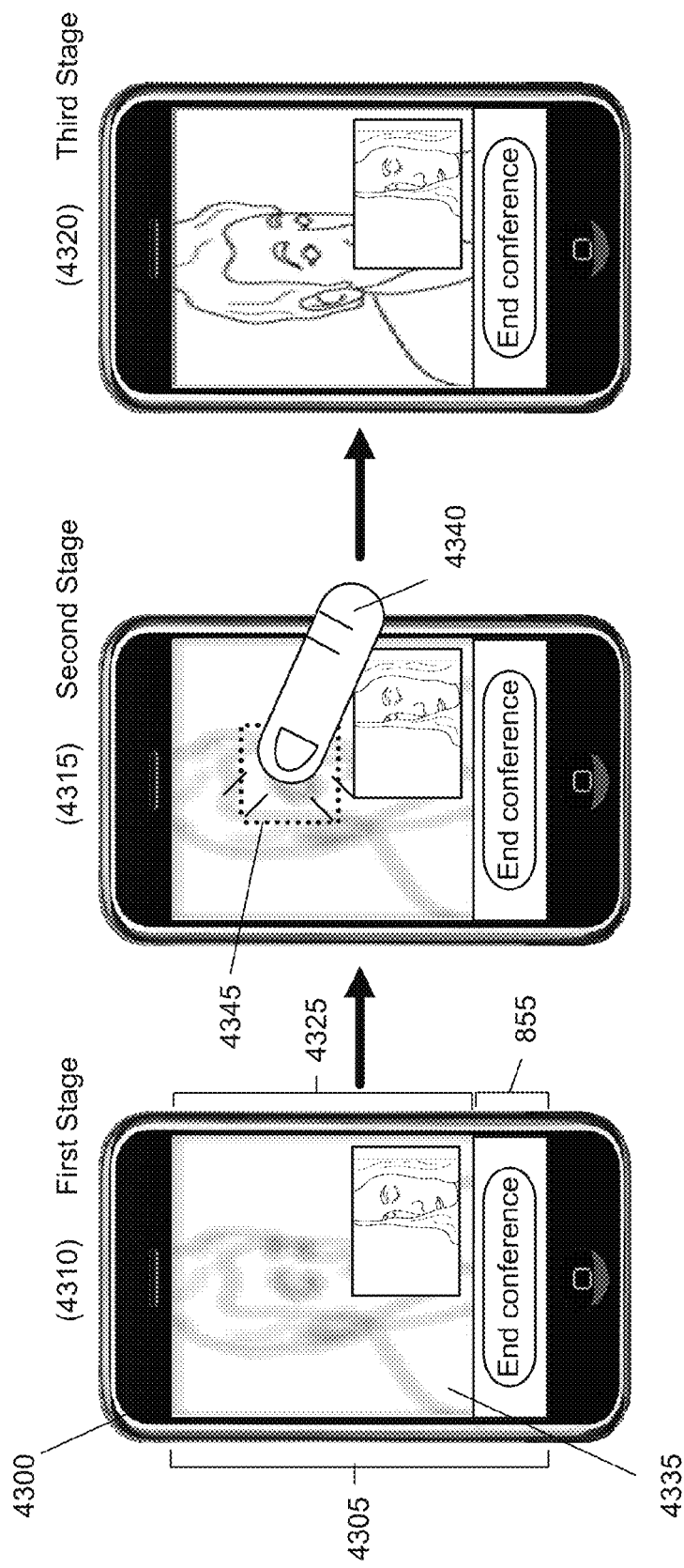
FIG. 43 illustrates a user interface of some embodiments for a focus adjustment operation.
Figure 44:
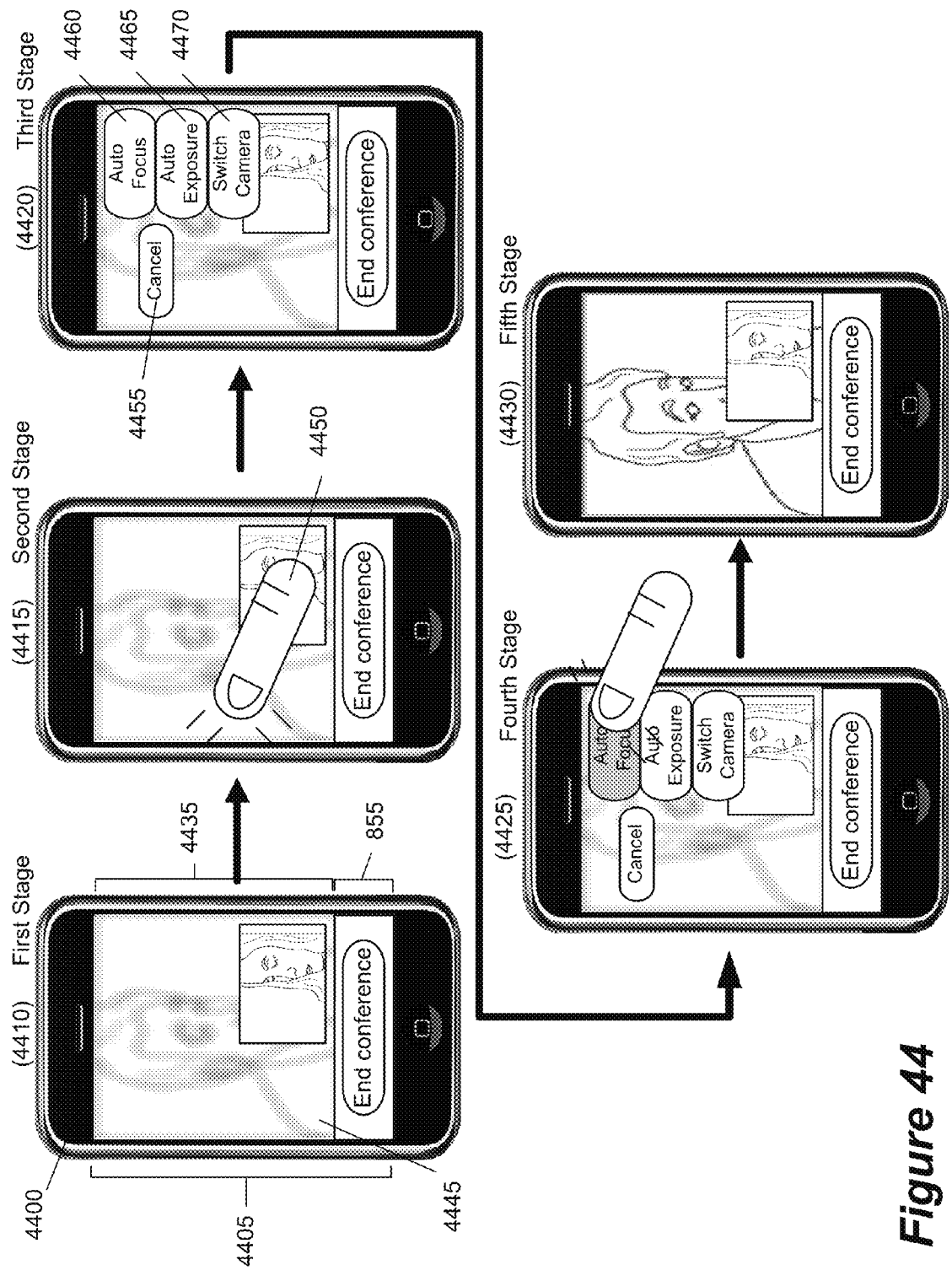
FIG. 44 illustrates another user interface of some embodiments for a focus adjustment operation.
Figure 45:
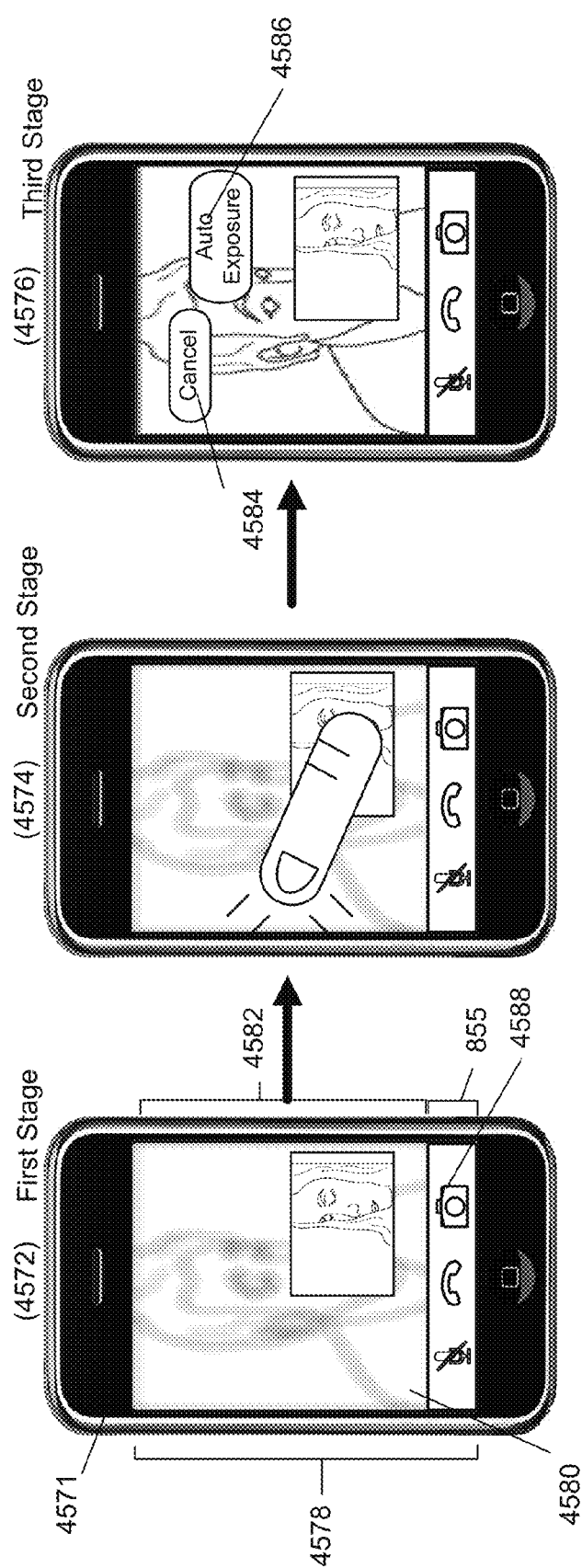
FIG. 45 illustrates another user interface of some embodiments for a focus adjustment operation.

Otherwise, the process determines (at 4220) whether it has received a request for adjusting the focus of the remote camera of the remote device. When the process 4200 determines that it has not received a request for adjusting the focus of the remote camera of the remote device, the process 4200 returns to operation 4210 to receive additional video from the remote device. FIGS. 43, 44, and 45 illustrate three different ways that different embodiments provide to a user to make such a request. In FIGS. 43, 44, and 45, the first stages 4310, 4410, and 4572 all show a PIP display 4325, 4435, and 4582 of the local device 4300, 4400, and 4571 that displays two videos, one captured by the local device, and the other captured by the remote device. The display areas 855 and 855 in FIGS. 43 and 44 show an end conference button. However, in FIG. 45, the layout of the display area 855 is the same as the layout of the display area 855 of FIG. 9, described above. Moreover, the switch camera button 4588 shown in the display area 855 can be selected to invoke a local switch camera operation in some embodiments or a remote switch camera operation in other embodiments. As shown in the first stages 4310, 4410, and 4572, the video of the remote device that is displayed in the background display 4335, 4445, and 4580 is blurry.

The second stage 4315 of FIG. 43 illustrates an approach whereby the user of the local device requests a focus adjustment from the remote device by simply selecting the remote device's video (e.g., through a single tap 4340 on the remote device's video). Under this approach, the UI 4305 automatically associates the user's selection of a region of interest defined by a box 4345 with the user's desire to direct the remote device to perform an operation (such as focus) on the region of interest and therefore directs the video conference manager 1204 of the local device 4300 to contact the remote device to perform an adjustment operation (such as an focus adjustment operation). The defined region of interest is used by the remote device in the calculation of the focus adjustment.

The second stage 4415 of FIG. 44 similarly shows the local user's selection of the remote video (e.g., through the user's tapping of the remote device's video). However, unlike the example illustrated in FIG. 43, this selection in FIG. 44 directs the UI 4405 to display a menu of selectable UI items 4455, 4460, 4465 and 4470 (which can be implemented as selectable buttons), as shown in the third stage 4420. These selectable UI items include an Auto Focus item 4460, an Auto Exposure item 4465, a Switch Camera item 4470 and a Cancel item 4455. In some embodiments, the Switch Camera selectable UI item 4470 is used to request a local switch camera operation while in other embodiments the Switch Camera selectable UI item 4470 is used to request a remote switch camera operation. The fourth stage 4425 then illustrates the local user selecting the auto-focus item 4460.

The second stage 4574 of FIG. 45 again similarly shows the local user's selection of the remote video (e.g., through the user's tapping of the remote device's video). However, unlike the example illustrated in FIG. 44, this selection in FIG. 45 directs the UI 4578 to request a focus adjustment operation (i.e., in second stage 4574). After the focus adjustment operation is completed, the UI 4578 displays a menu of selectable UI items 4584 and 4586 (i.e., in third stage 4576), which can be implemented as selectable buttons. These selectable UI items include an Auto Exposure item 4586 and a Cancel item 4584.

When the process determines (at 4220) that the local user directed the local device to request a focus adjustment operation, the process 4200 sends (at 4240) a command to the remote device through the video conference control channel to adjust the focus of the camera whose video the remote device is currently capturing and transmitting. After 4240, the process transitions back to 4210, which was described above.

In some embodiments, the user of the remote device has to provide permission before the remote device performs this operation, while in other embodiments the remote device performs this operation automatically upon receiving the request for the local device. Also, in some embodiments, the focus adjustment operation adjusts the focus settings of the remote device's camera that is being used during the video conference. In some of such embodiments, some of the video conference functionalities are implemented by the video conference module 1202 as discussed above. In these embodiments, the video conference manager 1204 instructs the CIPU 1250 to adjust the sensor of the remote device camera being used.

The last stages 4320, 4430, and 4576 of FIGS. 43, 44, and 45 show the remote device's video properly focused. Although FIGS. 43, 44, and 45 provide examples of receiving a focus adjustment request to correct the focus of a remote device, some embodiments allow the local device's user to request that the local device adjust the focus of a camera of the local device. Such a request can be made similar to the approaches shown in FIGS. 43, 44, and 45 to requesting a remote device to adjust its camera's focus.

FIGS. 43, 44, and 45 illustrate three example user interfaces that allow a user to perform a focus adjustment operation. In some embodiments, the focus adjustment operation causes changes to the operation of the camera of the dual camera mobile device that is capturing the video displayed in the UIs such as changing the focus of the camera.

As discussed above in FIGS. 37 and 43, the defined region of interest was used by the remote mobile device in the computation for exposure adjustment and focus adjustment of the videos, respectively. However, in some other embodiments, the user's selection of a region of interest may be used to direct the remote device to perform one or more operations. For example, in some embodiments, both exposure adjustment and focus adjustment may be performed based on the defined region of interest, thereby directing the remote device to perform both operations.

E. Frame Rate Control

During a video conference, some embodiments may wish to adjust or maintain the rate at which images of a video captured by a camera of the dual camera mobile device are transmitted (i.e., frame rate) to the other device in the video conference. For example, assuming a fixed bandwidth, some of such embodiments reduce the frame rate of the video to increase the picture quality of the images of the video while other of such embodiments increase the frame rate of the video to smooth out the video (i.e., reduce jitter).

Different embodiments provide different techniques for controlling the frame rate of images of a video during the video conference. One example previously described above adjusts the VBI of the sensor module 415 for a camera in order to control the rate at which images captured by the camera are processed. As another example, some embodiments of the management layer 635 of the video conference module 625 shown in FIG. 6 control the frame rate by dropping images. Similarly, some embodiments of the image processing layer 630 control the frame rate by dropping images. Some embodiments provide yet other techniques for controlling frame rates such as dropping frames in the universal transmission buffer 1820.

V. ELECTRONIC SYSTEM

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Some embodiments are implemented as software processes that include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

One or more Application Programming Interfaces (APIs) may be used in some embodiments. For example, some embodiments of the media exchange module 310 (or 910) provide a set of APIs to other software components for accessing various video processing and encoding functionalities described in FIGS. 3 and 6.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 46:
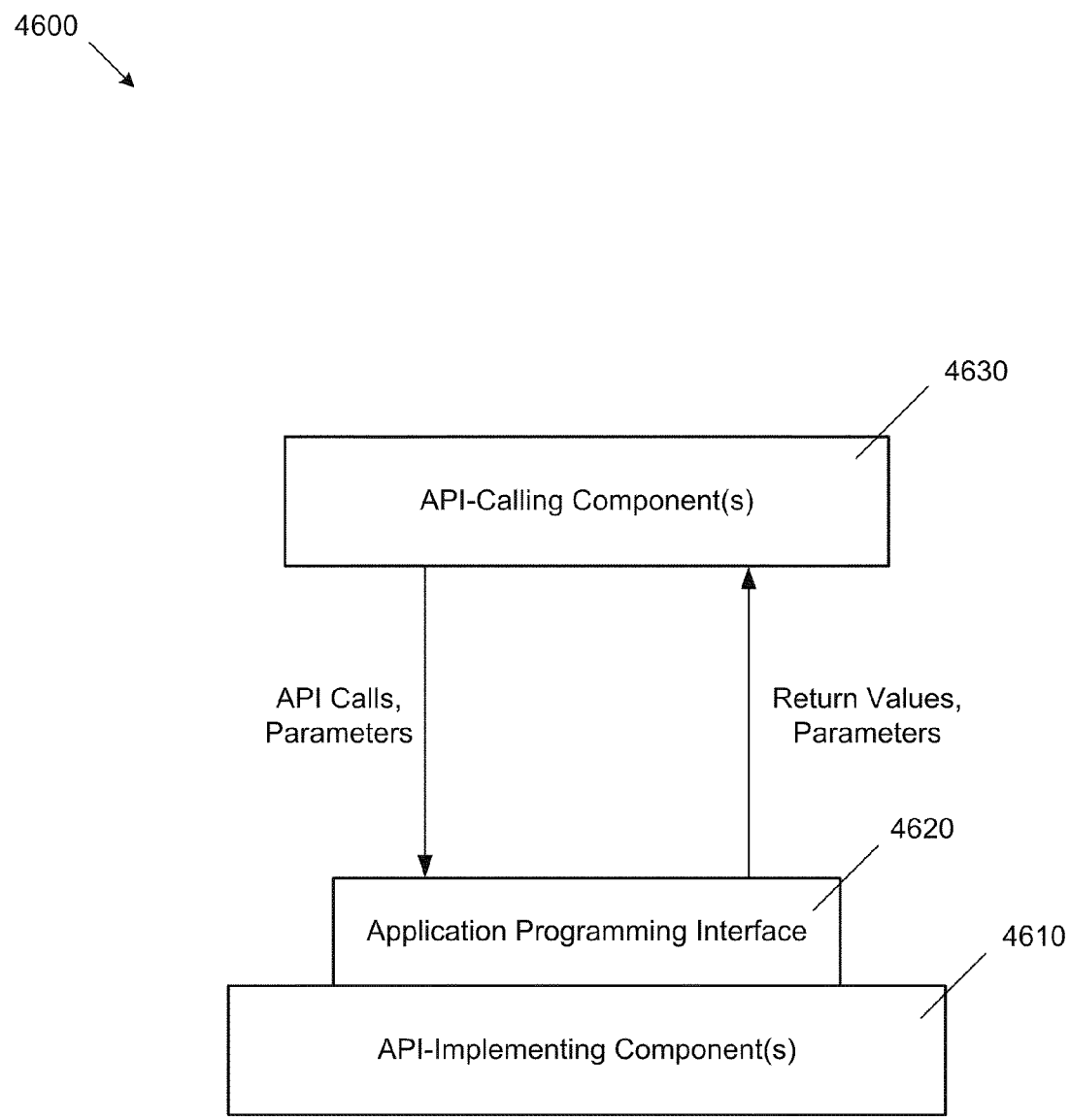
FIG. 46 conceptually illustrates an application programming interface (API) architecture of some embodiments.

FIG. 46 is a block diagram illustrating an exemplary API architecture, which may be used in some embodiments of the invention. As shown in FIG. 46, the API architecture 4600 includes the API-implementing component 4610 (e.g., an operating system, a library, a device driver, an API, an application program, software or other module) that implements the API 4620. The API 4620 specifies one or more functions, methods, classes, objects, protocols, data structures, formats and/or other features of the API-implementing component that may be used by the API-calling component 4630. The API 4620 can specify at least one calling convention that specifies how a function in the API-implementing component 4630 receives parameters from the API-calling component 4630 and how the function returns a result to the API-calling component. The API-calling component 4630 (e.g., an operating system, a library, a device driver, an API, an application program, software or other module), makes API calls through the API 4620 to access and use the features of the API-implementing component 4610 that are specified by the API 4620. The API-implementing component 4610 may return a value through the API 4620 to the API-calling component 4630 in response to an API call.

It will be appreciated that the API-implementing component 4610 may include additional functions, methods, classes, data structures, and/or other features that are not specified through the API 4620 and are not available to the API-calling component 4630. It should be understood that the API-calling component 4630 may be on the same system as the API-implementing component 4610 or may be located remotely and accesses the API-implementing component 4610 using the API 4620 over a network. While FIG. 46 illustrates a single API-calling component 4630 interacting with the API 4620, it should be understood that other API-calling components, which may be written in different languages (or the same language) than the API-calling component 4630, may use the API 4620.

The API-implementing component 4610, the API 4620, and the API-calling component 4630 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 47:
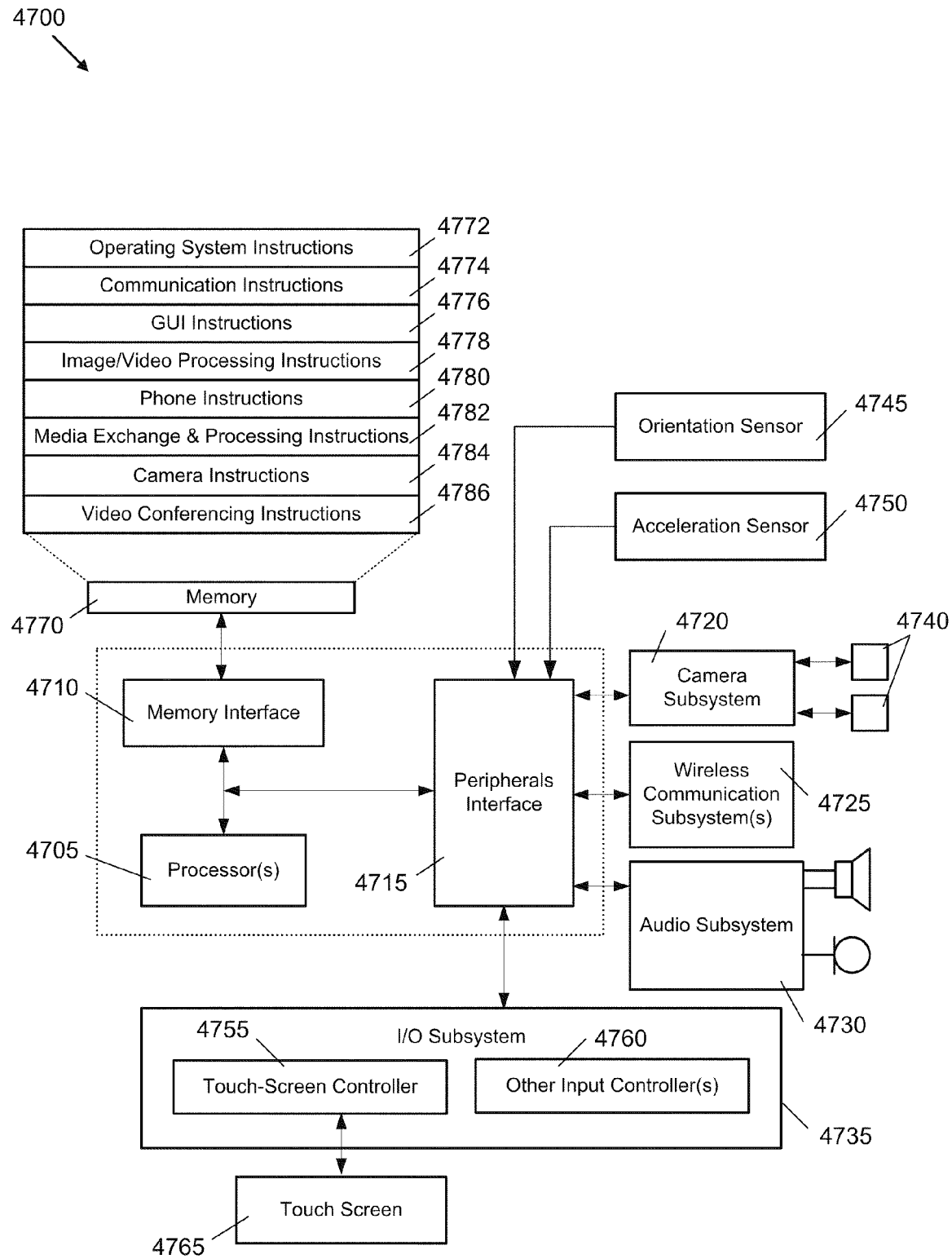
FIG. 47 illustrates an architecture for a dual camera mobile computing device of some embodiments.

FIG. 47 is an example of a dual camera mobile computing device architecture 4700. The implementation of a mobile computing device can include one or more processing units 4705, memory interface 4710 and a peripherals interface 4715. Each of these components that make up the computing device architecture can be separate components or integrated in one or more integrated circuits. These various components can also be coupled together by one or more communication buses or signal lines.

The peripherals interface 4715 can be coupled to various sensors and subsystems, including a camera subsystem 4720, a wireless communication subsystem(s) 4725, audio subsystem 4730, I/O subsystem 4735, etc. The peripherals interface 4715 enables communication between processors and peripherals. Peripherals such as an orientation sensor 4745 or an acceleration sensor 4750 can be coupled to the peripherals interface 4715 to facilitate the orientation and acceleration functions.

The camera subsystem 4720 can be coupled to one or more optical sensors 4740, e.g., a charged coupled device (CCD) optical sensor, a complementary metal-oxide-semiconductor (CMOS) optical sensor. The camera subsystem 4720 coupled with the sensors may facilitate camera functions, such as image and/or video data capturing. Wireless communication subsystems 4725 may serve to facilitate communication functions. Wireless communication subsystems 4725 may include radio frequency receivers and transmitters, and optical receivers and transmitters. They may be implemented to operate over one or more communication networks such as a GSM network, a Wi-Fi network, Bluetooth network, etc. The audio subsystems 4730 is coupled to a speaker and a microphone to facilitate voice-enabled functions, such as voice recognition, digital recording, etc.

I/O subsystem 4735 involves the transfer between input/output peripheral devices, such as a display, a touch screen, etc., and the data bus of the CPU through the Peripherals Interface. I/O subsystem 4735 can include a touch-screen controller 4755 and other input controllers 4760 to facilitate these functions. Touch-screen controller 4755 can be coupled to the touch screen 4765 and detect contact and movement on the screen using any of multiple touch sensitivity technologies. Other input controllers 4760 can be coupled to other input/control devices, such as one or more buttons.

Memory interface 4710 can be coupled to memory 4770, which can include high-speed random access memory and/or non-volatile memory such as flash memory. Memory can store an operating system (OS) 4772. The OS 4772 can include instructions for handling basic system services and for performing hardware dependent tasks.

Memory can also include communication instructions 4774 to facilitate communicating with one or more additional devices; graphical user interface instructions 4776 to facilitate graphic user interface processing; image/video processing instructions 4778 to facilitate image/video-related processing and functions; phone instructions 4780 to facilitate phone-related processes and functions; media exchange and processing instructions 4782 to facilitate media communication and processing-related processes and functions; camera instructions 4784 to facilitate camera-related processes and functions; and video conferencing instructions 4786 to facilitate video conferencing processes and functions. The above identified instructions need not be implemented as separate software programs or modules. Various functions of mobile computing device can be implemented in hardware and/or in software, including in one or more signal processing and/or application specific integrated circuits.

Figure 48:
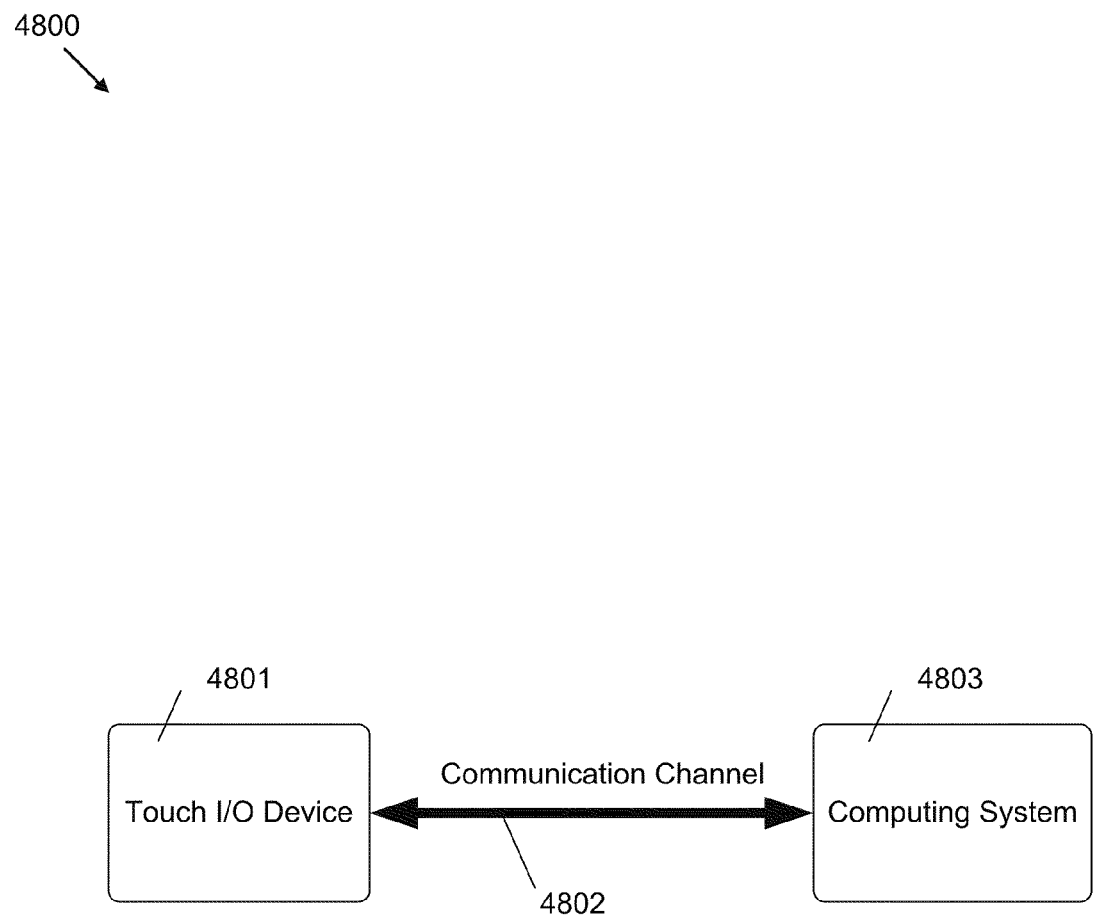
FIG. 48 conceptually illustrates a touch input/output (I/O) device of some embodiments.

The above-described embodiments may include touch I/O device 4801 that can receive touch input for interacting with computing system 4803, as shown in FIG. 48, via wired or wireless communication channel 4802. Touch I/O device 4801 may be used to provide user input to computing system 4803 in lieu of or in combination with other input devices such as a keyboard, mouse, etc. One or more touch I/O devices 4801 may be used for providing user input to computing system 4803. Touch I/O device 4801 may be an integral part of computing system 4803 (e.g., touch screen on a laptop) or may be separate from computing system 4803.

Touch I/O device 4801 may include a touch sensitive panel which is wholly or partially transparent, semitransparent, non-transparent, opaque or any combination thereof. Touch I/O device 4801 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 4801 embodied as a touch screen may include a transparent and/or semitransparent touch sensitive panel partially or wholly positioned over at least a portion of a display. According to this embodiment, touch I/O device 4801 functions to display graphical data transmitted from computing system 4803 (and/or another source) and also functions to receive user input. In other embodiments, touch I/O device 4801 may be embodied as an integrated touch screen where touch sensitive components/devices are integral with display components/devices. In still other embodiments a touch screen may be used as a supplemental or additional display screen for displaying supplemental or the same graphical data as a primary display and receiving touch input.

Touch I/O device 4801 may be configured to detect the location of one or more touches or near touches on device 4801 based on capacitive, resistive, optical, acoustic, inductive, mechanical, chemical measurements, or any phenomena that can be measured with respect to the occurrences of the one or more touches or near touches in proximity to device 4801. Software, hardware, firmware or any combination thereof may be used to process the measurements of the detected touches to identify and track one or more gestures. A gesture may correspond to stationary or non-stationary, single or multiple, touches or near touches on touch I/O device 4801. A gesture may be performed by moving one or more fingers or other objects in a particular manner on touch I/O device 4801 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 4803 may drive a display with graphical data to display a graphical user interface (GUI). The GUI may be configured to receive touch input via touch I/O device

4801. Embodied as a touch screen, touch I/O device 4801 may display the GUI. Alternatively, the GUI may be displayed on a display separate from touch I/O device 4801. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 4801 which may be associated with the graphical elements of the GUI. In other embodiments, the user may perform gestures at one or more locations that are independent of the locations of graphical elements of the GUI. Gestures performed on touch I/O device 4801 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 4803 (e.g., affect a state or mode of a GUI, application, or operating system). Gestures may or may not be performed on touch I/O device 4801 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 4802 in response to or based on the touch or near touches on touch I/O device 4801. Feedback may be transmitted optically, mechanically, electrically, olfactory, acoustically, or the like or any combination thereof and in a variable or non-variable manner.

These functions described above can be implemented in digital electronic circuitry, in computer software, firmware or hardware. The techniques can be implemented using one or more computer program products. Programmable processors and computers can be included in or packaged as mobile devices. The processes and logic flows may be performed by one or more programmable processors and by one or more programmable logic circuitry. General and special purpose computing devices and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Figure 49:
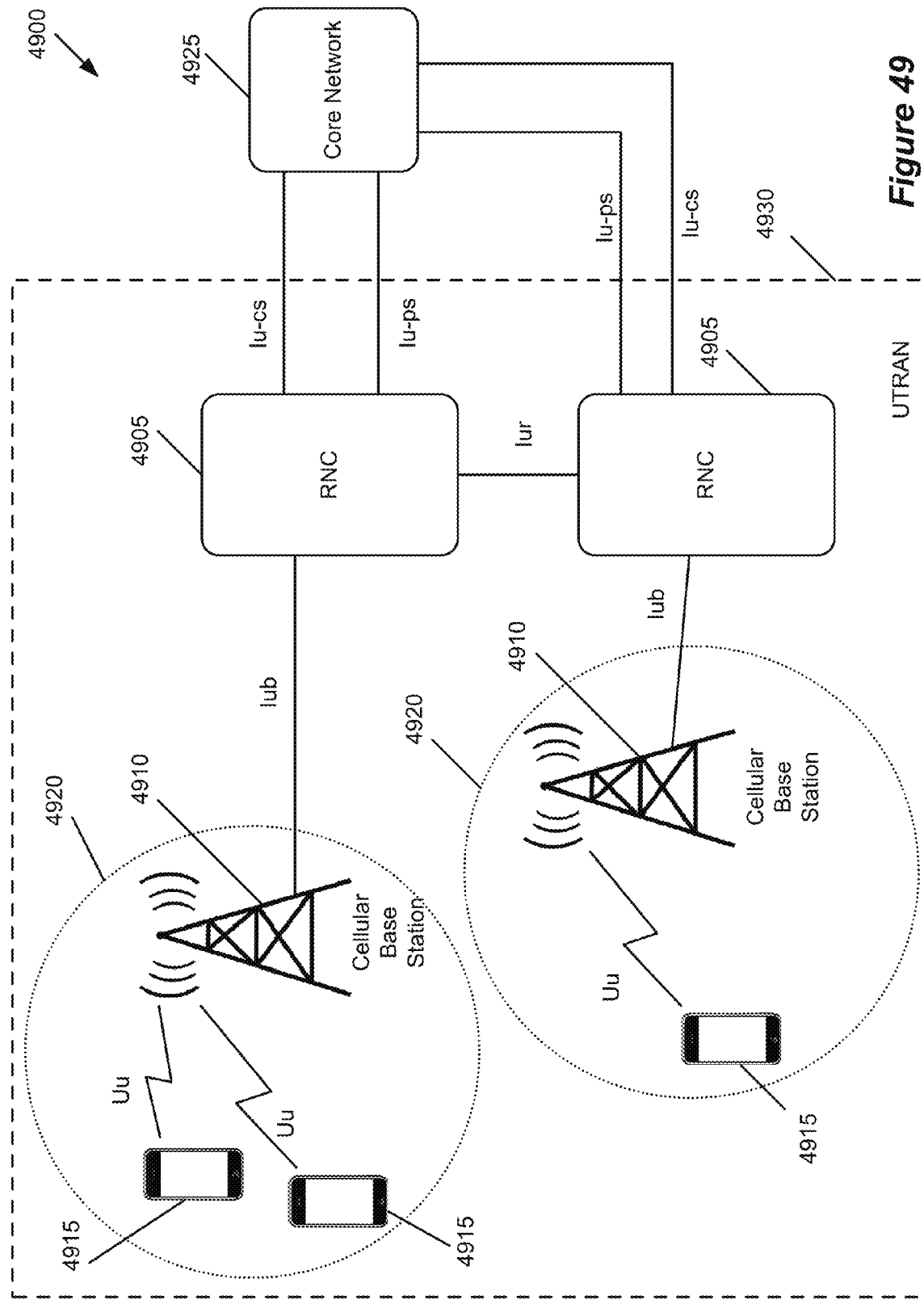
FIG. 49 conceptually illustrates an example communication system of some embodiments.

FIG. 49 conceptually illustrates an example communication system 4900 used for connecting some participants of a video conference according to some embodiments. As shown, the communication system 4900 includes several mobile devices 4915, several cellular base stations (or Node Bs) 4910, several radio network controllers (RNCs) 4905, and a core network 4925. Cellular base stations and RNCs are collectively referred to as a Universal Mobile Telecommunications System (UMTS) Terrestrial Radio Access Network (UTRAN) 4930. Each RNC 4905 is connected to one or more cellular base stations 4910 that, together, are referred to as a radio access network (RAN).

Each cellular base station 4910 covers a service region 4920. As shown, the mobile devices 4915 in each service region are wirelessly connected to the serving cellular base station 4910 of the service region 4920 through a Uu interface. The Uu interface uses a protocol stack that has two planes: a control plane and a user plane. The user plane supports circuit-switched, packet-switched and broadcast data streams. The control plane carries the network's signaling messages.

Each cellular base station is connected to an RNC through an Iub interface. Each RNC 4905 is connected to the core network 4925 by Iu-cs and an Iu-ps interfaces. The Iu-cs interface is used for circuit switched services (e.g., voice) while the Iu-ps interface is used for packet switched services (e.g., data). The Iur interface is used for connecting two RNCs together.

Accordingly, the communication system 4900 supports both circuit-switched services and packet-switched services. For example, circuit-switched services allow a telephone call to be conducted by transmitting the telephone call data (e.g., voice) through circuit-switched equipment of the communication system 4900. Packet-switched services allow a video conference to be conducted by using a transport protocol layer such as UDP or TCP over an internet layer protocol like IP to transmit video conference data through packet-switched equipment of the communication system 4900. In some embodiments, the telephone call to video conference transition (e.g., handoff) previously described in the Video Conference Setup section uses the circuit-switched and packet-switched services supported by a communication system like the communication system 4900. That is, in such embodiments, the telephone call is conducted through the circuit-switched equipment of the communication system 4900 and the video conference it conducted through the packet-switched equipment of the communication system 4900.

Although the example communication system in FIG. 49 illustrates a third generation (3G) technology UTRAN wireless mobile communication system, it should be noted that second generation (2G) communication systems, other 3 G communication systems such as 3GPP2 Evolution-Data Optimized or Evolution-Data only (EV-DO) and 3rd generation partnership project 2 (3GPP2) Code Division Multiple Access 1X (CDMA 1X), fourth generation (4G) communication systems, wireless local area network (WLAN), and Worldwide Interoperability for Microwave Access (WiMAX) communication systems can be used for connecting some of the participants of a conference in some embodiments. Examples of 2G systems include Global System for Mobile communications (GSM), General Packet Radio Service (GPRS), and Enhanced Data Rates for GSM Evolution (EDGE). A 2 G communication system architecture is similar to the architecture shown in FIG. 49 except the 2 G communication system architecture uses base transceiver stations (BTSs) instead of Node Bs 4910 and base station controllers (BSC) instead of RNC 4905. In a 2 G communication system, an A interface between the BSC and the core network is used for circuit switched services and a Gb interface between the BSC and the core network is used for packet switched services.

In some embodiments, the communication system 4900 is operated by a service carrier who initially provisions a mobile device 4915 to allow the mobile device 4915 to use the communication system 4900. Some embodiments provision a mobile device 4915 by configuring and registering a subscriber identity module (SIM) card in the mobile device 4915. In other embodiments, the mobile device 4915 is instead configured and registered using the mobile device 4915's memory. Moreover, additional services can be provisioned (after a customer purchases the mobile device 4915) such as data services like GPRS, multimedia messaging service (MMS), and instant messaging. Once provisioned, the mobile device 4915 is activated and is thereby allowed to use the communication system 4900 by the service carrier.

The communication system 4900 is a private communication network in some embodiments. In such embodiments, the mobile devices 4915 can communicate (e.g., conduct voice calls, exchange data) among each other (e.g., mobile devices 4915 that are provisioned for the communication system 4900). In other embodiments, the communication system 4900 is a public communication network. Thus, the mobile devices 4915 can communicate with other devices outside of the communication system 4900 in addition to the mobile devices 4915 provisioned for the communication system 4900. Some of the other devices outside of the communication system 4900 include phones, computers, and other devices that connect to the communication system 4900 through other networks such as a public switched telephone network or another wireless communication network.

Figure 50:
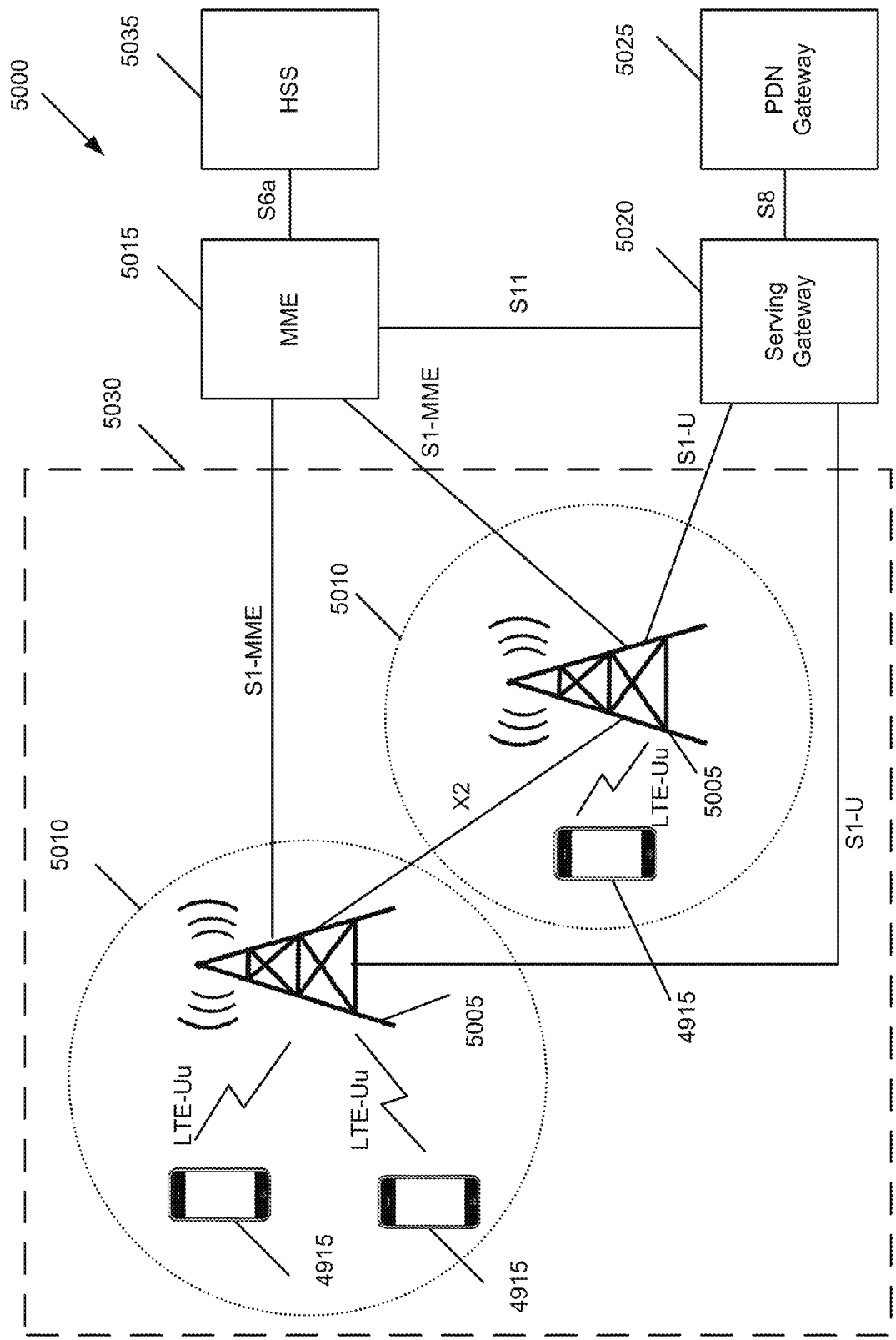
FIG. 50 conceptually illustrates another example communication system of some embodiments.

The Long-Term Evolution (LTE) specification is used to define 4 G communication systems. FIG. 50 conceptually illustrates an example of a 4 G communication system 5000 that is used for connecting some participants of a video conference in some embodiments. As shown, the communication system 5000 includes several mobile devices 4915, several Evolved Node Bs (eNBs) 5005, a Mobility Management Entity (MME) 5015, a Serving Gateway (S-GW) 5020, a Packet Data Network (PDN) Gateway 5025, and a Home Subscriber Server (HSS) 5035. In some embodiments, the communication system 5000 includes one or more MMEs 5015, one or more S-GWs 5020, one or more PDN Gateways 5025, and one or more HS Ss 5035.

The eNBs 5005 provide an air interface for the mobile devices 4915. As shown, each eNB 5005 covers a service region 5010. The mobile devices 4915 in each service region 5010 are wirelessly connected to the eNB 5005 of the service region 5010 through a LTE-Uu interface. FIG. 50 also shows the eNBs 5005 connected to each other through an X2 interface. In addition, the eNBs 5005 are connected to the MME 5015 through an S1-MME interface and to the S-GW 5020 through an S1-U interface. The eNBs 5005 are collectively referred to as an Evolved UTRAN (E-TRAN) 5030.

The eNBs 5005 provide functions such as radio resource management (e.g., radio bearer control, connection mobility control, etc.), routing of user plane data towards the S-GW 5020, signal measurement and measurement reporting, MME selection at the time of mobile device attachment, etc. The MME 5015 functions include idle mode mobile device tracking and paging, activation and deactivation of radio bearers, selection of the S-GW 5020 at the time of mobile device attachment, Non-Access Stratum (NAS) signaling termination, user authentication by interacting with the HSS 5035, etc.

The S-GW 5020 functions includes (1) routing and forwarding user data packets and (2) managing and storing mobile device contexts such as parameters of the IP bearer service and network internal routing information. The PDN Gateway 5025 functions include providing connectivity from the mobile devices to external packet data networks (not shown) by being the point of exit and entry of traffic for the mobile devices. A mobile station may have simultaneous connectivity with more than one PDN Gateway for accessing multiple packet data networks. The PDN Gateway 5025 also acts as the anchor for mobility between 3GPP and non-3GPP technologies such as WiMAX and 3GPP2 (e.g., CDMA 1X and EV-DO).

As shown, MME 5015 is connected to S-GW 5020 through an S11 interface and to the HSS 5035 through an S6a interface. The S-GW 5020 and the PDN Gateway 5020 are connected through an S8 interface. The MME 5015, S-GW 5020, and PDN Gateway 5025 are collectively referred to as an Evolved Packet Core (EPC). The EPC is the main component of a System Architecture Evolution (SAE) architecture, which is the core network architecture of 3GPP LTE wireless communication standard. The EPC is a pure packet system. For example, the EPC does not have a voice media gateway. Services, like voice and SMS, are packet-switched routed and are provided by application functions that make use of the EPC service. So using the telephone call to video conference transition previously described above as an example, both the telephone call and the video conference are conducted through packet-switched equipment of the communication system 5000 in some embodiments. In some such embodiments, the packet-switched channel used for the telephone call is continued to be used for the audio data of the video conference after the telephone call terminates. However, in other such embodiments, a different packet-switched channel is created (e.g., when the video conference is established) and audio data is transmitted through the newly created packet-switched channel instead of the packet-switched channel of the telephone call when the telephone call terminates.

Moreover, the amount of bandwidth provided by these different technologies ranges from 44 kilobits per second (kbps) for GPRS to over 10 megabits per second (Mbps) for LTE. Download rates of 100 Mbps and upload rates of 50 Mbps are predicted in the future for LTE.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, many embodiments were described above by reference to a video conference between two dual camera mobile devices. However, one of ordinary skill in the art will realize that many of these embodiments are used in cases involving a video conference between a dual camera mobile device and another device, such as a single camera mobile device, a computer, a phone with video conference capability, etc. Moreover, many of the embodiments described above can be used in single camera mobile devices and other computing devices with video conference capabilities. Thus, one of ordinary skill in the art would understand that the invention is not limited by the foregoing illustrative details, but rather is to be defined by the appended claims.

We claim:

1. A non-transitory machine-readable medium of a first mobile device, the machine-readable medium storing a program for allowing the first mobile device that is in a video conference with a second mobile device to remotely control the second mobile device, the program comprising sets of instructions for:
sending video images captured by a camera of the first mobile device to the second mobile device for display on the second mobile device during the video conference;
receiving video images captured by a camera of the second mobile device for display on the first mobile device during the video conference;
specifying a region of interest as a portion of the received video images based on a touch input at a location within a received video image displayed on the first mobile device; and
sending, while sending video images captured by the camera of the first mobile device and receiving video images captured by the camera of the second mobile device during the video conference, a command through a communication channel of a real-time communication session to the second mobile device, said command for instructing the second mobile device to perform an operation that uses the specified region of interest to modify the video images captured by the camera of the second mobile device.

2. The non-transitory machine-readable medium of claim 1, wherein the communication channel is a control channel.

3. The non-transitory machine-readable medium of claim 1, wherein the operation is an exposure operation on the region of interest.

4. The non-transitory machine-readable medium of claim 1, wherein the operation is a focus operation on the region interest.

5. The non-transitory machine-readable medium of claim 1, wherein the operation is a zoom operation on the region of interest.

6. The non-transitory machine-readable medium of claim 1, wherein the program further comprises sets of instructions for:
displaying on the first mobile device the video images captured by the camera of the second mobile device; and
displaying on the first mobile device the video images captured by the camera of the first mobile device such that the video images captured by the camera of the second mobile device overlap a portion of the video images captured by the camera of the first mobile device.

7. The non-transitory machine-readable medium of claim 1, wherein the set of instructions for sending the command comprises a set of instructions for sending the command in response to receiving a touch input of a selectable user interface ("UI") tool on the display screen of the first mobile device.

8. A non-transitory machine-readable medium of a first mobile device, the machine-readable medium storing a program for allowing the first mobile device during a video conference with a second mobile device to remotely control the second mobile device, the program comprising a graphical user interface ("GUI"), the GUI comprising:
a first display area for displaying video images captured by a camera of the first mobile device during a real-time communication session;
a second display area for displaying video images captured by a camera of the second mobile device during the real-time communication session; and
a selectable user interface ("UI") tool for display upon receiving a touch input on a location in the second display area to specify a region of interest as a portion of captured video images, wherein selection of the selectable UI tool causes the first mobile device to send a command to the second mobile device to instruct the second mobile device to perform an operation during the real-time communication session, said operation using the specified region of interest to modify the video images captured by the camera of the second mobile device.

9. The non-transitory machine-readable medium of claim 8, wherein the command is sent through a communication channel of the real-time communication session.

10. The non-transitory machine-readable medium of claim 9, wherein the communication channel is a control channel of the real-time communication session.

11. The non-transitory machine-readable medium of claim 8, wherein the first display area is inset in the second display area.

12. A method of defining a program for allowing a first mobile device to remotely control a second mobile device during a video conference, the method comprising:
defining a display area for displaying on the first mobile device a video comprising images captured by a camera of the second mobile device based on a set of settings of the camera comprising an exposure setting that specifies an exposure level at which the camera of the second mobile device captures the images, the set of settings specifying a first mode for the camera of the second mobile device to capture the images at a first exposure level; and
defining a camera adjustment operation for receiving an input on the first mobile device during the video conference that directs the second mobile device to automatically modify, without user intervention on the second mobile device, the set of settings to specify a second mode for the camera of the second mobile device to capture the images at a second exposure level different from the first exposure level.

13. The method of claim 12 further comprising defining a first network manager for the first mobile device that relays the received input to a second network manager of the second mobile device during the video conference.

14. The method of claim 13, wherein the first network manager relays data to the second network manager during the video conference through packets transmitted over the Internet Protocol (IP), said packets including control packets for relaying input data received on the first mobile device for controlling the operation of the second mobile device.

15. The method of claim 12 further comprising defining a user interface for receiving the input by detecting that a location on the display area has been selected during the video conference.

16. A method of defining a program for allowing a first mobile device to remotely control a second mobile device during a video conference, the method comprising:
    defining a display area for displaying on the first mobile device a video comprising images captured by a camera of the second mobile device based on a set of settings of the camera comprising a focus setting that specifies a focal point at which the camera of the second mobile device captures the images, the set of settings specifying a first mode for the camera of the second mobile device to capture the images at a first focal point; and
    defining a camera adjustment operation for receiving an input on the first mobile device during the video conference that directs the second mobile device to automatically modify, without user intervention on the second mobile device, the set of settings to specify a second mode for the camera of the second mobile device to capture the images at a second focal point different from the first focal point.

17. The method of claim 16, wherein the input comprises a selection of a portion of the video displayed on the first mobile device, the input for directing the second mobile device to automatically modify, without user intervention on the second mobile device, the set of settings to specify the second mode for the camera of the second mobile device to capture the images at a second focal point based on the selected portion of the video.

18. The method of claim 17, wherein the first mobile device comprises a touch sensitive display screen, wherein the camera adjustment operation is further for receiving the input through the touch sensitive display screen of the first mobile device.

19. The method of claim 16, wherein the video is a first video, wherein the display area is further for displaying on the first mobile device a second video comprising images captured by a camera of the first mobile device.

20. The non-transitory machine-readable medium of claim 1, wherein the command is a first command, wherein the program further comprises a set of instructions for receiving, while sending video images captured by the camera of the first mobile device and receiving video images captured by the camera of the second mobile device during the video conference, a second command through the communication channel of the real-time communication session from the second mobile device, the second command for instructing the first mobile device to perform an operation that modifies the images captured by the camera of the first mobile device.

21. The non-transitory machine-readable medium of claim 1, wherein the region of interest is a shape that bounds the portion of the received video images displayed on the first mobile device.

22. The non-transitory machine-readable medium of claim 8, wherein the region of interest is a shape that bounds the portion of the captured video images displayed on the first mobile device.

23. The non-transitory machine-readable medium of claim 8, wherein the touch input is a tap input on the location to specify the region of interest centered at the location.

24. The non-transitory machine-readable medium of claim 8, wherein the touch input comprises a drag operation across the portion of the video images to specify the region of interest.

25. The non-transitory machine-readable medium of claim 8, wherein the touch input specifies the region of interest by drawing a boundary of the region of interest.

26. The non-transitory machine-readable medium of claim 1, wherein the specified region of interest comprises the location of the touch input.

27. The non-transitory machine-reasonable medium of claim 1, wherein the specified region of interest is centered at the location of the touch input.

* * * * *